（12）United States Patent
Hosaka

(10) Patent No.: US 8,787,686 B2
(45) Date of Patent: Jul. 22, 2014

(54) IMAGE PROCESSING DEVICE AND IMAGE PROCESSING METHOD

(71) Applicant: Sony Corporation, Tokyo (JP)

(72) Inventor: Kazuhisa Hosaka, Tokyo (JP)

(73) Assignee: Sony Corporation, Tokyo (JP)

( * ) Notice: Subject to any disclaimer, the term of this patent is extended or adjusted under 35 U.S.C. 154(b) by 30 days.

(21) Appl. No.: 13/712,359

(22) Filed: Dec. 12, 2012

(65) Prior Publication Data

US 2013/0163893 A1 Jun. 27, 2013

(30) Foreign Application Priority Data

Dec. 21, 2011 (JP) ................................. 2011-280579

(51) Int. Cl.
*G06K 9/36* (2006.01)
*G06K 9/46* (2006.01)

(52) U.S. Cl.
USPC .......................................... 382/232; 382/240

(58) Field of Classification Search
USPC ......... 382/232, 233, 240, 244, 245, 246, 248, 382/251
See application file for complete search history.

(56) References Cited

U.S. PATENT DOCUMENTS 5,748,786 A * 5/1998 Zandi et al. ................... 382/240
7,076,108 B2 * 7/2006 Huang et al. .................. 382/240

FOREIGN PATENT DOCUMENTS

JP 2004-166254 6/2004

* cited by examiner

*Primary Examiner* — Phuoc Tran
(74) *Attorney, Agent, or Firm* — Frommer Lawrence & Haug LLP; William S. Frommer

(57) ABSTRACT

An image processing device includes: a significant digit number encoding unit designating a set of a predetermined number of coefficient data items generated from image data. The maximum number of significant digits of coefficient data for each set every cycle is obtained, and information regarding the maximum number is encoded. A zero run encoding unit encodes zero runs formed by sets that include only coefficient data whose value is 0 at a cycle that differs from the cycle of encoding the significant digit number. The absolute value for the maximum number of significant digits other than the zero runs is extracted and encoded. The positive or negative sign of each coefficient data item whose absolute value is not 0 in a set at a cycle that differs from a cycle in relation to coefficient data other than the zero runs is encoded.

17 Claims, 39 Drawing Sheets

FIG.3

| | − | − | + | | + | + | | | − | | + | − | + | | − |
|---|---|---|---|---|---|---|---|---|---|---|---|---|---|---|---|
| | 0 | 0 | 0 | | 0 | 0 | | | 0 | | 1 | 0 | 0 | | 1 |
| | 1 | 0 | 1 | | 0 | 1 | | | 0 | | 1 | 1 | 1 | | 0 |
| | 0 | 1 | 1 | | 1 | 1 | | | 0 | | 1 | 1 | 0 | | 1 |
| | 1 | 1 | 0 | | 1 | 0 | | | 1 | | 0 | 0 | 1 | | 1 |
| | | | | | | | | | | | 1 | 1 | 1 | | 0 |
| | | 3 | | | 3 | | | | | | | 4 | | | |

QUANTIZED COEFFICIENTS IN BIT PLANE EXPRESSION — 1 (ALL QUANTIZED COEFFICIENTS OF THESE LINES TO BE ENCODED ARE NOT 0)

VALUE OF MAXIMUM NUMBER B OF SIGNIFICANT DIGITS (INITIAL VALUE OF B IS 0)
— 1 (B HAS CHANGED)
0 (INCREASE B)
001 (INCREMENT OF B IS 3)
101 011 110 010 (ABSOLUTE VALUE OF W QUANTIZED COEFFICIENTS WHICH ARE NOT 0)
1010 (SIGNS OF W QUANTIZED COEFFICIENTS WHICH ARE NOT 0)

0 (B HAS NOT CHANGED)
011 110 000 011 (ABSOLUTE VALUE OF W QUANTIZED COEFFICIENTS)
001 (SIGNS OF W QUANTIZED COEFFICIENTS WHICH ARE NOT 0)

1 (B HAS CHANGED)
0 (INCREASE B)
1 (INCREMENT OF B IS 1)
1101 0100 0111 1010 (ABSOLUTE VALUE OF W QUANTIZED COEFFICIENTS)
0101 (SIGNS OF W QUANTIZED COEFFICIENTS WHICH ARE NOT 0)

FIG.4

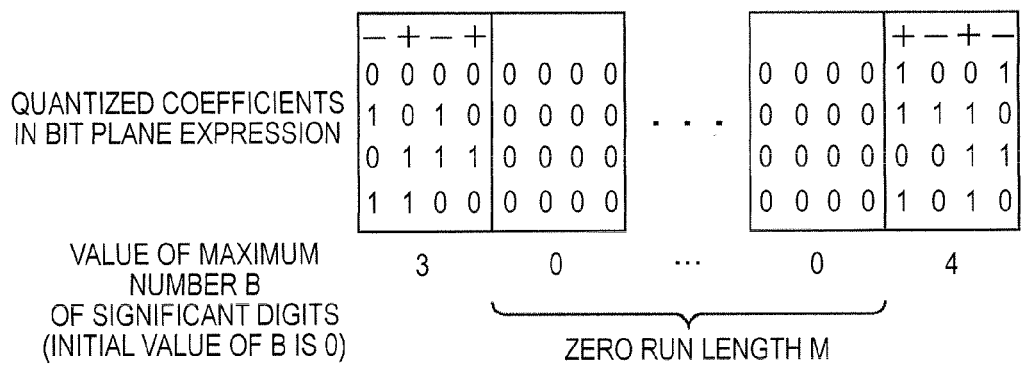

1 (ALL QUANTIZED COEFFICIENTS OF THESE LINES TO BE
            ENCODED ARE NOT 0)

1 (B HAS CHANGED)
0 (INCREASE B)
001 (INCREMENT OF B IS 3)
101 011 110 010 (ABSOLUTE VALUE OF W QUANTIZED COEFFICIENTS)
1010 (SIGNS OF W QUANTIZED COEFFICIENTS WHICH ARE NOT 0)

1 (B HAS CHANGED)
1 (DECREASE B)
00 (DECREMENT OF B IS 3)

00...0,M (ZERO RUN LENGTH CODE, NUMBER OF DIGITS IN BINARY EXPRESSION
              OF COUNTED VALUE, AND VALUE)

0001 (INCREASED OF B IS 4)

1101 0100 0111 1010 (ABSOLUTE VALUE OF W QUANTIZED
                    COEFFICIENTS)

0101 (SIGNS OF W QUANTIZED COEFFICIENTS WHICH ARE NOT 0)

FIG.5

| ZERO RUN LENGTH | BINARY EXPRESSION | CODE |
|---|---|---|
| 1 | 1 | 1 |
| 2 | 10 | 01,0 |
| 3 | 11 | 01,1 |
| 4 | 100 | 001,00 |
| 5 | 101 | 001,01 |
| 6 | 110 | 001,10 |
| 7 | 111 | 001,11 |
| 8 | 1000 | 0001,000 |
| ⋮ | ⋮ | ⋮ |
| 15 | 1111 | 0001,111 |
| ⋮ | ⋮ | ⋮ |

FIG.6

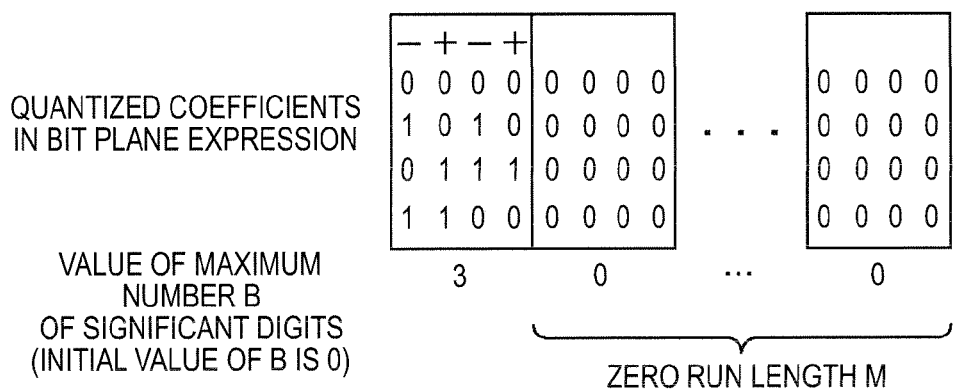

QUANTIZED COEFFICIENTS IN BIT PLANE EXPRESSION

VALUE OF MAXIMUM NUMBER B OF SIGNIFICANT DIGITS (INITIAL VALUE OF B IS 0)

ZERO RUN LENGTH M

1(ALL QUANTIZED COEFFICIENTS OF THESE LINES TO BE ENCODED ARE NOT 0)

1 (B HAS CHANGED)
0 (INCREASE B)
001 (INCREMENT OF B IS 3)
101 011 110 010 (ABSOLUTE VALUE OF W QUANTIZED COEFFICIENTS)
1010 (SIGNS OF W QUANTIZED COEFFICIENTS WHICH ARE NOT 0)

1 (B HAS CHANGED)
1 (DECREASE B)
00 (DECREMENT OF B IS 3)

00···01 (ZERO RUN LENGTH CODE (TERMINAL END), NUMBER OF DIGITS IN BINARY EXPRESSION OF (COUNTED VALUE-1) AND 1)

FIG.7

| ZERO RUN LENGTH | BINARY EXPRESSION | CODE | REMARK |
|---|---|---|---|
| 1 | 1 | ABSENT | B=0 INDICATES THAT 0 IS FIXED UP TO END OF LINE |
| 2 | 10 | 01 | prefix of CODE INDICATING TWO OR MORE ZERO RUNS |
| 3 | 11 | 001 | prefix of CODE INDICATING FOUR OR MORE ZERO RUNS |
| 4 | 100 | 001 | prefix of CODE INDICATING FOUR OR MORE ZERO RUNS |
| 5 | 101 | 0001 | prefix of CODE INDICATING EIGHT OR MORE ZERO RUNS |
| 6 | 110 | 0001 | prefix of CODE INDICATING EIGHT OR MORE ZERO RUNS |
| 7 | 111 | 0001 | prefix of CODE INDICATING EIGHT OR MORE ZERO RUNS |
| 8 | 1000 | 0001 | prefix of CODE INDICATING EIGHT OR MORE ZERO RUNS |
| 9 | 1001 | 00001 | prefix of CODE INDICATING SIXTEEN OR MORE ZERO RUNS |
| 10 | 1010 | 00001 | prefix of CODE INDICATING SIXTEEN OR MORE ZERO RUNS |
| 11 | 1011 | 00001 | prefix of CODE INDICATING SIXTEEN OR MORE ZERO RUNS |
| 12 | 1100 | 00001 | prefix of CODE INDICATING SIXTEEN OR MORE ZERO RUNS |
| 13 | 1101 | 00001 | prefix of CODE INDICATING SIXTEEN OR MORE ZERO RUNS |
| 14 | 1110 | 00001 | prefix of CODE INDICATING SIXTEEN OR MORE ZERO RUNS |
| 15 | 1111 | 00001 | prefix of CODE INDICATING SIXTEEN OR MORE ZERO RUNS |
| 16 | 10000 | 00001 | prefix of CODE INDICATING SIXTEEN OR MORE ZERO RUNS |

FIG.8

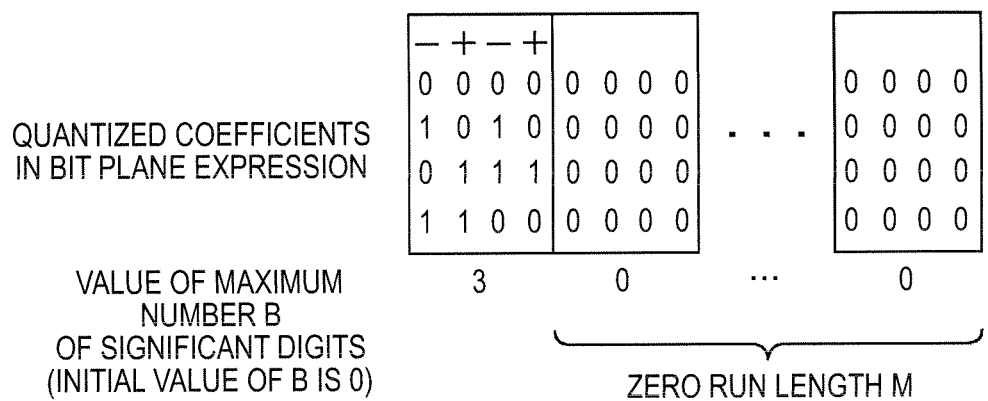

QUANTIZED COEFFICIENTS IN BIT PLANE EXPRESSION

VALUE OF MAXIMUM NUMBER B OF SIGNIFICANT DIGITS (INITIAL VALUE OF B IS 0)

ZERO RUN LENGTH M 1 (ALL QUANTIZED COEFFICIENTS OF THESE LINES TO BE ENCODED ARE NOT 0)

1 (B HAS CHANGED)
0 (INCREASE B)
001 (INCREMENT OF B IS 3)
101 011 110 010 (ABSOLUTE VALUE OF W QUANTIZED COEFFICIENTS)
1010 (SIGNS OF W QUANTIZED COEFFICIENTS WHICH ARE NOT 0)

1 (B HAS CHANGED)
1 (DECREASE B)
00 (DECREMENT OF B IS 3)

00···0 (ZERO RUN LENGTH CODE (TERMINAL END), NUMBER OF DIGITS IN BINARY EXPRESSION OF (COUNTED VALUE-1))

FIG.9

| ZERO RUN LENGTH | BINARY EXPRESSION | CODE | REMARK |
|---|---|---|---|
| 1 | 1 | ABSENT | B=0 INDICATES THAT 0 IS FIXED UP TO END OF LINE |
| 2 | 10 | 0 | prefix of CODE INDICATING TWO OR MORE ZERO RUNS |
| 3 | 11 | 00 | prefix of CODE INDICATING FOUR OR MORE ZERO RUNS |
| 4 | 100 | 00 | prefix of CODE INDICATING FOUR OR MORE ZERO RUNS |
| 5 | 101 | 000 | prefix of CODE INDICATING EIGHT OR MORE ZERO RUNS |
| 6 | 110 | 000 | prefix of CODE INDICATING EIGHT OR MORE ZERO RUNS |
| 7 | 111 | 000 | prefix of CODE INDICATING EIGHT OR MORE ZERO RUNS |
| 8 | 1000 | 000 | prefix of CODE INDICATING EIGHT OR MORE ZERO RUNS |
| 9 | 1001 | 0000 | prefix of CODE INDICATING SIXTEEN OR MORE ZERO RUNS |
| 10 | 1010 | 0000 | prefix of CODE INDICATING SIXTEEN OR MORE ZERO RUNS |
| 11 | 1011 | 0000 | prefix of CODE INDICATING SIXTEEN OR MORE ZERO RUNS |
| 12 | 1100 | 0000 | prefix of CODE INDICATING SIXTEEN OR MORE ZERO RUNS |
| 13 | 1101 | 0000 | prefix of CODE INDICATING SIXTEEN OR MORE ZERO RUNS |
| 14 | 1110 | 0000 | prefix of CODE INDICATING SIXTEEN OR MORE ZERO RUNS |
| 15 | 1111 | 0000 | prefix of CODE INDICATING SIXTEEN OR MORE ZERO RUNS |
| 16 | 10000 | 0000 | prefix of CODE INDICATING SIXTEEN OR MORE ZERO RUNS |

ORDER OF CODES IN NON-PIPELINE

RELATIONSHIP BETWEEN CYCLE AND CODE cycle3: B(3) A(3) S(3)
cycle4: B(4) A(4) S(4)
cycle5: B(5) A(5) S(5)
cycle6: B(6) A(6) S(6)

FIG.11A

IN CASE OF B=0 IN B(4) AND B(5)
cycle3: B(3) A(3) S(3)
cycle4: B(4) — —
cycle5: B(5) — —
cycle6: B(6) A(6) S(6)

FIG.11B

IN CASE OF ENCODING, OUTPUT CODES OF B(4)B(5)B(6) AT cycle6 WHEN ZERO RUN LENGTH IS FIXED
cycle3: B(3) A(3) S(3)
cycle4: — — —
cycle5: — — —
cycle6: B(4) B(5) B(6) A(6) S(6)

FIG.11C

IN CASE OF DECODING, DECODE VALUE OF B IN B(4) TO B(6) AT cycle4
cycle3: B(3) A(3) S(3)
cycle4: B(4) B(5) B(6) — —
cycle5: — — —
cycle6: — A(6) S(6)

ORDER OF CODES IN PIPELINE (BEFORE BEING IMPROVED)

RELATIONSHIP CYCLE AND CODE

| cycle4: | S(2) | A(3) | B(4) |
| cycle5: | S(3) | A(4) | B(5) |
| cycle6: | S(4) | A(5) | B(6) |
| cycle7: | S(5) | A(6) | B(7) |

FIG. 13B

WHEN B=0 IN B(4) AND B(5)

| cycle4: | S(2) | A(3) | B(4) |
| cycle5: | [S(3)] | — | B(5) |
| cycle6: | — | — | B(6) |
| cycle7: | — | A(6) | B(7) |

FIG. 13C

IN CASE OF ENCODING, OUTPUT CODES OF B(4)B(5)B(6) AT cycle6 WHEN ZERO RUN LENGTH IS FIXED

| cycle4: | S(2) | A(3) | — |
| cycle5: | [S(3)] | — | — |
| cycle6: | — | — | B(4) B(5) B(6) |
| cycle7: | — | A(6) | B(7) |

FIG. 13D

IN CASE OF DECODING, DECODE VALUE OF B IN B(4) TO B(6) AT cycle4

| cycle4: | S(2) | A(3) | B(4) B(5) B(6) |
| cycle5: | [S(3)] | — | — |
| cycle6: | — | — | — |
| cycle7: | — | A(6) | B(7) |

FIG. 15A

ORDER OF CODES IN PIPELINE (AFTER BEING IMPROVED)

DIVIDE CODES OF B(4), B(5), AND B(6) AS FOLLOWS SO AS TO BE DISPOSED

```
cycle4:  S(2)  A(3)  diff,minus,more*
cycle5:  S(3)   —     —
cycle6:   —     —     — ZERO RUN LENGTH CODE,more*,enough
cycle7:   —    A(6)  B(7)
```

FIG. 15B

IN CASE OF ENCODING, ENCODE VALUE OF B(4) AT cycle4 AND VALUES OF B(5) AND B(6) AT cycle6

```
cycle4:  S(2)  A(3)  diff,minus,more*
cycle5:  S(3)   —     —
cycle6:   —     —    ZERO RUN LENGTH CODE,more*,enough
cycle7:   —    A(6)  B(7)
```

FIG. 15C

IN CASE OF DECODING, DECODE VALUE OF B(4) AT cycle4 AND VALUES OF B(5) AND B(6) AT cycle5

```
cycle4:  S(2)  A(3)  diff,minus,more*
cycle5:  S(3)   —    ZERO RUN LENGTH CODE,more*,enough
cycle6:   —     —     —
cycle7:   —    A(6)  B(7)
```

FIG. 15D

ZERO RUN LENGTH CODE, more*, AND enough CONTINUOUSLY LOCATED, AND THUS THERE IS DEGREE OF FREEDOM IN DISTRIBUTION OF DECODING PROCESS TO cycles5 and 6 AS FOLLOWS

```
cycle4:  S(2)  A(3)  diff,minus,more*
cycle5:  S(3)   —    ZERO RUN LENGTH CODE
cycle6:   —     —    more*.enough
cycle7:   —    A(6)  B(7)
```

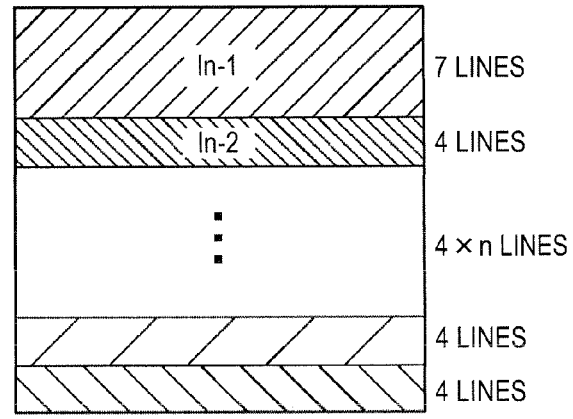
FIG.41A  IMAGE INPUT
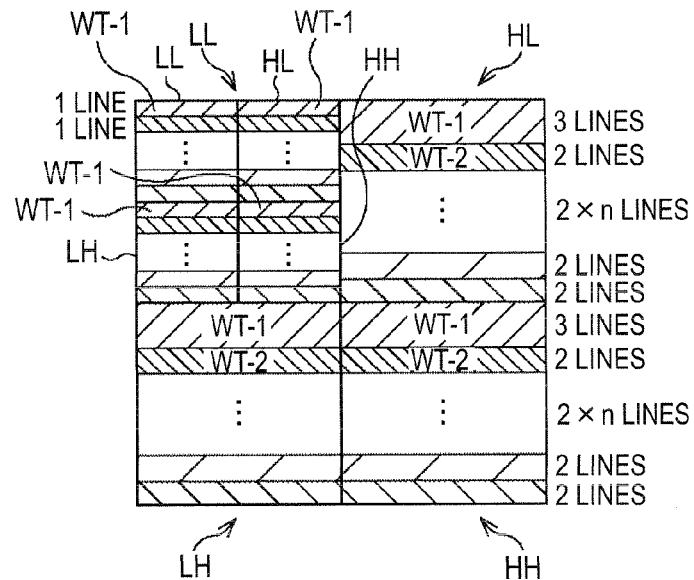
FIG.41B  WAVELET TRANSFORM RESULT (ANALYSIS)
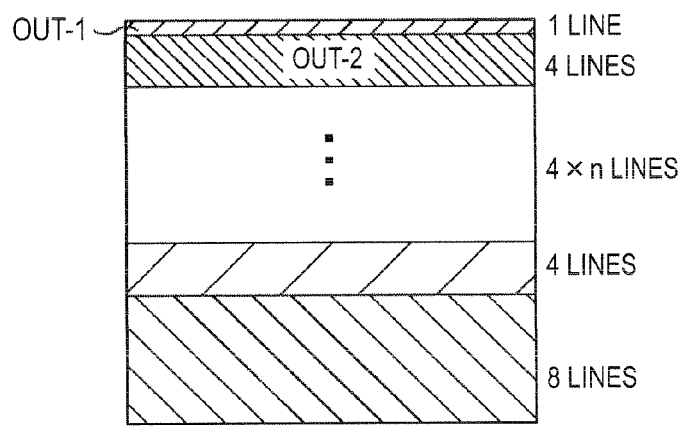
FIG.41C  IMAGE OUTPUT

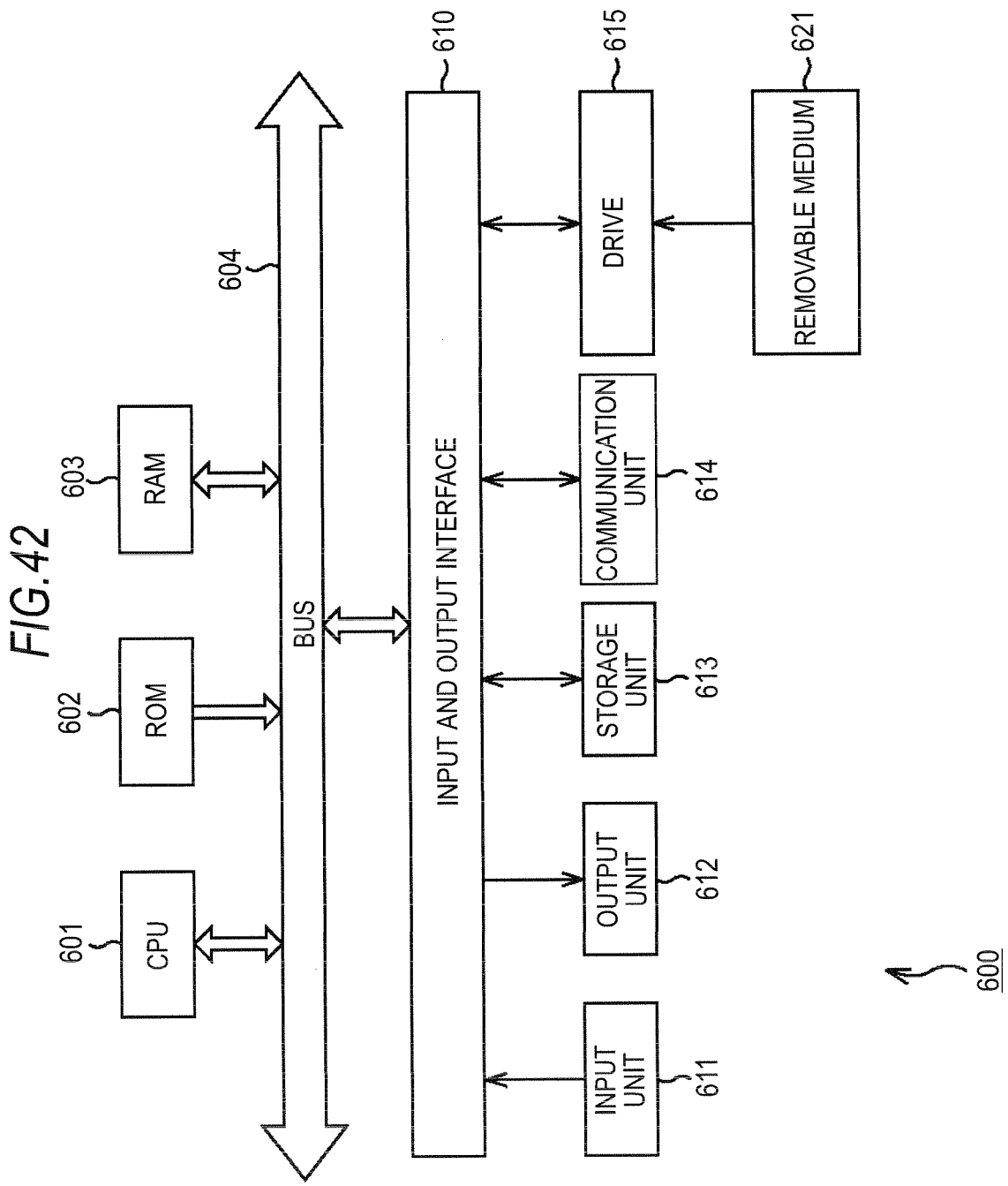

IMAGE PROCESSING DEVICE AND IMAGE PROCESSING METHOD

FIELD

The present disclosure relates to an image processing device and an image processing method, and more particularly to an image processing device and an image processing method capable of more easily performing encoding and decoding.

BACKGROUND

As an encoding method in which, in a case of performing image (data) encoding, coefficients of sub-bands (frequency bands) generated by performing a band division process on an input image are encoded, there is JPEG (Joint Photographic Experts Group) 2000.

In a case of encoding an image using the JPEG 2000 method, wavelet coefficients obtained by performing wavelet transform on the input image are quantized, and the quantized coefficients obtained through the quantization further undergo entropy encoding.

In the related art, in entropy encoding, bit modeling called EBCOT (Embedded Block Coding with Optimized Truncation) and arithmetical encoding called MQ coder are performed. That is to say, quantized coefficients undergo bit modeling, and further undergo arithmetical encoding based on a plurality of coding paths for each bit plane. The code obtained through the arithmetical encoding is output as an encoded image (data) (for example, refer to JP-A-2004-166254).

In addition, in a case of decoding an image encoded using the JPEG 2000 method, a process is performed with procedures reverse to the case of encoding. More specifically, the code which is the encoded image data undergoes entropy decoding and then is inversely quantized, and the quantized coefficients obtained thereby further undergo inverse wavelet transform. The image obtained by the inverse wavelet transform is output as a decoded image.

SUMMARY

However, in the above-described technique, since an amount to be processed at the EBCOT and MQ coder is large, it is difficult to perform image encoding and decoding at high speed, and, for example, in a case of performing real-time encoding (or decoding) of an HD (High Definition) image with a high resolution of horizontal 1920 pixels and vertical 1080 pixels, it is necessary to provide expensive dedicated hardware.

It is therefore desirable to more easily encode or decode an image.

One embodiment of the present disclosure is directed to an image processing device including a significant digit number encoding unit that designates a predetermined number of coefficient data items of a plurality of coefficient data items generated from image data as a set, obtains the maximum number of significant digits which is the number of significant digits of coefficient data having the greatest absolute value in relation to each set every cycle, and encodes information regarding the maximum number of significant digits; a zero run encoding unit that encodes zero runs formed by sets including only coefficient data whose value is 0 at a cycle different from that of the encoding of the significant digit number encoding unit; an absolute value encoding unit that extracts an absolute value for the maximum number of significant digits of each coefficient data item in a set which has been encoded by the significant digit number encoding unit in relation to coefficient data other than the zero runs, and encodes the absolute value at a cycle different from that of encoding of the significant digit number encoding unit; and a sign encoding unit that encodes a positive or negative sign of each coefficient data item whose absolute value is not 0 in a set which has been encoded by the absolute value encoding unit at a cycle different from that of encoding of the absolute value encoding unit in relation to coefficient data other than the zero runs.

The zero run encoding unit may generate codes including codes 0 of the number one smaller than the number of digits in binary expression of the number of sets forming the zero runs and the binary expression of the number of sets.

The zero run encoding unit may generate codes including codes 0 of the number one smaller than the number of digits in binary expression of the number of sets forming the zero runs and a code 1 in a case where the zero runs continue to a line end which is a process target.

The zero run encoding unit may generate codes including codes 0 of the number one smaller than the number of digits in binary expression of the number of sets forming the zero runs in a case where the zero runs continue to a line end which is a process target.

The zero run encoding unit may encode the zero runs at a cycle when the significant digit number encoding unit encodes the information regarding the maximum number of significant digits in relation to sets after the zero runs.

The image processing device may further include a wavelet transform unit that performs wavelet transform on image data; and a quantization unit that quantizes wavelet coefficients obtained by the wavelet transform unit performing the wavelet transform on the image data, and each of the significant digit number encoding unit, the zero run encoding unit, the absolute value encoding unit, and the sign encoding unit may perform encoding on quantized coefficients obtained by the quantization unit quantizing the wavelet coefficients.

The one embodiment of the present disclosure is also directed to an image processing method of an image processing device, including causing a significant digit number encoding unit to designate a predetermined number of coefficient data items of a plurality of coefficient data items generated from image data as a set, to obtain the maximum number of significant digits which is the number of significant digits of coefficient data having the greatest absolute value in relation to each set every cycle, and to encode information regarding the maximum number of significant digits; causing a zero run encoding unit to encode zero runs formed by sets including only coefficient data whose value is 0 at a cycle different from that of encoding of the number of significant digits; causing an absolute value encoding unit to extract an absolute value for the maximum number of significant digits of each coefficient data item in a set whose number of significant digits has been encoded in relation to coefficient data other than the zero runs, and to encode the absolute value at a cycle different from that of encoding of the number of significant digits; and causing a sign encoding unit to encode a positive or negative sign of each coefficient data item whose absolute value is not 0 in a set whose absolute value has been encoded at a cycle different from that of encoding of the absolute value in relation to coefficient data other than the zero runs.

Another embodiment of the present disclosure is directed to an image processing device including a significant digit number decoding unit that designates a predetermined number of coefficient data items of a plurality of coefficient data items as a set, and decodes a code indicating the maximum number of significant digits which is the number of significant digits of coefficient data having the greatest absolute value in the set in relation to each set every cycle; a zero run decoding unit that decodes a code indicating zero runs formed by sets including only coefficient data whose value is 0 at a cycle different from that of decoding of the significant digit number decoding unit; an absolute value decoding unit that decodes a code indicating an absolute value for the maximum number of significant digits of each coefficient data item in a set which has been decoded by the significant digit number decoding unit at a cycle different from that of decoding of the significant digit number decoding unit in relation to coefficient data other than the zero runs; and a sign decoding unit that decodes a positive or negative sign of each coefficient data item whose absolute value is not 0 in the set which has been decoded by the absolute value decoding unit at a cycle different from that of decoding of the absolute value decoding unit in relation to coefficient data other than the zero runs.

The zero run decoding unit may decode the code indicating the zero runs in a case where the maximum number of significant digits of a current set which is a process target is 0 as a result of decoding by the significant digit number decoding unit.

The zero run decoding unit may perform first reading for sequentially reading codes until a code 1 is read or codes are read up to a line end, and, in a case where zero runs indicated by a code read through the first reading do not arrive at the line end, perform second reading for further reading codes corresponding to the number of codes 0 which have been read through the first reading, and generate coefficient data, whose value is 0, corresponding to the number of a code sequence in binary expression obtained by attaching a code 1 to the head of the codes read through the second reading.

In a case where zero runs indicated by a code read through the first reading arrive at the line end, the zero run decoding unit may generate coefficient data, whose value is 0, corresponding to the number arriving at the line end.

The image processing device may further include a maximum significant digit number holding unit that holds the maximum number of significant digits obtained by the significant digit number decoding unit decoding the code indicating the maximum number of significant digits during a predetermined time period. Here, the absolute value decoding unit may decode the code indicating the absolute value for the maximum number of significant digits held by the maximum significant digit number holding unit, at a cycle which is delayed from a cycle when decoding is performed by the significant digit number decoding unit by a time period when the maximum significant digit number holding unit holds the maximum number of significant digits.

The maximum significant digit number holding unit may hold the maximum number of significant digits until the next cycle.

The maximum significant digit number holding unit may hold the maximum number of significant digits until a cycle after a plurality of cycles.

The image processing device may further include an inverse quantization unit that inversely quantizes quantized coefficients including absolute values obtained as a result of decoding by the absolute value decoding unit and signs obtained as a result of decoding by the sign decoding unit; and an inverse wavelet transform unit that performs inverse wavelet transform on wavelet coefficients obtained by the inverse quantization unit inversely quantizing the quantized coefficients.

The another embodiment of the present disclosure is also directed to an image processing method of an image processing device, including causing a significant digit number decoding unit to designate a predetermined number of coefficient data items of a plurality of coefficient data items as a set, and to decode a code indicating the maximum number of significant digits which is the number of significant digits of coefficient data having the greatest absolute value in the set in relation to each set every cycle; causing a zero run decoding unit to decode a code indicating zero runs formed by sets including only coefficient data whose value is 0 at a cycle different from that of decoding of the number of significant digits; causing an absolute value decoding unit to decode a code indicating an absolute value for the maximum number of significant digits of each coefficient data item in a set whose number of significant digits has been decoded at a cycle different from that of decoding of the number of significant digits in relation to coefficient data other than the zero runs; and causing a sign decoding unit to decode a positive or negative sign of each coefficient data item whose absolute value is not 0 in a set whose absolute value has been decoded at a cycle different from that of decoding of the absolute value in relation to coefficient data other than the zero runs.

According to the one embodiment of the present disclosure, a predetermined number of coefficient data items of a plurality of coefficient data items generated from image data are designated as a set, the maximum number of significant digits which is the number of significant digits of coefficient data having the greatest absolute value is obtained in relation to each set every cycle, information regarding the maximum number of significant digits is encoded, zero runs formed by sets including only coefficient data whose value is 0 are encoded at a cycle different from that of encoding of the number of significant, an absolute value for the maximum number of significant digits of each coefficient data item in a set whose number of significant digits has been encoded is extracted in relation to coefficient data other than the zero runs, the absolute value is encoded at a cycle different from that of encoding of the number of significant digits, and a positive or negative sign of each coefficient data item whose absolute value is not 0 in a set whose absolute value has been encoded is encoded at a cycle different from that of encoding of the absolute value in relation to coefficient data other than the zero runs.

According to the another embodiment of the present disclosure, a predetermined number of coefficient data items of a plurality of coefficient data items are designated as a set, a code indicating the maximum number of significant digits which is the number of significant digits of coefficient data having the greatest absolute value in the set is decoded in relation to each set every cycle, a code indicating zero runs formed by sets including only coefficient data whose value is 0 is decoded at a cycle different from that of decoding of the number of significant digits, a code indicating an absolute value for the maximum number of significant digits of each coefficient data item in a set whose number of significant digits has been decoded is decoded at a cycle different from that of decoding of the number of significant digits in relation to coefficient data other than the zero runs, and a positive or negative sign of each coefficient data item whose absolute value is not 0 in a set whose absolute value has been decoded is decoded at a cycle different from that of decoding of the absolute value in relation to coefficient data other than the zero runs.

According to the embodiments of the present disclosure, it is possible to process an image. Particularly, it is possible to more easily encode or decode an image.

BRIEF DESCRIPTION OF THE DRAWINGS

FIG. 3 is a diagram illustrating an example of the quantized coefficient to be encoded.

FIG. 4 is a diagram illustrating an example of the zero run encoding.

FIG. 5 is a diagram illustrating an example of the zero run code.

FIG. 6 is a diagram illustrating another example of the zero run encoding.

FIG. 7 is a diagram illustrating another example of the zero run code.

FIG. 8 is a diagram illustrating still another example of the zero run encoding.

FIG. 9 is a diagram illustrating still another example of the zero run code.

FIGS. 11A to 11D are diagrams illustrating an example of the code orders in a non-pipeline process.

FIGS. 13A to 13D are diagrams illustrating another example of the timing chart in a case where the pipeline process is performed.

FIGS. 15A to 15D are diagrams illustrating another example of the code orders in the pipeline process.

FIGS. 41A to 41C are diagrams illustrating an example of the flow of the encoding and decoding.

FIG. 42 is a block diagram illustrating a main configuration example of the personal computer.

DETAILED DESCRIPTION

Hereinafter, embodiments of the present disclosure will be described. In addition, the description will be made in the following order.

1. First embodiment (image encoding device)
2. Second embodiment (image decoding device)
3. Third embodiment (image encoding device and image decoding device)
4. Fourth embodiment (image encoding device and image decoding device)
5. Fifth embodiment (personal computer)

1. <First Embodiment>
[Image Encoding Device]

Figure 1:
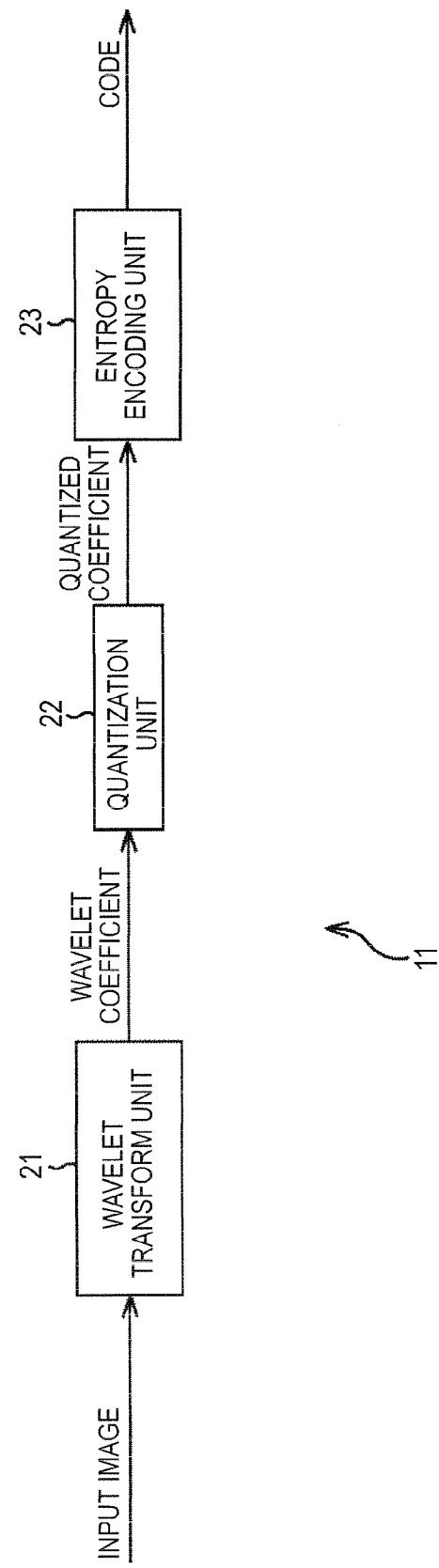
FIG. 1 is a block diagram illustrating a main configuration example of the image encoding device.

FIG. 1 is a block diagram illustrating a main configuration example of the image encoding device. The image encoding device 11 shown in FIG. 1 is an image processing device which encodes image data and outputs the encoded data obtained.

As shown in FIG. 1, the image encoding device 11 has a wavelet transform unit 21, a quantization unit 22, and an entropy encoding unit 23.

For example, an image (data) which is a component signal having undergone a DC level shift as necessary is input to the wavelet transform unit 21. The wavelet transform unit 21 performs wavelet transform on the input image and divides the image into a plurality of sub-bands. The wavelet transform unit 21 supplies wavelet coefficients of the sub-bands obtained through the wavelet transform to the quantization unit 22.

The quantization unit 22 quantizes the wavelet coefficients supplied from the wavelet transform unit 21, and supplies the quantized coefficients obtained as a result thereof to the entropy encoding unit 23.

The entropy encoding unit 23 performs entropy encoding on the quantized coefficients supplied from the quantization unit 22, and outputs a code obtained thereby as an encoded image (encoded data). The image (encoded data) output from the entropy encoding unit 23 may undergo, for example, a rate control process, and be then packetized and recorded, or supplied to other devices (not shown) connected to the image encoding device 11.

The entropy encoding unit 23 encodes the quantized coefficients as described in the following. Thereby, the entropy encoding unit 23 realizes easier encoding.

The respective processing units of the wavelet transform unit 21 to the entropy encoding unit 23 perform processes at timing described below. Thereby, the image encoding device 11 realizes encoding at higher speed.

In addition, each processing unit encodes zero runs including quantized coefficients whose values are 0 together as described below. Thereby, the image encoding device 11 can improve encoding efficiency.

Next, entropy encoding performed by the entropy encoding unit 23 in FIG. 1 will be described with reference to FIG. 2 and FIG. 3.

Figure 2:
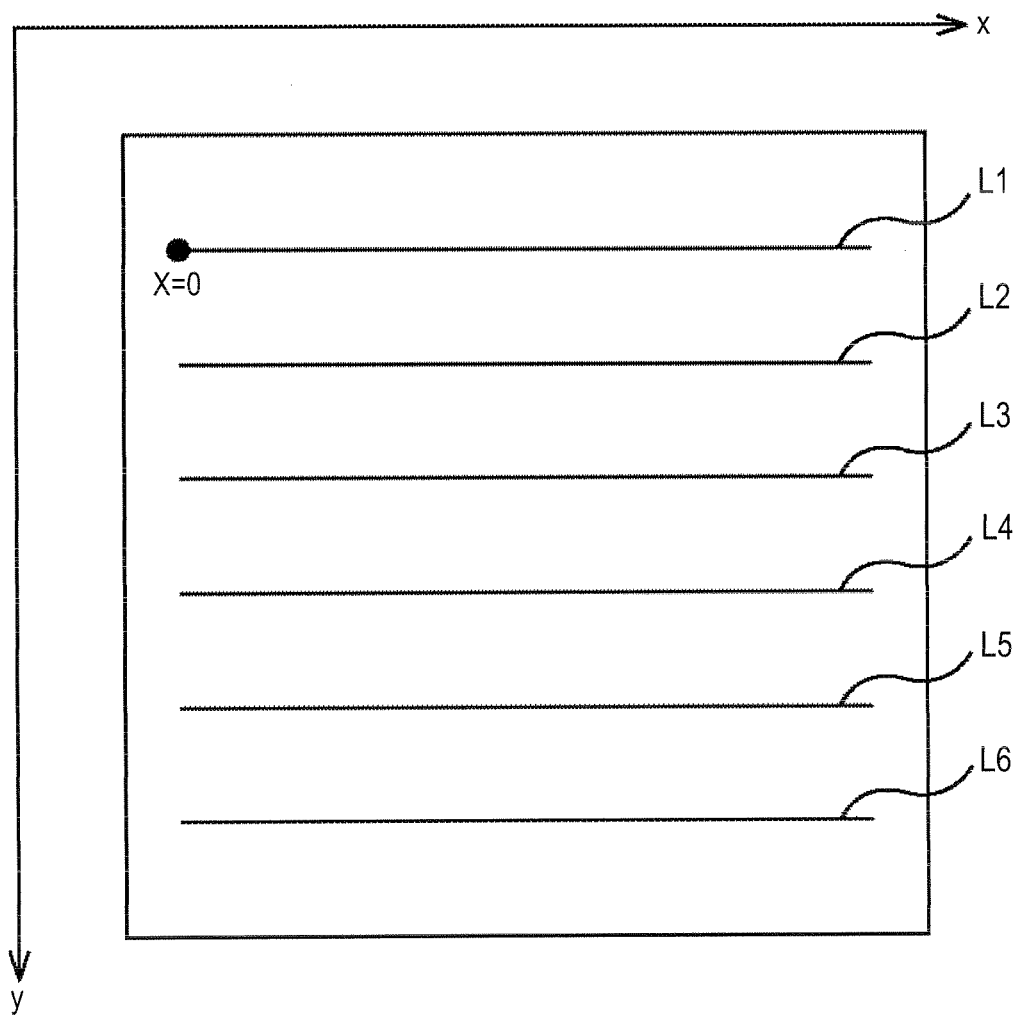
FIG. 2 is a diagram illustrating a sub-band.

FIG. 2 is a diagram illustrating a sub-band. For example, as shown in FIG. 2, a single sub-band includes six lines, a line L1 to a line L6, and a position corresponding to a pixel on the line in an xy coordinate system is set to (x,y). Here, the x coordinate at the left end position in each of the line in the figure is set to 0, and the y coordinate at the line L1 is set to 0.

Quantized coefficients in bit plane expression and at each position (x,y) for the sub-band are input in raster scan order from the line L1 to the line L6, from the quantization unit 22 to the entropy encoding unit 23.

In other words, first, a quantized coefficient corresponding to the left end position (0,0) of the line L1 is input to the entropy encoding unit 23. Next, a quantized coefficient corresponding to the position (1,0) adjacent to the right of the position (0,0) is input to the entropy encoding unit 23, and quantized coefficients corresponding to the positions adjacent to the right of the positions where quantized coefficients have been input are sequentially input to the entropy encoding unit 23 up to the position at the right end of the line L1.

When all the quantized coefficients at the positions on the line L1 are input, quantized coefficients corresponding to the respective positions on the line L2 are sequentially input to the entropy encoding unit 23 from the left end position (0,1) of line L2 sequentially to the right end position, and similarly, from the line L3 to the line L6, the quantized coefficients corresponding to the positions on each line are input to the entropy encoding unit 23.

For example, as shown on the upper left part of FIG. 3, when twelve quantized coefficients are input to the entropy encoding unit 23 in order from the left end position of the line L1 in FIG. 2, the entropy encoding unit 23 encodes a predetermined number W (W=4 in FIG. 3) of the quantized coefficients.

Here, in each of the quantized coefficients shown on the upper left part of FIG. 3, the absolute value of the code thereof is divided into binary digits (bit-plane expression), and, in the example shown in FIG. 3, the quantized coefficients "−0101", "+0011", "−0110", "+0010", "+0011", "+0110", "0000", "−0011", "+1101", "−0100", "+0111", and "−1010" of a single line (the line L1 in FIG. 2) are input in this order to the entropy encoding unit 23.

Each quantized coefficient includes a code of quantized coefficient expressed as "+" (positive) or "−" (negative) (hereinafter, referred to as a sign of the quantized coefficient), and an absolute value of the quantized coefficient expressed in binary. In FIG. 3, of the bits representing the values of the respective digits of the absolute value of the quantized coefficient, the bit on the top side in the figure represents the most significant bit (the bit of the most significant digit). Therefore, for example, in the quantized coefficient "−0101", the sign thereof is "−", and the absolute value expressed in binary is "0101", and thus the decimal representation of this quantized coefficient is "−5".

First, the entropy encoding unit 23 determines whether or not (the absolute values of) the quantized coefficients of one input line are all 0 (zero), and outputs a code indicating whether or not all the quantized coefficients of the line to be encoded hereafter are 0 in accordance with the determination result. If it is determined that the quantized coefficients are all 0, the entropy encoding unit 23 outputs 0 as a code indicating whether or not all the quantized coefficients of the line are 0, and finishes encoding of the quantized coefficients of the line which is currently performed. In addition, if it is determined that the values of all quantized coefficients are not 0 (not only quantized coefficients of 0), the entropy encoding unit 23 outputs 1 as a code indicating whether or not all the quantized coefficients of the line are 0.

When the twelve quantized coefficients shown on the upper left part of the figure are input, the quantized coefficients of the input line are not only 0, and thus the entropy encoding unit 23 outputs 1 as a code, as shown on the upper right of the figure.

After the code 1 indicating that the quantized coefficients are not all 0 is output as a code indicating whether or not all the quantized coefficients of the line are 0, the entropy encoding unit 23 performs encoding on the first four (W) quantized coefficients "−0101", "+0011", "−0110", and "+0010" which have been input.

The entropy encoding unit 23 compares the maximum number of significant digits of the four consecutive quantized coefficients input this time (the value of the variable B in FIG. 3) with the maximum number of significant digits of the four (W) quantized coefficients encoded (input) the previous time, determines whether or not the maximum number of significant digits has changed, and outputs a code indicating the maximum number of significant digits of the quantized coefficients.

Here, the maximum number of significant digits is the number of significant digits of the quantized coefficient having the greatest absolute value, of the four (W) quantized coefficients to be encoded together. In other words, the maximum number of significant digits indicates at which digit the 1 of the highest order is in the quantized coefficient having the greatest absolute value of the four quantized coefficients. Therefore, for example, the maximum number of significant digits of the four quantized coefficients "−0101", "+0011", "−0110", and "+0010", to be encoded together, is "3", which is the digit at which the highest order 1 is located in the quantized coefficient "−0110" having the greatest absolute value.

In addition, codes indicating the maximum number of significant digits of the quantized coefficients include a code indicating whether or not the maximum number of significant digits has changed, a code indicating whether the maximum number of significant digits has increased or decreased, and a code indicating an amount of change in the maximum number of significant digits, and in a case where the maximum number of significant digits has not changed, the code indicating whether the maximum number of significant digits has increased or decreased and the code indicating the amount of change in the maximum number of significant digits are not output.

In a case where the maximum number of significant digits has changed as a result of the comparison of the maximum number of significant digits, the entropy encoding unit 23 outputs a code 1 indicating that the maximum number of significant digits has changed, and in a case where the maximum number of significant digits has not changed, outputs a code 0 indicating that the maximum number of significant digits has not changed.

In addition, in a case of determining whether or not the maximum number of significant digits has changed, when the four quantized coefficients are input for the first time, that is, the quantized coefficients of the sub-band to be encoded are initially input (for example, when the four quantized coefficients are sequentially input from the left end of the line L1 in FIG. 2), no quantized coefficients of the sub-band have been encoded previously, and thus the maximum number of significant digits of the four (W) quantized coefficients encoded the previous time is set to 0.

Therefore, the entropy encoding unit 23 compares the maximum number 3 of significant digits, of the four quantized coefficients "−0101", "+0011", "−0110", and "+0010", input this time, with the maximum number 0 of significant digits of the four quantized coefficients encoded the previous time, and outputs a code 1 since the maximum number of significant digits has changed.

In addition, the entropy encoding unit 23 outputs a code indicating whether the maximum number of significant digits has increased or decreased, following the code 1 indicating that the maximum number of significant digits has changed. Here, the entropy encoding unit 23 outputs 0 in a case where the maximum number of significant digits has increased, and outputs 1 in a case where the maximum number of significant digits has decreased.

In a case of the example shown in FIG. 3, since the previous maximum number of significant digits is 0, and the current maximum number of significant digits is 3, as shown on the upper right part of the figure, the entropy encoding unit 23 outputs a code 0 indicating that the maximum number of significant digits has increased.

Further, when outputting the code indicating whether the maximum number of significant digits has increased or decreased, the entropy encoding unit 23 outputs a code indicating how much the maximum number of significant digits has increased or decreased, that is, a code indicating an amount of change in the maximum number of significant digits. Specifically, if an amount of change in the maximum number of significant digits (that is, an increase amount or a decrease amount) is set as n, the entropy encoding unit 23 outputs (n−1) code 0s, and outputs a code 1 following these 0s.

In the case of encoding the first four quantized coefficients shown in FIG. 3, since an amount of change in the maximum number of significant digits is 3 (=3−0), the entropy encoding unit 23 outputs two (=3−1) 0s and further outputs 1, as codes.

Next, the entropy encoding unit 23 outputs codes for the maximum number of significant digits indicating the absolute value of each of the four (W) quantized coefficients to be encoded this time. That is to say, in relation to each quantized coefficient, the entropy encoding unit 23 outputs a code indicating a value of each digit of an absolute value of the quantized coefficient, from the greatest digit of the significant digits indicated by the maximum number of significant digits to the smallest digit in order.

The quantized coefficients to be encoded this time are "−0101", "+0011", "−0110", and "+0010", and thus the entropy encoding unit 23 first outputs a code for the maximum number of significant digits indicating the absolute value of the quantized coefficient "−0101" input first. Here, the current maximum number of significant digits is 3, and thus the entropy encoding unit 23 outputs the value "1" of the greatest digit (that is, the third digit) of the significant digits indicated by the maximum number of significant digits of the quantized coefficient "−0101", the value "0" (the second digit) of the digit one smaller than the greatest digit, and the value "1" for the lowest order digit. Thus, the code "101" for the number of the significant digits indicating the absolute value of the quantized coefficient "−0101" is output.

Similarly, the entropy encoding unit 23 sequentially outputs codes "011", "110", and "010", for the numbers of significant digits respectively indicating the absolute values of the quantized coefficients "+0011", "−0110", and "+0010". Therefore, in relation to the quantized coefficients, "101011110010" is output as the code for the maximum number of significant digits indicating the absolute value of each of "−0101", "+0011", "−0110", and "+0010". In this way, the entropy encoding unit 23 outputs a code with a length corresponding to the maximum number of significant digits of the four quantized coefficients to be encoded, as a code indicating the absolute values of the quantized coefficients.

Finally, the entropy encoding unit 23 outputs a code indicating a sign of each of the four (W) quantized coefficients whose absolute value is not 0. Here, in a case where a sign of the quantized coefficient is "+" (positive), the entropy encoding unit 23 outputs the code 0, and in a case where the sign of the quantized coefficient is "−" (negative), outputs the code 1.

Since the quantized coefficients to be encoded this time are "−0101", "+0011", "−0110", and "+0010", and the signs of the quantized coefficients are sequentially negative, positive, negative, positive, as shown on the upper right part of the figure, the entropy encoding unit 23 outputs "1010" as a code indicating the signs of the respective quantized coefficients.

When the four quantized coefficients which have been first input are encoded, the entropy encoding unit 23 next encodes the following consecutive four quantized coefficients "+0011", "+0110", "0000", and "−0011".

In the same manner as the case of encoding the quantized coefficients input first (the previous time), the entropy encoding unit 23 first compares the maximum number of significant digits of the four (W) quantized coefficients newly input this time, with the maximum number of significant digits of the four (W) quantized coefficient encoded the previous time.

The maximum number of significant digits of the four (W) quantized coefficients input this time, "+0011", "+0110", "0000", and "−0011", is "3", which is the digit at which the highest order 1 is located in the quantized coefficient "+0110" having the greatest absolute value, and this is the same as the maximum number 3 of significant digits of the quantized coefficients encoded the previous time, and thus the entropy encoding unit 23 outputs the code 0 indicating that the maximum number of significant digits has not changed.

Next, the entropy encoding unit 23 outputs the code "011110000011" where the code for the maximum number of significant digits "011", "110", "000" and "011", indicating the absolute values of the respective four (W) quantized coefficients "+0011", "+0110", "0000", and "−0011" to be encoded this time, have been arranged in order.

Further, when the code indicating the absolute values of the quantized coefficients is output, the entropy encoding unit 23 outputs a code indicating a sign of each of the four quantized coefficients whose absolute value is not 0.

Since the quantized coefficients to be encoded this time are "+0011", "+0110", "0000", and "−0011", and the third quantized coefficient "0000" has an absolute value of 0, the entropy encoding unit 23 outputs the code "001" indicating the signs of these quantized coefficients, which are not 0, "+0011", "+0110", and "−0011" (positive, positive, and negative).

When the four quantized coefficients "+0011", "+0110", "0000", and "−0011" are encoded, the entropy encoding unit 23 encodes the following four quantized coefficients "+1101", "−0100", "+0111", and "−0101".

First, the entropy encoding unit 23 compares the maximum number of significant digits of the four (W) quantized coefficients newly input this time, with the maximum number of significant digits of the four quantized coefficients encoded the previous time.

Since the maximum number of significant digits of the four (W) quantized coefficients input this time, "+1101", "−0100", "+0111", and "−0101", is "4", which is the digit at which the highest order 1 is located in the quantized coefficient "+1101" having the greatest absolute value and is the different from the maximum number "3" of significant digits of the quantized coefficients encoded the previous time, the entropy encoding unit 23 outputs the code 1 indicating that the maximum number of significant digits has changed.

In addition, since the previous maximum number of significant digits is 3, and the maximum number of significant digits this time is 4, the entropy encoding unit 23 outputs the code 0 indicating that the maximum number of significant digits has increased, as shown on the right part of the figure.

Further, the entropy encoding unit 23 outputs a code indicating how much the maximum number of significant digits has increased or decreased. In this case, since an amount of change in the maximum number of significant digits is 1 (=4−3), the entropy encoding unit 23 outputs 0 (=1−1) zeroes as a code, and further outputs 1 (that is, outputs the code 1).

Next, the entropy encoding unit 23 outputs the code "1101010001111010" where the codes for the maximum number of significant digits "1101", "0100", "0111", and "1010", indicating the absolute values of the respective four (W) quantized coefficients "+1101", "−0100", "+0111", and "−1010" to be encoded this time are arranged in order.

In addition, when the code indicating the absolute values of the quantized coefficients is output, the entropy encoding unit 23 outputs a code indicating the sign of each of the four quantized coefficients whose quantized coefficient is not 0.

Since the quantized coefficients to be encoded this time are "+1101", "−0100", "+0111", and "−1010", and the signs of these quantized coefficients are, in order, positive, negative, positive, and negative, as shown on the lower right part of the figure, the entropy encoding unit 23 outputs "0101" as a code indicating the signs of the respective quantized coefficients.

In this way, the entropy encoding unit 23 encodes a predetermined number (W) of input consecutive quantized coefficients. Thereby, when the code indicating whether or not all the quantized coefficients of the line to be encoded are 0 is output, and the code indicating that all the quantized coefficients of the line are not 0 is output, from the entropy encoding unit 23, next, a code indicating the maximum number of significant digits of the W quantized coefficients, a code indicating absolute values (bit-plane expression) of the W quantized coefficients, and a code indicating signs of the quantized coefficients, are output.

In relation to the code indicating the maximum number of significant digits of these W quantized coefficients, the code indicating absolute values of the W quantized coefficients, and the code indicating signs of the quantized coefficients, a code indicating the maximum number of significant digits of the next W quantized coefficients, a code indicating absolute values of the quantized coefficients, and a code indicating signs of the quantized coefficients, are repeatedly output, until all quantized coefficients of the line are encoded.

In addition, the description has been made that the quantized coefficients are encoded in raster scan order, but the order in which the quantized coefficients are encoded does not necessarily have to be in raster scan order. For example, in the case where the quantized coefficients of the sub-band shown in FIG. 2 are encoded, quantized coefficients at four positions vertically arranged in the figure may be set as the W quantized coefficients, and the W quantized coefficients may be sequentially encoded, such as the quantized coefficients at the positions (0,0), (0,1), (0,2), and (0,3) (that is, the left end positions of the respective line L1 to line L4 in the figure) being encoded, and then the quantized coefficients at the positions (1,0), (1,1), (1,2), and (1,3) being encoded.

In this way, the entropy encoding unit 23 encodes a predetermined number of quantized coefficients of the sub-band together, and outputs a code indicating the maximum number of significant digits of the quantized coefficients, a code indicating absolute values of the quantized coefficients, and a code indicating signs of the quantized coefficients.

As such, by encoding a predetermined number of quantized coefficients of the sub-band together, for example, unlike in a case of encoding an image using the JPEG 2000 method, it is not necessary to perform a plurality of processes for each bit plane on the basis of a plurality of coding paths, and it is possible to considerably reduce a processing amount in encoding since the variable length encoding is performed. Thereby, it is possible to perform encoding of an image at higher speed and to thereby realize an encoding device for encoding a high definition image in real time at low costs.

Further, since, in the image encoding device 11, it is not necessary to explicitly encode the length of a code in a case of encoding an image, an amount of codes can be reduced, and thus it is not necessary to manage information regarding the length of a code.

Although, it has been described above that, of the W quantized coefficients, the number of significant digits of a quantized coefficient having the greatest absolute value is set as a value of the variable Bnew indicating the maximum number of significant digits, the value of the variable Bnew may be a value equal to or greater than the number of significant digits of a quantized coefficient having the greatest absolute value of the W quantized coefficients. If the value of the variable Bnew becomes greater, a code amount for a code indicating absolute values of the quantized coefficients increases, but the code amount for a code indicating the maximum number of significant digits of the quantized coefficients can be reduced by setting the value of the variable Bnew to a value equal to or greater than the number of significant digits of the quantized coefficient having the greatest absolute value.

[Zero Run Process 1]

In a case of the above-described encoding method, if all quantized coefficients of a line to be processed are not 0, a quantized coefficient whose value is 0 is also processed in the same manner as in a case of a quantized coefficient whose value is not 0. However, quantized coefficients whose value is 0 tend to concentrate locally and appear continuously in most cases.

Therefore, the entropy encoding unit 23 encodes a portion (also referred to as a zero run length or zero runs) where these quantized coefficients whose value is 0 continuously appear together. In this way, the entropy encoding unit 23 can encode the zero run length (zero runs) portion more efficiently than in a case of encoding a set of quantized coefficients whose value is not 0. That is to say, the entropy encoding unit 23 can improve encoding efficiency regarding encoding of coefficient data having many 0s.

Hereinafter, a description thereof will be made in more detail. FIG. 4 is a diagram illustrating an example of the zero run encoding.

For example, as shown on the upper part of FIG. 4, sets of four (W) quantized coefficients are assumed as M consecutive sets in a line which is a process target. The line which is a process target includes quantized coefficients whose value is not 0, and thus an initial code becomes 1.

In FIG. 4, since the maximum number of significant digits of a set of four (W) quantized coefficients initially processed at the leftmost is 3, next, the code 1 indicating that the maximum number B of significant digits "has changed (diff)" from the initial value 0 is output. Next, the code 0 indicating that "B increases (plus)" is output.

Since the value of the maximum number B of significant digits increases (increment 3) from 0 to 3, then, two codes (increment 3−1) 0 are output, and, next, the code 1 indicating the terminal end (enough) of the change is output. That is to say, the code 1 is detected, and thereby a value of the changed maximum number B of significant digits is determined.

In addition, the code "101011110010" for the maximum number of significant digits indicating absolute values of the respective four (W) quantized coefficients "−0101", "+0011", "−0110", and "+0010" to be encoded this time, is output.

Further, the code "1010" indicating signs (+ or −) of the quantized coefficients which are not 0 of the four (W) quantized coefficients to be encoded this time, is output.

In addition, an encoding process target is transferred to a set of the next four (W) quantized coefficients. As shown in FIG. 4, in a set of four (W) quantized coefficients at the second location from the left, values of the quantized coefficients are all 0. In other words, a value of the maximum number B of significant digits is 0. In addition, sets whose maximum number B of significant digits is 0 are M consecutive sets (zero run length M) (where M is any natural number).

The entropy encoding unit 23 encodes these zero runs (zero run length) together as follows.

First, in the same manner as a case of a set where the maximum number B of significant digits is not 0, since the maximum number B of significant digits has changed from a value (for example, 3) other than 0 to 0, the code 1 indicating that the maximum number B of significant digits "has changed (diff))" is output. Next, the code 1 indicating that "B decreases (minus)" is output.

Next, since a value of the maximum number B of significant digits decreases (decrement 3) from 3 to 0, then, two codes (decrement 3−1) 0 are output.

Here, the code 1 indicating the terminal end (enough) of the change may be output in the same manner as the previous set, but, this set has 0 as a value whose maximum number B of significant digits has changed, and thus outputting of the code 1 indicating the terminal end (enough) of the change may be omitted.

It is clear from the codes (in FIG. 4, two codes 0) indicating the decrement of the maximum number B of significant digits that a value of the maximum number B of significant digits becomes 0. The minimum value of the maximum number B of significant digits is 0 and does not decrease any longer. In other words, a value whose maximum number B of significant digits has changed is fixed to 0 using the two codes 0.

Therefore, in a case where a value whose maximum number B of significant digits has changed is 0, the code 1 indicating the terminal end (enough) of the change is unnecessary and thus may be omitted. In this way, the entropy encoding unit 23 can reduce a code amount as much as omitting outputting of the code 1. In other words, the entropy encoding unit 23 can improve encoding efficiency.

Next, a code indicating the zero runs is output. The code indicating the zero runs is set by arranging a single code 1 after codes 0 corresponding to a value obtained by subtracting 1 from the number N of digits when the length M (sets) of the zero runs (zero run length) is expressed in binary and further by arranging values of the respective digits other than the most significant bit of the zero run length in binary expression for fixing binary of N digits.

In addition, the reason why the code does not include the most significant bit is that a value thereof is necessarily 1. In other words, it can be said that a code in which the binary expression of the zero run length is arranged after (N−1) codes 0 is a code indicating the zero runs. That is to say, this encoding can be easily realized by shifting the binary expression of the zero run length by (the number of digits of the zero run length−1).

For example, the entropy encoding unit 23 stores a table (table information) as shown in FIG. 5 in advance for each zero run length. The entropy encoding unit 23 obtains the length M of zero runs (zero run length), selects a code corresponding to M using the table information of FIG. 5, and outputs the code.

In addition, in FIG. 5, the comma (,) is provided in the codes for convenience of description, but the comma is not included in practical codes.

As above, the entropy encoding unit 23 can encode zero runs together with high efficiency. That is to say, the entropy encoding unit 23 can improve encoding efficiency of encoding of coefficient data having many 0s.

When the zero runs are encoded as described above, a process target is transferred to a set of four (W) quantized coefficients located at the rightmost of FIG. 4.

The maximum number B of significant digits of this set is 4. Therefore, a code indicating the maximum number B of significant digits is output. However, here, since a value of the maximum number B of significant digits has changed from 0 to 4, the code 1 indicating that the maximum number B of significant digits "has changed (diff)" may be output or the code 0 indicating that "B increases (plus)" may be output, but, since the maximum number B of significant digits of the previous set is 0, outputting of these codes may be omitted.

Since the minimum value of the maximum number B of significant digits is 0, in a case where the maximum number B of significant digits of the previous set is 0, it is clear that the change in the maximum number B of significant digits of this set which is a process target is in an increase direction. In addition, if the maximum number B of significant digits of this set does not change (is maintained to be 0), this set is also included in the zero runs, and thus a code indicating the maximum number B of significant digits is not output.

Therefore, in a case where the maximum number B of significant digits of this set is not 0, and the maximum number B of significant digits of the previous set is 0, outputting of the code 1 indicating that the maximum number B of significant digits "has changed (diff)" or outputting of the code 0 indicating that "B increases (plus)" may be omitted. In this way, the entropy encoding unit 23 can reduce a code amount as much as omitting outputting of the codes. In other words, the entropy encoding unit 23 can improve encoding efficiency.

Next, since a value of the maximum number B of significant digits increases (increment 4) from 0 to 4, then, three codes (increment 4−1) 0 are output, and, next, the code 1 indicating the terminal end (enough) of the change is output. In other words, the code 1 is detected, and thereby a value whose maximum number B of significant digits has changed is determined.

In addition, the code "1101010001111010" for the maximum number of significant digits indicating absolute values of the respective four (W) quantized coefficients "+1101", "−0100", "+0111", and "−1010" to be encoded this time, is output.

Further, the code "0101" indicating signs (+ or −) of the quantized coefficients which are not 0 of the four (W) quantized coefficients to be encoded this time, is output.

[Zero Run Process of Terminal End]

In addition, in a case where zero runs continue to the end (right end) of the line, for example, as follows, a shorter code may be used, thereby reducing a code amount.

FIG. 6 is a diagram illustrating another example of zero run encoding. As in the example shown in FIG. 6, in a case where the zero runs continue to the end, it is clear that the terminal end of the zero runs is the end of the line, and thus a code (a code indicating the maximum number B of significant digits) indicating the terminal end is not necessary.

In other words, in the above-described code indicating zero runs, if (N−1) codes 0 are greater than the number of sets (the number of sets from a set of a current process target to the last set of the line) which are not processed in a process target line, it is clear that zero runs continue to the end of the line.

Therefore, as in the example of FIG. 6, in a case where zero runs continue to the end, a code where the code 1 is arranged after the codes 0 of the number of digits of (binary expression of the zero run length M−1) is output as a code indicating the zero runs, and the encoding of the line finishes at that moment.

For example, the entropy encoding unit 23 stores a table (table information) as shown in FIG. 7 in advance for each zero run length which continues to the end of the line. The entropy encoding unit 23 obtains the length M of the zero runs (zero run length), and, when it is determined that the zero runs continue to the end of the line, selects a code corresponding to M using the table information of FIG. 7, and outputs the code.

In this way, as compared with the example of FIG. 4, it is possible to reduce a code amount of codes indicating zero runs. In addition, it is possible to omit a code indicating the maximum number B of significant digits thereafter. Therefore, the entropy encoding unit 23 can further improve encoding efficiency.

In addition, in a code indicating these zero runs, it is clear from the number of codes 0 that the zero runs continue to the end of the line. Therefore, in the code indicating the zero runs, for example, as shown in FIG. 8, the code 1 subsequent to the codes 0 of the number of digits of (binary expression of the zero run length M−1) may be omitted.

For example, the entropy encoding unit 23 stores a table (table information) as shown in FIG. 9 in advance for each zero run length which is continuously located to the end of the line. The entropy encoding unit 23 obtains the length M of the zero runs (zero run length), and, when it is determined that the zero runs continue to the end of the line, selects a code corresponding to M using the table information of FIG. 9, and outputs the code.

In this way, as compared with the example of FIG. 6, it is possible to reduce a code amount of codes indicating zero runs. Therefore, the entropy encoding unit 23 can further improve encoding efficiency.

[Non-Pipeline Process]

Figure 10:
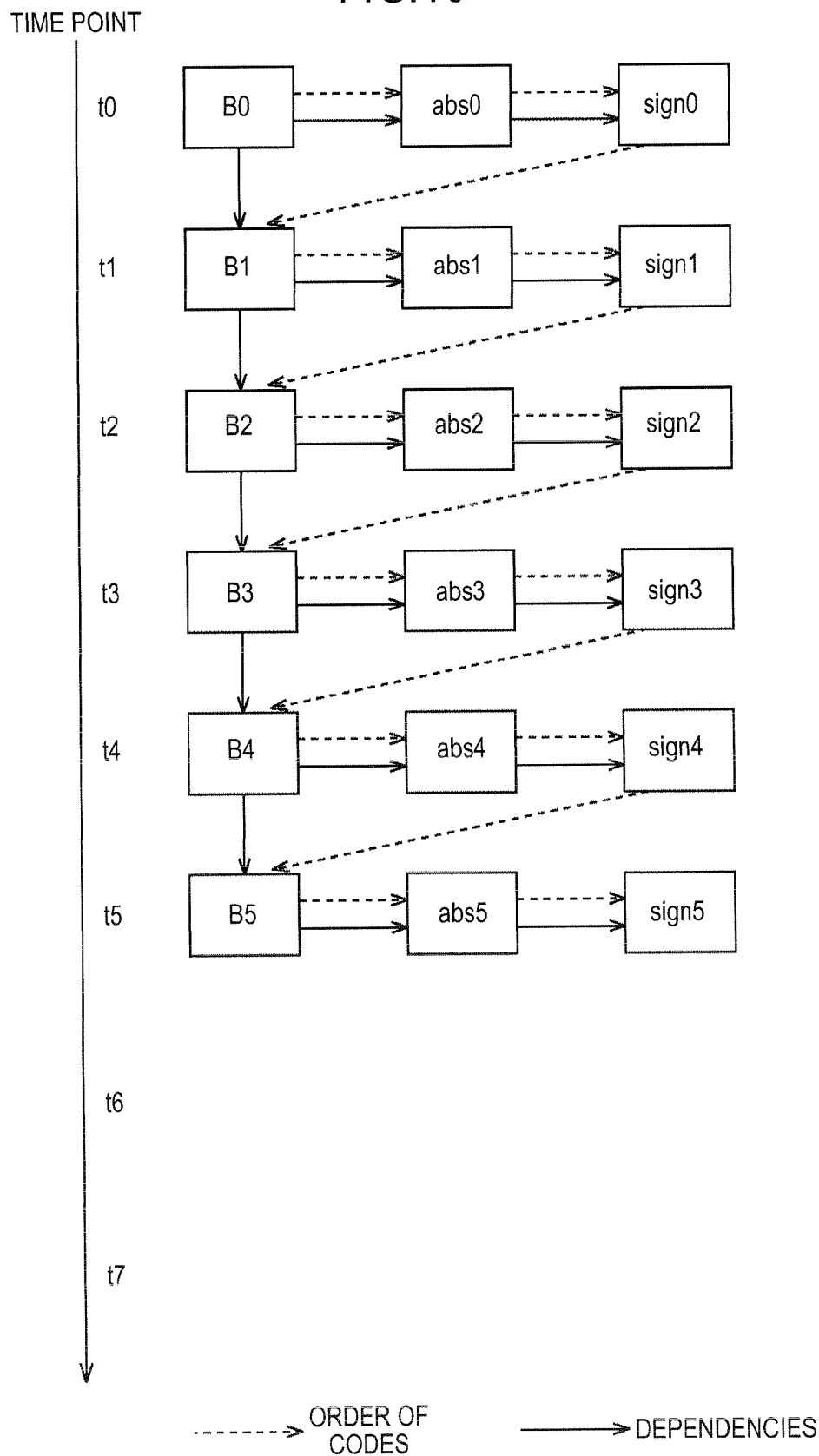
FIG. 10 is a diagram illustrating an example of the timing chart in a case where a pipeline process is not performed.

However, in a case of the above-described encoding and decoding methods, W quantized coefficients are designated as a set, and, for each set, encoding of the maximum number of significant digits, encoding of absolute values, and encoding of codes (signs) indicating positive and negative polarities thereof are sequentially performed as in an example shown in FIG. 10.

FIG. 10 is a timing chart of each process element of an encoding process or a decoding process. In FIG. 10, the arrows of time points indicate a time series. Further, t0 to t7 indicate time points. In addition, each rectangle indicates a process element in the encoding process.

In addition, Bi (hereinafter, also referred to as B(i)) indicates that an encoding process or a decoding process for the maximum number of significant digits of a (i+1)-th set (processed in the (i+1)-th order) from a head of a process target line when W quantized coefficients is designated as a set. Further, the variable i is an integer of 0 or more. In addition, absi (hereinafter, also referred to as A(i)) indicates an encoding process or a decoding process for an absolute value of each quantized coefficient of a (i+1)-th set (processed in the (i+1)-th order) from the left of the process target line when W quantized coefficients are used as a set. Furthermore, signi (hereinafter, also referred to as S(i)) indicates an encoding process or a decoding process for a code (sign) of each quantized coefficient of the (i+1)-th set (processed in the (i+1)-th order) from the left of the process target line when W quantized coefficients are designated as a set.

In addition, in FIG. 10, the dotted arrows indicate an order of codes to be arranged in the respective process elements of the encoding process in encoded data. In other words, results of the respective process elements in the encoding process may be arranged in order of B(i), A(i) and S(i). In a case of the example of FIG. 10, codes are output in order of B0, abs0, sign0, B1, abs1, sign1, B2, abs2, sign2, . . . .

[Zero Run Process of Non-Pipeline Process]

In other words, codes of the respective process elements are arranged as follows (FIG. 11A).

. . . B(3) A(3) S(3) B(4) A(4) S(4) B(5) A(5) S(5) B(6) A(6) S(6) . . .

Here, if B(4)=B(5)=0, codes of A(4), S(4), A(5) and S(5) are canceled (codes of the length 0). If the code of the length 0 is indicated by −, the following is given (FIG. 11B).

. . . B(3) A(3) S(3) B(4) − − B(5) − − B(6) A(6) S(6) . . .

When encoding is performed on the portion of B(4), B(5) and B(6) according to the above-described zero run rule, B(4), B(5) and B(6) are replaced with codes including diff, minus, more*, and enough together. In other words, since B(4), B(5), and B(6) are continuously arranged, the above-described codes (diff, minus, more*, and enough) of B(4), B(5), and B(6) are output at cycle6 when the zero run length is fixed in a case of the encoding (FIG. 11C).

On the other hand, in a case of the decoding, the codes (diff, minus, more*, and enough) of B(4), B(5) and B(6) are decoded at cycle4 when B(4), B(5) and B(6) start (FIG. 11D).

[Restriction in Non-Pipeline Process]

In the decoding process, acquired encoded data is sequentially decoded. In other words, the respective process elements in the decoding process are performed in an order of codes to be arranged. For this reason, the following restriction is applied in order to execute the respective process elements in the decoding process.

Executed process→necessary information

Cue of B(i+1)→head of S(i), length of S(i)

Decoding of B(i+1)→decoding result of B(i)

Cue of A(i+1)→head of B(i+1), <length of B(i+1)>

Decoding of A(i+1)→<decoding result of B(i+1)>

Cue of S(i+1)→<head of A(i+1)>, <decoding result of B(i+1)>

Decoding of S(i+1)→<decoding result of A(i+1)>

In other words, it is necessary to obtain encoded data of an absolute value from the encoded data in order to decode the absolute value, and, for this, it is necessary to clarify a terminal end position of encoded data of the maximum number of significant digits. For this reason, before the absolute value is decoded, it is necessary to clarify a leading position of the encoded data of the maximum number of significant digits and the code length. In addition, since the encoded data of an absolute value is generated using an absolute value for the maximum number of significant digits, information on the maximum number of significant digits is necessary to decode an absolute value.

Further, it is necessary to obtain encoded data of a sign from the encoded data in order to decode the sign (code of positive or negative), and, for this, it is necessary to clarify a terminal end position of the encoded data of the absolute value. For this reason, before the sign is decoded, it is necessary to clarify a leading position of the encoded data of the absolute value and the code length. In addition, in a case where an absolute value is 0, there is no encoded data of a sign, and thus information on an absolute value of each quantized coefficient is necessary to decode a sign.

However, at the time point when decoding of B(i), A(i), and S(i) which start at the timing (the time point ti) before just one time point from the time point t(i+1) is completed, information surrounded by < > in the above-described necessary information is still unclear.

In other words, at the time point when decoding of B(i), A(i), and S(i) is completed, it can be seen that:
  information for starting decoding of B(i+1) has been provided
  in order to start decoding of A(i+1), it is necessary to wait for decoding of B(i+1) to be completed, and
  in order to start decoding of S(i+1), it is necessary to wait for decoding of A(i+1) to be completed.

In other words, in the decoding process, there are dependencies as indicated by the solid arrows of FIG. 10. Therefore, the respective process elements B, A, and S are necessary to be processed in order and thus may not be processed in parallel.

For example, in FIG. 10, since a process result of B2 is necessary in order to execute a process of abs2, a process may not start using process results of B1, abs1, and sign1 (processes starting at the time point t1 before one time point) at the time point t2.

Further, for example, in FIG. 10, since a process result of abs3 is necessary in order to execute a process of sign3, a process may not start using process results of B2, abs2, and sign2 (processes starting at the time point t2 before one time point) at the time point t3.

[Pipeline Process 1]

Figure 12:
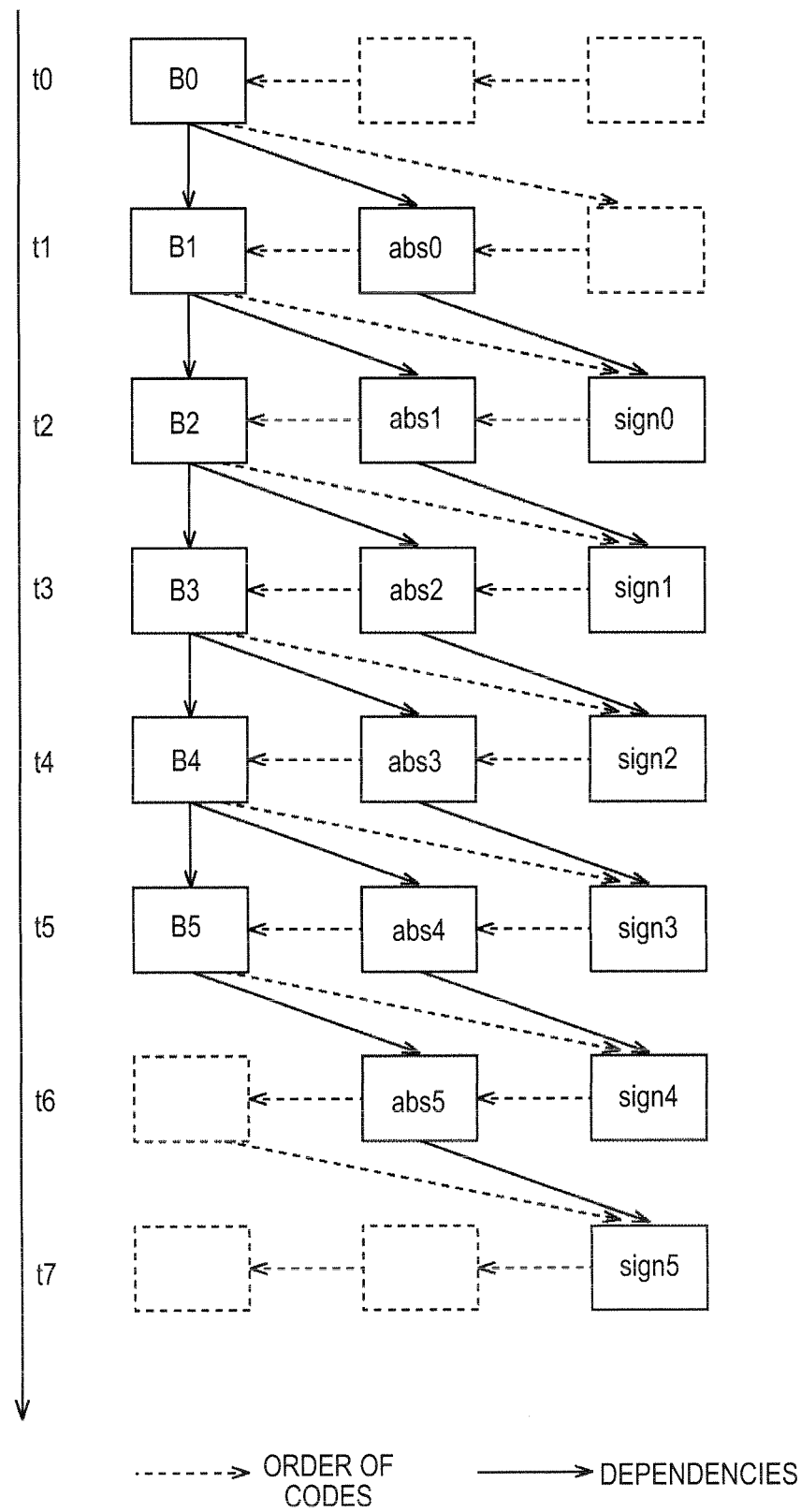
FIG. 12 is a diagram illustrating an example of the timing chart in a case where the pipeline process is performed.

Therefore, for example, as shown in FIG. 12, the respective process elements (B (i), A(i) and S(i)) of a decoding process for a set are made to be executed (started) at different timings (time points). In other words, each of the process elements (B, A, and S) of the decoding process is executed as in a pipeline process. That is to say, the respective process elements (B, A, and S) of the decoding process can be made to be executed in parallel.

FIG. 12 is a diagram illustrating an example of the timing chart indicating an execution timing of each process element in a case of performing a pipeline process.

In a case of the example shown in FIG. 12, an execution timing of the decoding process A(i) of an absolute value is delayed further by a set than an execution timing of the decoding process B(i) of the maximum number of significant digits. In addition, an execution timing of the decoding process S(i) of a code (sign) is delayed further by two sets than an execution timing of the decoding process B(i) of the maximum number of significant digits.

In other words, for example, at the time point t(i+2), the decoding process S(i) of a code (sign) of an i-th set, the decoding process A(i+1) of an absolute value of a (i+1)-th set, and the decoding process B(i+2) of the maximum number of significant digits of a (i+2)-th set, are executed, and, then, at the time point t (i+3), the decoding process S(i+1) of a code (sign) of the (i+1)-th set, the decoding process A(i+2) of an absolute value of the (i+2)-th set, and the decoding process B(i+3) of the maximum number of significant digits of a (i+3)-th set, are executed.

In other words, in the encoded data, the respective encoding process results (encoded data) of the process elements B, A, and S starting at the same time point may be arranged in order of S, A, and B.

In this way, a restriction for executing the respective process elements of the decoding process in this case is as follows.

Executed process→necessary information
Cue of S(i+1)→head of B(i+2), length of B(i+2)
Decoding of S(i+1)→decoding result of A(i+1)
Cue of A(i+2)→head of S(i+1), length of S(i+1) calculated from decoding result of A(i+1)
Decoding of A(i+2)→decoding result of B(i+2)
Cue of B(i+3)→head of A(i+2), length of A(i+2) from decoding result of B(i+2)
Decoding of B(i+3)→decoding result of B(i+2)

In other words, in this case, in any process, necessary information is all provided at a time point when a process starting at a time point before one time point finishes. Therefore, any process element of a decoding process for a set which is a process target can be started at the current time point.

That is to say, the dependencies between the respective process elements in the decoding process have a relationship as indicated by the solid arrows of FIG. 12. Therefore, since the dependencies between the respective process elements B, A, and S for a set are canceled, they can be processed in parallel. Accordingly, it is possible to improve throughput of the decoding process.

Further, since the decoding process is performed in this way, encoding process results (encoded data) of the respective process elements B, A, and S starting at the same time point may be arranged in order of S, A, and B in the encoded data. In order to realize this arrangement without performing a rearranging process which increases a process time, the encoding process may be performed in the same procedures. In other words, encoding is also performed in these procedures in the encoding process, and thereby it is possible to improve throughput of the encoding process in the same manner as the decoding process.

In a case of hardware, different circuits are used for the respective process elements even in a case of sequentially processing B, A, and S as in the example shown in FIG. 10. For this reason, it is possible to realize a parallel process for high speed as described above without increasing a circuit scale.

in addition, in a case of software, it is possible to effectively use a vacant time of the pipeline process of a CPU which is present after starting a process of B until a result related to B is provided, after starting a process of A until a result related to A is provided, and the like.

[Zero Run Process of Pipeline Process 1]

In a case of introducing the above-described process, codes of the respective process elements are arranged as follows (FIG. 13A).

. . . S(2) A(3) B(4) S(3) A(4) B(5) S(4) A(5) B(6) S(5) A(6) B(7) . . .

Here, if B(4)=B(5)=0, codes of A(4), S(4), A(5) and S(5) are canceled (codes of the length 0). If the code of the length 0 is indicated by –, the following is given (FIG. 13B).

. . . S(2) A(3) B(4) S(3) – B(5) – – B(6) – A(6) B(7) . . .

When encoding is performed on the portion of B(4), B(5) and B(6) according to the above-described zero run rule, in this case, since there is S(3) between B(4) and B(5), it is difficult to replace B(4), B(5), and B(6) with codes including diff, minus, more*, and enough together.

For example, in a case of encoding, since a zero run length is determined after it is found that B in B(6) is not 0, a code indicating zero runs is not fixed except for the timing of B(6). For this reason, a position of the code indicating zero runs is located after S(3) (FIG. 13C).

In contrast, in a case of decoding, unless a value of B is decoded at the timing of B(4) earlier than that of S(3) it is not found how A(4) is treated. For this reason, a code indicating zero runs is necessary before S(3) (FIG. 13D). As above, there is a concern that it will be difficult to perform sequential decoding if fit to a case of the encoding.

[Pipeline Process 2]

Figure 14:
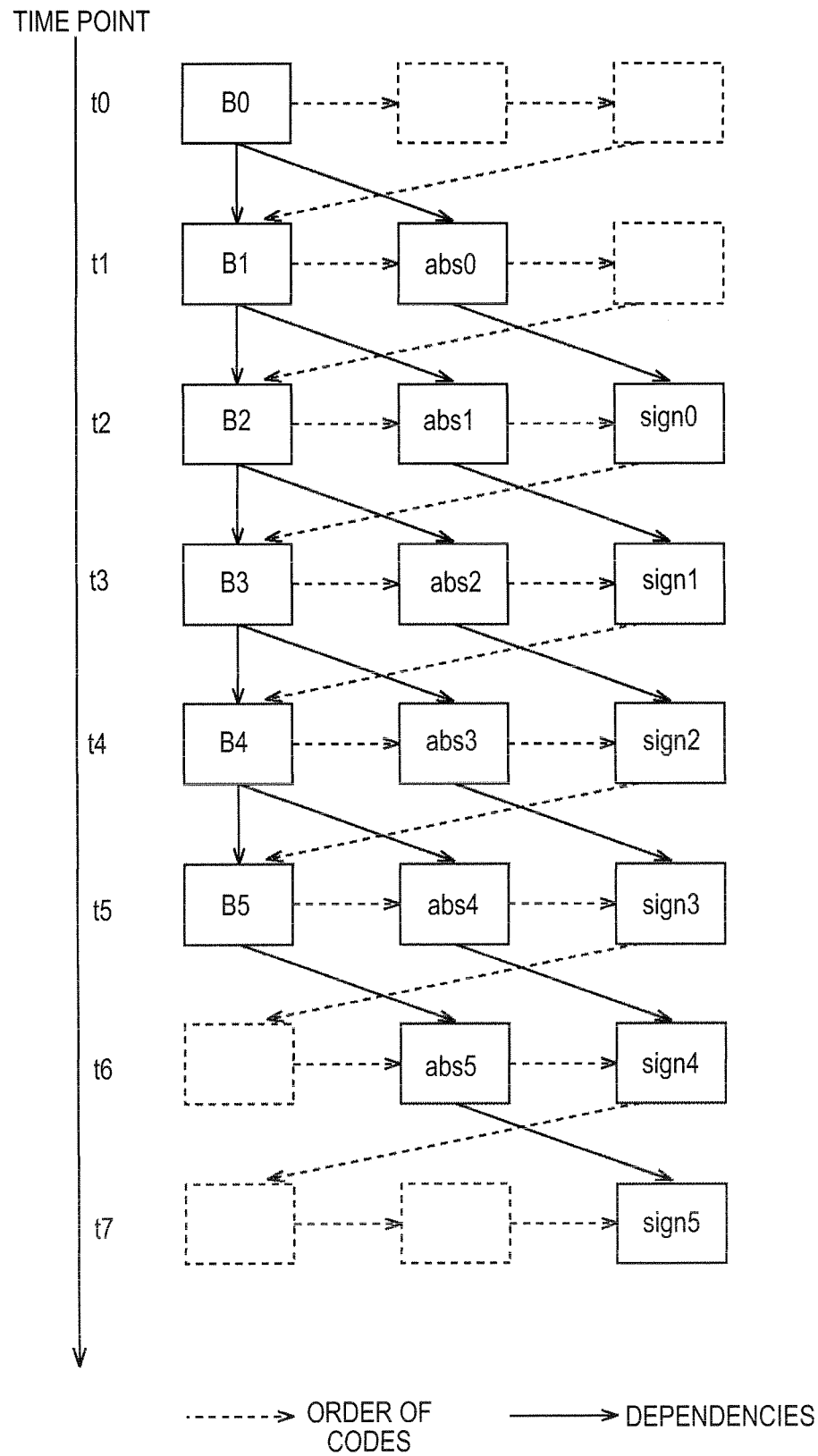
FIG. 14 is a diagram illustrating an example of the code orders in the pipeline process.

In addition, other pipeline process forms are possible. FIG. 14 is a diagram illustrating another example of the timing chart of a case where a pipeline process is performed.

For example, as shown in FIG. 14, in the encoded data, the codes B, A and S of the respective process elements starting at the same time point may be arranged in order of B, A, and S. Even if the encoded data is arranged in this way, information necessary for execution of the respective process elements B (i+3), A (i+2) and S(i+1) is provided at the time point t(i+3) in the same manner as the case of FIG. 12. Therefore, at the time point t(i+3), the respective process elements B(i+3), A(i+2) and S(i+1) can be executed in parallel. In other words, in the same manner as the case of FIG. 12, it is possible to improve throughput of the encoding process or the decoding process.

[Zero Run Process of Pipeline Process 2]

In a case of introducing the above-described process, codes of the respective process elements are arranged as follows.

. . . B(4) A(3) S(2) B(5) A(4) S(3) B(6) A(5) S(4) B(7) A(6) S(5) B(8) A(7) S(6) . . .

Here, if B(4)=B(5)=0, codes of A(4), S(4), A(5), and S(5) are canceled (codes of the length 0). If the code of the length 0 is indicated by –, the following is given.

. . . B(4) A(3) S(2) B(5) – S(3) B(6) – – B(7) A(6) – B(8) A(7) S(6) . . .

When encoding is performed on the portion of B(4), B(5), and B(6) according to the above-described zero run rule, in this case, since there are S(3) and S(2) between B(4) and B(5), it is difficult to replace B(4), B(5), and B(6) with codes including diff, minus, more*, and enough together.

For example, in a case of encoding, since a zero run length is determined after it is found that B in B(6) is not 0, a code indicating zero runs is not fixed except for the timing of B(6). For this reason, a position of the code indicating zero runs is located after S(3) or S(2).

In contrast, in a case of decoding, unless a value of B is decoded at the timing of B(4) earlier than that of S(3), it is not found how A(4) is treated. For this reason, a code indicating zero runs is necessary before S(3). As above, in this case as well, there is a concern that it will be difficult to perform sequential decoding if fit to a case of the encoding.

[Zero Run Process Corresponding to Pipeline Process]

Therefore, as in an example shown in FIG. 15A, the codes of B(4), B(5), and B(6) are divided and arranged before and after S(3). That is to say, diff, minus, and more* are arranged (disposed) before S(3), and a zero run length code, more*, and enough are arranged (disposed) after S(3).

In this way, in a case of encoding, as in the example shown in FIG. 15B, B(4) can be encoded at cycle4, S(3) can be encoded at cycle5, and B(5) and B(6) can be encoded at cycle6. That is to say, it is possible to perform encoding without problems.

Further, in a case of decoding, as in the example shown in FIG. 15C, B(4) can be decoded at cycle4, and S(3), B(5), and B(6) can be respectively decoded at cycle5. That is to say, it is possible to perform decoding without problems.

In addition, a cycle for decoding the zero run length code, more*, and enough may maintain an order of decoding of other process elements. For example, in a case of the example of FIGS. 15A to 15D, as shown in FIG. 15D, decoding of the zero run length code, more*, and enough may be performed at cycle5, or may be performed at cycle6. In addition, as shown in FIG. 15D, the decoding may be performed at a plurality of divided cycles, such as decoding of the zero run length code being performed at cycle5, and decoding of more* and enough being performed at cycle6.

[Entropy Encoding Unit]

Figure 16:
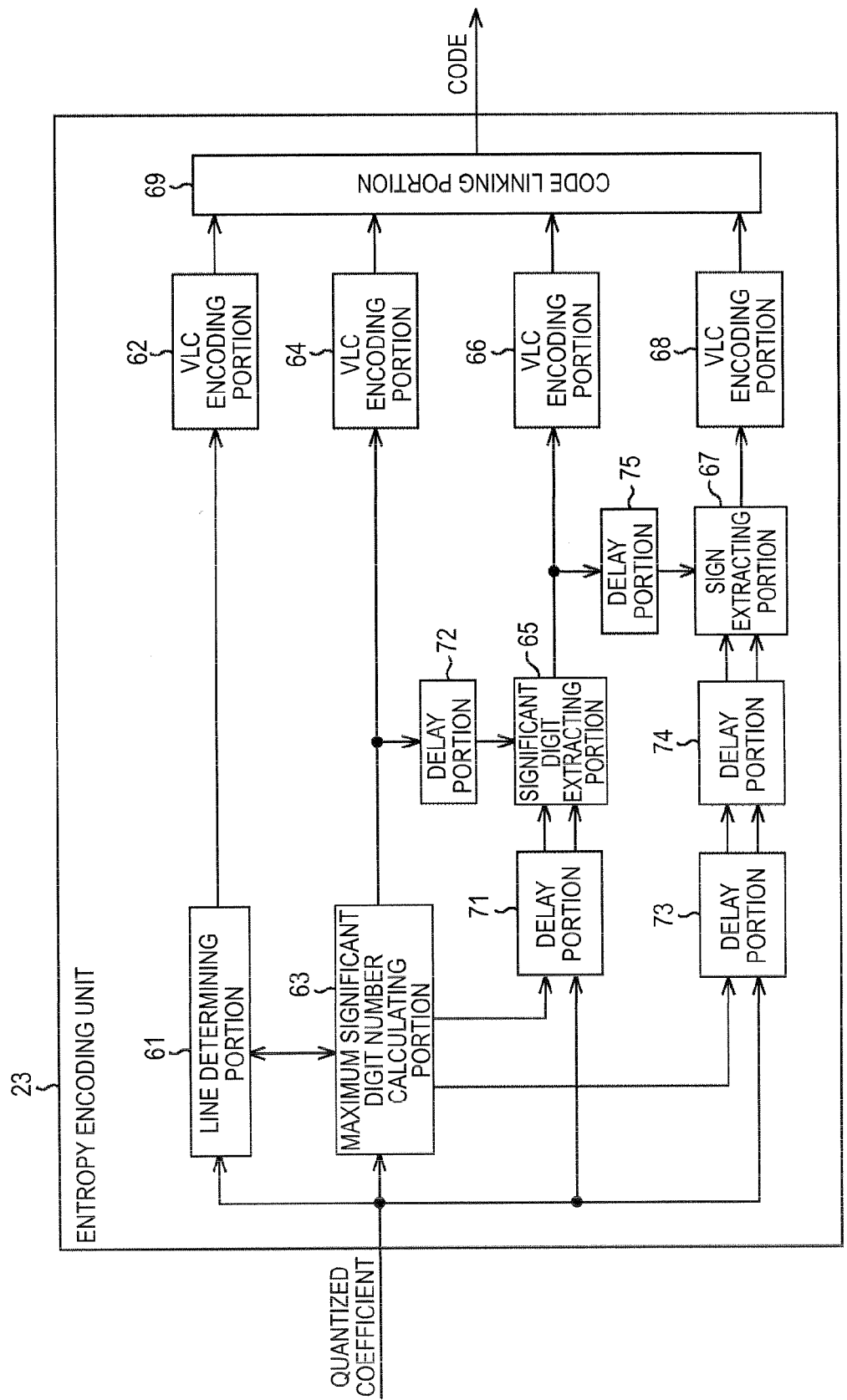
FIG. 16 is a block diagram illustrating a main configuration example of the entropy encoding unit.

A processing unit which performs an encoding process of encoding zero runs together and processing respective process elements in parallel will be described in detail. FIG. 16 is a block diagram illustrating a main configuration example of the entropy encoding unit 23.

As shown in FIG. 16, the entropy encoding unit 23 includes a line determining portion 61, a VLC (Variable Length Coding) encoding portion 62, a maximum significant digit number calculating portion 63, a VLC encoding portion 64, a significant digit extracting portion 65, a VLC encoding portion 66, a sign extracting portion 67, a VLC encoding portion 68, and a code linking portion 69.

Further, the entropy encoding unit 23 includes a delay portion 71 to a delay portion 75.

Quantized coefficients output from the quantization unit 22 (FIG. 1) are supplied (input) to the line determining portion 61, and the maximum significant digit number calculating portion 63. In addition, the quantized coefficients output from the quantization unit 22 are also supplied to the significant digit extracting portion 65 via the delay portion 71. Further, the quantized coefficients output from the quantization unit 22 are also supplied to the sign extracting portion 67 via the delay portion 73 and the delay portion 74.

The delay portions 71 to 75 include, for example, flip-flops (FF), and the like, and delay supply of information by a set. In other words, the delay portions 71 to 75 hold supplied information, and supply the held information to the subsequent processing portions at a process timing for the next set. For example, the delay portions 71 to 75 temporarily hold information which is supplied as a result of a process performed at the time point ti, and supply the information to the subsequent processing portions at the time point t(i+1). In other words, the subsequent processing portions use the information supplied from the delay portions 71 to 75 for a process performed at the time point t(i+1).

More specifically, the delay portion 71 supplies the quantized coefficients output from the quantization unit 22 or a calculation result of the maximum number of significant digits supplied from the maximum significant digit number calculating portion 63, to the significant digit extracting portion 65 at a process timing for the next set. In addition, the delay portion 72 supplies a calculation result of the maximum number of significant digits supplied from the maximum significant digit number calculating portion 63 to the significant digit extracting portion 65 at a process timing for the next set.

The delay portion 73 supplies the quantized coefficients output from the quantization unit 22 or a calculation result of the maximum number of significant digits supplied from the maximum significant digit number calculating portion 63, to the delay portion 74 at a process timing for the next set. The delay portion 74 supplies the information supplied from the delay portion 73 to the sign extracting portion 67 at a process timing for the next set.

Further, the delay portion 75 supplies (data of) significant digits of the quantized coefficients supplied from the significant digit extracting portion 65 to the sign extracting portion 67 at a process timing for the next set.

The line determining portion 61 determines whether or not all the quantized coefficients of a single line which are input from the quantization unit 22 and are encoded hereafter are 0, and supplies information indicating the determination result to the VLC encoding portion 62. In other words, the line determining portion 61 performs the process at the timing when the quantized coefficients are input.

The VLC encoding portion 62 outputs a code indicating whether or not all the quantized coefficients of the line to be encoded are 0 to the code linking portion 69 on the basis of the information indicating the determination result from the line determining portion 61. That is to say, the VLC encoding portion 62 performs the process at the timing when the quantized coefficients are input.

The maximum significant digit number calculating portion 63 calculates the maximum number of significant digits of consecutive W quantized coefficients input from quantization unit 22, and supplies information indicating the calculation result to the VLC encoding portion 64. In other words, the maximum significant digit number calculating portion 63 performs the process at the timing when the quantized coefficients are input. In addition, the maximum significant digit number calculating portion 63 also supplies the information indicating the calculation result of the maximum number of significant digits to the significant digit extracting portion 65 via the delay portion 71 and the delay portion 72.

The VLC encoding portion 64 supplies a code indicating the maximum number of significant digits of the W quantized coefficients to the code linking portion 69 on the basis of the information indicating the calculation result from the maximum significant digit number calculating portion 63. In addition, in a case where there are zero runs, the VLC encoding portion 64 supplies a code indicating the zero runs to the code linking portion 69 on the basis of the information indicating the calculation result from the maximum significant digit number calculating portion 63. That is to say, the VLC encoding portion 64 performs the process at the timing when the quantized coefficients are input.

The significant digit extracting portion 65 extracts significant digits of the W quantized coefficients supplied from the quantization unit 22 via the delay portion 71 on the basis of the information indicating the calculation result of the maximum number of significant digits supplied from the maximum significant digit number calculating portion 63 via the delay portion 71 and the delay portion 72, and supplies the extracted (data of) the significant digits of the quantized coefficients to the VLC encoding portion 66. In other words, the significant digit extracting portion 65 performs the process so as to be delayed by a set from the input timing of the quantized coefficients. In addition, the significant digit extracting portion 65 supplies the extracted (data of) significant digits of the quantized coefficients to the sign extracting portion 67 via the delay portion 75.

The VLC encoding portion 66 encodes absolute values of these quantized coefficients on the basis of the significant digits of the quantized coefficients from the significant digit extracting portion 65, and supplies a code indicating the absolute values of the quantized coefficients obtained thereby to the code linking portion 69. In other words, the VLC encoding portion 66 performs the process so as to be delayed by a set from the input timing of the quantized coefficients.

The sign extracting portion 67 extracts signs of the quantized coefficients supplied from the quantization unit 22 via the delay portion 73 and the delay portion 74 on the basis of the significant digits of the quantized coefficients supplied from the significant digit extracting portion 65 via the delay portion 75, and supplies the extracted (data of) signs to the VLC encoding portion 68. In other words, the sign extracting portion 67 performs the process so as to be delayed by two sets from the input timing of the quantized coefficients.

The VLC encoding portion 68 encodes (the data of) the signs from the sign extracting portion 67, and supplies a code indicating the signs of the quantized coefficients obtained thereby to the code linking portion 69. In other words, the VLC encoding portion 68 performs the process so as to be delayed by two sets from the input timing of the quantized coefficients.

The code linking portion 69 links the code indicating whether or not the quantized coefficients of the line are all 0, the code indicating the maximum number of significant digits, the code indicating the absolute values of the quantized coefficients, and the code indicating the signs of the quantized coefficients, respectively supplied from the VLC encoding portion 62, the VLC encoding portion 64, the VLC encoding portion 66, and the VLC encoding portion 68, to each other, so as to be output as an encoded image (data).

[VLC Encoding Portion]

Figure 17:
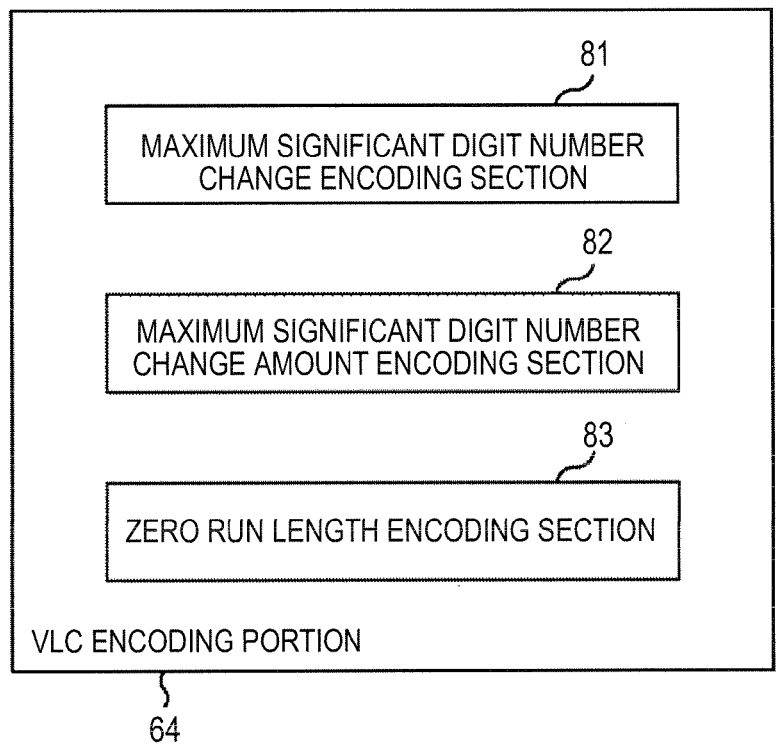
FIG. 17 is a block diagram illustrating a main configuration example of the VLC encoding section.

FIG. 17 is a block diagram illustrating a main configuration example of the VLC encoding portion 64.

As shown in FIG. 17, the VLC encoding portion 64 includes a maximum significant digit number change encoding section 81, a maximum significant digit number change amount encoding section 82, and a zero run length encoding section 83.

The maximum significant digit number change encoding section 81 detects whether or not the maximum number B of significant digits has changed from that of the previous set, and supplies a code indicating that the maximum number B of significant digits has changed to the code linking portion 69 as a code indicating the maximum number of significant digits.

In a case where the maximum number B of significant digits has changed from that of the previous set, the maximum significant digit number change amount encoding section 82 obtains a change amount thereof, and supplies a code indicating the change amount to the code linking portion 69 as a code indicating the maximum number of significant digits.

In a case where there are zero runs, the zero run length encoding section 83 obtains a length of the zero runs (zero run length), and supplies a code indicating the length of the zero runs (zero run length) to the code linking portion 69 as a code indicating the zero runs.

In addition, the maximum significant digit number change encoding section 81 and the maximum significant digit number change amount encoding section 82 output codes (diff, minus, and more*) indicating a change from the maximum number B≠0 of significant digits to the maximum number B=0 of significant digits at a cycle when encoding of the maximum number B of significant digits of a leading set of the zero runs is performed.

Thereafter, the zero run length encoding section 83 measures the length of the zero runs (zero run length), and outputs a zero run length code (a code indicating the zero run length) at a cycle when encoding of the maximum number B of significant digits of the next set (a set whose maximum number B of significant digits is not 0) of the zero run terminal end.

In addition, the maximum significant digit number change encoding section 81 and the maximum significant digit number change amount encoding section 82 output codes (more* and enough) indicating a change from the maximum number B=0 of significant digits to the maximum number B≠0 of significant digits at the same cycle as that of the zero run length code.

[Zero Run Process Corresponding to Pipeline Process]

In other words, when B newly becomes 0, B becoming 0 is encoded using the codes diff, minus and more* (*1).

The zero run length is encoded using the zero run codes at the time point when the zero run length is fixed, and, in a case where a value of B is not 0 to the line end, successively, the next value of B which is not 0 is encoded using codes more* and enough (*2).

Since coefficient information to be encoded is understood and a fixed value is encoded, this encoding is possible. In addition, S(3) in the case described with reference to FIGS. 13A to 13D is encoded at the same timing as (*1) and is continuously connected after (*1). For this reason, S(3) is interposed between the code of (*1) and the code of (*2). Thereby, decoding is also possible.

[Flow of Encoding Process]

Next, a detailed flow of the processes performed by the above-described respective portions of the image encoding device 11 will be described.

First, with reference to a flowchart of FIG. 18, a description will be made of an example of the flow of the encoding process performed by the image encoding device 11 (FIG. 1). This encoding process starts when an image (data) to be encoded is input to the wavelet transform unit 21.

In step S11, the wavelet transform unit 21 performs wavelet transform on the input image, divides the input image into a plurality of sub-bands, and supplies wavelet coefficients of each sub-band to the quantization unit 22.

In step 912, the quantization unit 22 quantizes the wavelet coefficients supplied from the wavelet transform unit 21, and supplies the quantized coefficients obtained as a result thereof to the entropy encoding unit 23. Thereby, for example, the quantized coefficients of each position of the sub-band, in bit-plane expression described with reference to FIG. 3, are input to the entropy encoding unit 23.

In step S13, the entropy encoding unit 23 performs an entropy encoding process, and finishes the encoding process. Although details of the entropy encoding process are described later, in the entropy encoding process as described with reference to FIG. 3, the entropy encoding unit 23 encodes a predetermined number (W) of quantized coefficients supplied from the quantization unit 22, and outputs, as an encoded image (encoded data), the code indicating whether or not all the quantized coefficients of the line to be encoded are 0, the code indicating the maximum number of significant digits of the quantized coefficients, the code indicating the zero run, the code indicating the absolute values of the quantized coefficients, and the code indicating the signs of the quantized coefficients.

At that time, the entropy encoding unit 23 executes the respective process elements of the entropy encoding process in parallel to each other at the timings as described with reference to FIGS. 15A to 15D. Thereby, the entropy encoding unit 23 can improve throughput of the entropy encoding process. Further, zero runs in which quantized coefficients with a value of 0 continue can be encoded together in the line to be encoded, and thus the entropy encoding unit 23 can improve encoding efficiency.

In this way, the image encoding device 11 encodes the input image so as to be output.

[Flow of Entropy Encoding Process]

Next, the entropy encoding process corresponding to the process in step S13 in FIG. 18 will be described with reference to FIG. 19.

Figure 18:
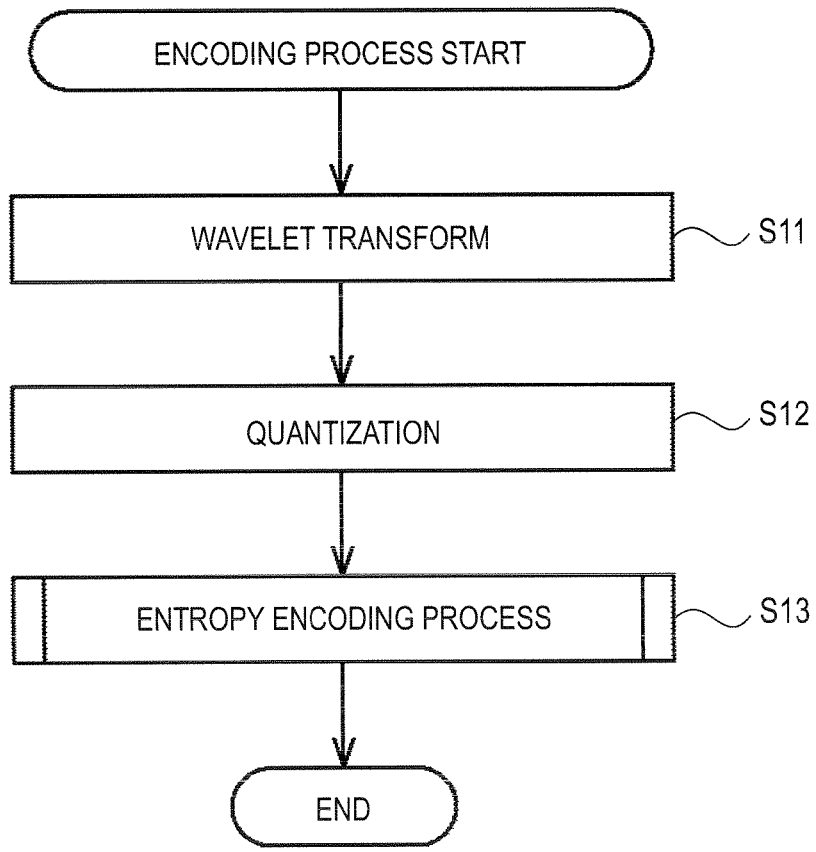
FIG. 18 is a flowchart illustrating an example of the flow of the encoding process.

In step S12 in FIG. 18, the quantized coefficients output from the quantization unit 22 are supplied (input) to the line determining portion 61, the maximum significant digit number calculating portion 63 (via the delay portion 71), the significant digit extracting portion 65, and the sign extracting portion 67 (via the delay portion 73 and the delay portion 74), of the entropy encoding unit 23.

In step S41, the line determining portion 61 sets the variable y indicating the line of the sub-band to be encoded hereafter to y=0 and stores this.

For example, in a case of encoding the quantized coefficients of the sub-band shown in FIG. 2, the line determining portion 61 sets the variable y indicating the line (the line L1 to the line L6) of the sub-band to y=0. In addition, here, the line y indicated by the variable y indicates a line whose y coordinate at each position (x, y) on the line of the sub-band is y. Therefore, for example, in a case where the variable y stored in the line determining portion 61 is y=0, a line indicated by the variable becomes the line L1 whose y coordinate at each position on the line is 0.

In step S42, the maximum significant digit number calculating portion 63 sets a variable Binit indicating the maximum number of significant digits of the W quantized coefficients input first on the line (y−1) which is one before the line y indicated by the variable y stored in the line determining portion 61 to Binit=0, and stores this.

For example, in a case where the line (y−1) is the line L1 shown in FIG. 2, a value of the variable Binit indicating the maximum number of significant digits of the W quantized coefficients first input on the line (y−1) is the maximum number of significant digits of the W quantized coefficients from the left end position of line L1 in the figure, that is, of the W quantized coefficients at positions (0,0), (1,0), . . . , and (W−1,0). In addition, in a case where the variable y stored in the line determining portion 61 is y=0, the line (y−1) does not exist, and thus a value of the variable Binit is Binit=0.

In step S43, the line determining portion 61 determines whether or not (the absolute values of) the quantized coefficients of the line y indicated by the variable y stored therein are all 0. For example, in a case where the line y is the line L1 shown in FIG. 2, the line determining portion 61 determines that all the quantized coefficients are 0 in a case where all the quantized coefficients at the positions (x,y) on the line L1 are 0.

If it is determined in step S43 that the quantized coefficients are all 0, the line determining portion 61 generates information indicating that all the quantized coefficients are 0 and supplies the information to the VLC encoding portion 62 and the maximum significant digit number calculating portion 63, and the process proceeds to step S44.

In step S44, based on the information from the line determining portion 61 indicating that all the quantized coefficients are 0, the VLC encoding portion 62 outputs (supplies) the code 0 indicating that all the quantized coefficients of the line to be encoded are 0 to the code linking portion 69. The code linking portion 69 outputs the code 0 supplied from the VLC encoding portion 62 without change, as a code obtained as a result of the encoding of the quantized coefficients of the line y.

In step S45, the maximum significant digit number calculating portion 63 sets the value of the variable Binit stored therein to Binit=0, and updates the variable Binit on the basis of the information indicating that all the quantized coefficients are 0 from the line determining portion 61.

In step S46, the line determining portion 61 determines whether or not there is any unprocessed line in the lines of the sub-band whose encoding is in progress. That is to say, the line determining portion 61 determines whether or not the quantized coefficients of all the lines of the sub-band whose encoding is in progress, have been encoded. For example, in a case of encoding the quantized coefficients of the sub-band shown in FIG. 2, the line determining portion 61 determines that there are no unprocessed lines when the quantized coefficients at all the positions on the lines L1 to L6 have been encoded.

If it is determined in step S46 that there is an unprocessed line, the line determining portion 61 makes the process proceed to step S47 so as to encode the quantized coefficients at positions on the next line, that is, the line (y+1).

In step S47, the line determining portion 61 increments the variable y indicating the stored line to y=y+1, returns the process to step S43, and executes the above-described subsequent processes again.

In contrast, if it is determined in step S46 that there are no unprocessed lines, the quantized coefficients for all the lines forming the sub-band have been encoded, and thus the line determining portion 61 finishes the entropy encoding process, returns the process to step S13 in FIG. 18, and finishes the encoding process.

Figure 19:
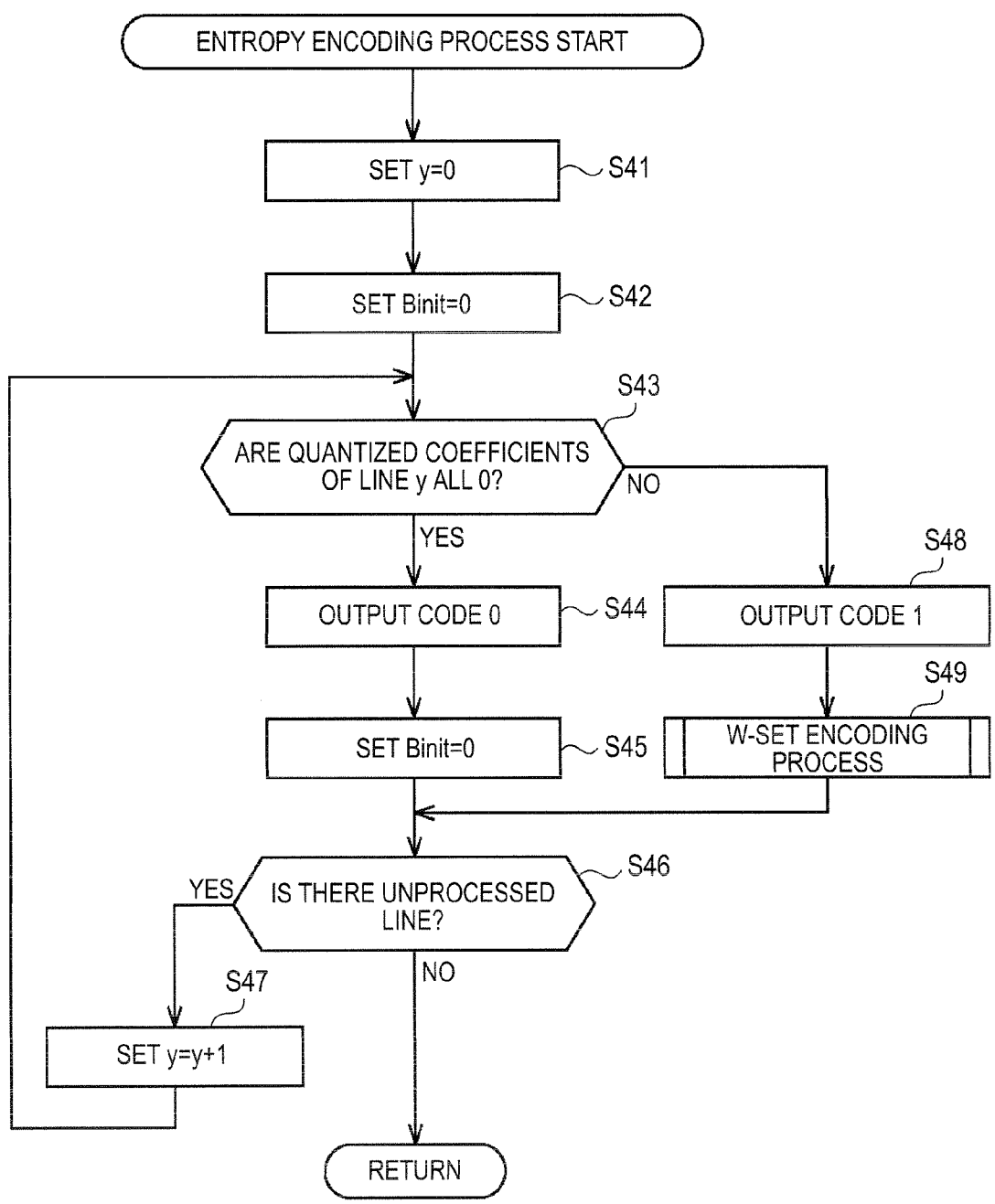
FIG. 19 is a flowchart illustrating an example of the flow of the entropy encoding process.

In addition, if it is determined in step S43 of FIG. 19 that the quantized coefficients of line y are not all 0 (there is a quantized coefficient which is not 0), the line determining portion 61 generates information indicating that the quantized coefficients are not all 0 (there is a quantized coefficient which is not 0) supplies the information to the VLC encoding portion 62 and the maximum significant digit number calculating portion 63, and makes the process proceed to step S48.

In step S48, based on the information from the line determining portion 61 indicating that the quantized coefficients are not all 0, the VLC encoding portion 62 outputs (supplies) the code 1 indicating that the quantized coefficients of the line to be encoded are not all 0 to the code linking portion 69. The code linking portion 69 outputs the code 1 supplied from the VLC encoding portion 62 without change.

In step S49, the entropy encoding unit 23 performs a W-set encoding process. Although details of the W-set encoding process are described later, in the W-set encoding process, the entropy encoding unit 23 encodes quantized coefficients on the line y indicated by the variable y stored in the line determining portion 61 every consecutive W sets.

Here, when a position on the line y specified by the variable y stored in the line determining portion 61 and the variable x stored in the maximum significant digit number calculating portion 63 is set to (x,y), the consecutive W positions on the line y are the consecutive positions (x,y), (x+1,y), ..., and (x+W−1,y) on the line y. That is to say, in the W-set encoding process, the entropy encoding unit 23 encodes the quantized coefficients at the respective positions (x, y), (x+1,y), ..., and (x+W−1,y).

When the W-set encoding process finishes, the entropy encoding unit 23 returns the process to step S46 and executes the subsequent processes.

In this way, the entropy encoding unit 23 encodes a predetermined number of the quantized coefficients at the respective positions of the sub-band in raster scan order.

As above, by encoding a predetermined number of the quantized coefficients at the respective positions of the sub-band in raster scan order, the input quantized coefficients can be processed in the order in which they have been input, and thus delay due to quantized coefficient encoding can be further reduced.

[Flow of W-Set Encoding Process]

Next, the W-set encoding process corresponding to the process of step S49 of FIG. 19 will be described with reference to a flowchart shown in FIG. 20.

If the W-set encoding process starts, the entropy encoding unit 23 initializes a variety of variables such as i, B, and max in step S61. For example, the entropy encoding unit 23 sets values of the variables i and B to 0 (i=0 and B=0), and sets a value of the variable max to the number of coefficients W sets on a corresponding line which is a process target (max=the number of coefficients W sets).

In step S62, in a case where there are (i−1)-th coefficients W sets, the sign extracting portion 67 and the VLC encoding portion 68 generate a code indicating signs of a corresponding set by arranging codes indicating signs of the respective quantized coefficients whose absolute value is not 0 in relation to the coefficients, and output (supply) the code to the code linking portion 69. The code linking portion 69 outputs the code supplied from the VLC encoding portion 68 without change as a code indicating an absolute value of the (i−1)-th sets of the line y. Further, in a case where there are no (i−1)-th coefficients W sets, the process is omitted (skipped).

In step S63, in a case where there are i-th coefficients W sets, the significant digit extracting portion 65 and the VLC encoding portion 66 extract absolute values corresponding to bits of the maximum number B of significant digits obtained through the process in step S64 the previous time in relation to the respective coefficients, and generate a code indicating the corresponding sets by arranging the absolute values so as to be output (supplied) to the code linking portion 69. The code linking portion 69 outputs the code supplied from the VLC encoding portion 66 without change as a code indicating the absolute values of the i-th sets of the line y. Further, in a case where there are no i-th coefficients W sets, this process is omitted (skipped).

In step S64, the maximum significant digit number calculating portion 63 and the VLC encoding portion 64 perform a process of the maximum number of significant digits, and generate a code indicating the maximum number of significant digits so as to be output (supplied) to the code linking portion 69. The code linking portion 69 outputs the code supplied from the VLC encoding portion 64 without change as a code indicating the maximum number of significant digits of the (i+1)-th sets of the line y.

If the process in step S64 is completed, the maximum significant digit number calculating portion 63 and the VLC encoding portion 64 make the process proceed to step S65.

In step S65, the entropy encoding unit 23 determines whether or not the variable (max+1). In other words, the entropy encoding unit 23 determines whether or not all the sets of the quantized coefficients of the line which is a process target have been processed.

If it is determined that the variable i≤(max+1) and there are unprocessed sets on the line which is a process target, the entropy encoding unit 23 makes the process proceed to step S66.

In step S66, the entropy encoding unit 23 increments the variable i (the variable i=i+1), and returns the process to step S62.

That is to say, the process in step S62 is delayed by two cycles as compared with the process in step S64 by the delay portion 73 and the delay portion 74 of FIG. 16. Therefore, in step S62, a set which is a process target before two sets of step S64 becomes a process target.

In addition, the process in step S63 is delayed by one cycle as compared with the process in step S64 by the delay portion 71 of FIG. 16. Therefore, in step S63, a set which is a process target before one set of step S64 becomes a process target.

The variable i is an integer equal to or more than 0. Therefore, for example, in a case of i=0, only the process in step S64 is performed. Further, for example, in a case of i=1, the processes in steps S63 and S64 are performed. In a case of 2≤i<max, the processes in steps S62 to S64 are performed. In a case of i=max, the processes in steps S62 and S63 are performed. In a case of i=max+1, only the process in step S62 is performed.

In addition, it is determined in step S65 that i>(max+1), the entropy encoding unit 23 makes the process proceed to step S67.

In step S67, in a case where the variable count indicating a length of the zero runs (zero run length) measured in the process of the maximum number of significant digits in step S64 is not 0, the VLC encoding portion 64 generates codes 0 of the number of digits of (count−1) as a code indicating zero runs arriving at a line terminal end, so as to be output (supplied) to the code linking portion 69. The code linking portion 69 outputs the code supplied from the VLC encoding portion 64 without change as a code indicating zero runs arriving at the line terminal end of the line y.

In addition, in a case where a value of the variable count is 0, this process is omitted (skipped).

If the process in step S67 is completed, the VLC encoding portion 64 finishes the W-set encoding process and returns the process to FIG. 19.

[Flow of Process of Maximum Number of Significant Digits]

Next, with reference to flowcharts of FIGS. 21 and 22, a description will be made of an example of the flow of the process of the maximum number of significant digits performed in step S64 of FIG. 20.

If the process of the maximum number of significant digits starts, in step S71, the maximum significant digit number calculating portion 63 sets the number of significant digits of the quantized coefficients having the greatest absolute value in the (i+1)-th coefficients W as a value of the variable Bnew indicating the maximum number of significant digits of the W quantized coefficients to be encoded hereafter, and stores this variable Bnew.

In addition, the maximum significant digit number calculating portion 63 supplies the obtained maximum number of significant digits of the W quantized coefficients, that is, the value of the variable Bnew, to the VLC encoding portion 64. Further, the maximum significant digit number calculating portion 63 supplies the value of the variable Bnew to the significant digit extracting portion 65 via the delay portion 71 or the delay portion 72.

For example, in a case where the quantized coefficients of the consecutive W positions are respectively the quantized coefficients "−0101", "+0011", "−0110", and "+0010", shown in FIG. 3, of these quantized coefficients, the quantized coefficient with the greatest absolute value is "−0110" and the number of the significant digit thereof is "3", which is the digit at which the highest order 1 is located in the "−0110", and a value of the variable Bnew is set to 3.

In step S72, the VLC encoding portion 64 determines whether or not there are (i+1)-th coefficients W sets on the basis of the process result in step S71. If it is determined that there are no sets, the VLC encoding portion 64 finishes the process of the maximum number of significant digits, and returns the process to FIG. 20. For example, in a case of i≥max, there are no (i+1)-th coefficients W sets. In this case, the processes in steps S73 to S82 are omitted (skipped).

If it is determined that there are (i+1)-th coefficients W sets, the VLC encoding portion 64 makes the process proceed to step S73.

In step S73, the zero run length encoding section 83 determines whether or not the variable count is 0. If it is determined that the sets are not in zero runs and the variable count is 0, the zero run length encoding section 83 makes the process proceed to step S74.

In step S74, the maximum significant digit number change encoding section 81 determines whether or not Bnew=B. That is to say, the maximum significant digit number change encoding section 81 determines whether or not the stored value of the variable B indicating the maximum number of significant digits of the W quantized coefficients encoded the previous time is the same as the value of the variable Bnew indicating the maximum number of significant digits of the W quantized coefficients to be encoded hereafter, supplied from the maximum significant digit number calculating portion 63.

If it is determined that Bnew=B, the maximum significant digit number change encoding section 81 makes the process proceed to step S75, and outputs the code 0 indicating that the maximum number of significant digits has not changed to the code linking portion 69, as a code indicating the maximum number of significant digits of the W quantized coefficients to be encoded hereafter. When outputting the code 0 indicating the maximum number of significant digits, the maximum significant digit number change encoding section 81 omits (skips) the processes in steps S76 to S80, and makes the process proceed to step S81.

In contrast, if it is determined in step S74 that Bnew is not B, the maximum significant digit number change encoding section 81 makes the process proceed to step S76, and (since the maximum number of significant digits has changed,) outputs the code 1 indicating that the maximum number of significant digits has changed to the code linking portion 69.

In step S77, the maximum significant digit number change encoding section 81 determines whether or not Bnew>B.

If it is determined that the maximum number Bnew of significant digits of the quantized coefficient sets (current sets) which are a process target is greater than the maximum number B of significant digits of the quantized coefficient sets (previous sets) which are a previous process target (the maximum number of significant digits has increased), the maximum significant digit number change encoding section 81 makes the process proceed to step S78.

In step S78, the maximum significant digit number change encoding section 81 outputs the code 0 indicating that the maximum number of significant digits has increased to the code linking portion 69 as a code indicating the maximum number of significant digits. Next, the maximum significant digit number change amount encoding section 82 outputs (Bnew−B−1) codes 0 indicating a change amount (increment) of the maximum number of significant digits to the code linking portion 69 as a code indicating the maximum number of significant digits. In addition, the maximum significant digit number change amount encoding section 82 makes the process proceed to step S80.

In addition, it is determined in step S77 that the maximum number Bnew of significant digits of the current sets is smaller than the maximum number B of significant digits of the previous sets (the maximum number of significant digits has decreased), the maximum significant digit number change encoding section 81 makes the process proceed to step S79.

In step S79, the maximum significant digit number change encoding section 81 outputs the code 1 indicating that the maximum number of significant digits has decreased to the code linking portion 69 as a code indicating the maximum number of significant digits. Next, the maximum significant digit number change amount encoding section 82 outputs (B-Bnew-1) codes 0 indicating a change amount (decrement) of the maximum number of significant digits to the code linking portion 69 as a code indicating the maximum number of significant digits. In addition, the maximum significant digit number change amount encoding section 82 makes the process proceed to step S80.

In step S80, in a case where the maximum number Bnew of significant digits of the current sets is not 0, the maximum significant digit number change amount encoding section 82 outputs the code 1 indicating the terminal end (enough) of the change to the code linking portion 69. In other words, here, in a case where the maximum number Bnew of significant digits of the current sets is 0, outputting of the code 1 is omitted (skipped). In a case where outputting of the code 1 indicating the terminal end (enough) of the change is not omitted, the maximum significant digit number change amount encoding section 82 may output the code 1 indicating the terminal end (enough) of the change to the code linking portion 69, following (B-Bnew-1) codes 0 indicating a change amount (decrement) of the maximum number of significant digits.

Further, the maximum significant digit number change amount encoding section 82 makes the process proceed to step S81.

In step S81, in a case where Bnew is 0, that is, zero runs start, the zero run length encoding section 83 changes a value of the variable count from 0 to 1. In addition, the zero run length encoding section 83 makes the process proceed to step S82.

In step S82, the maximum significant digit number calculating portion 63 sets the value of the variable Bnew to the variable B (sets B=Bnew).

Figure 20:
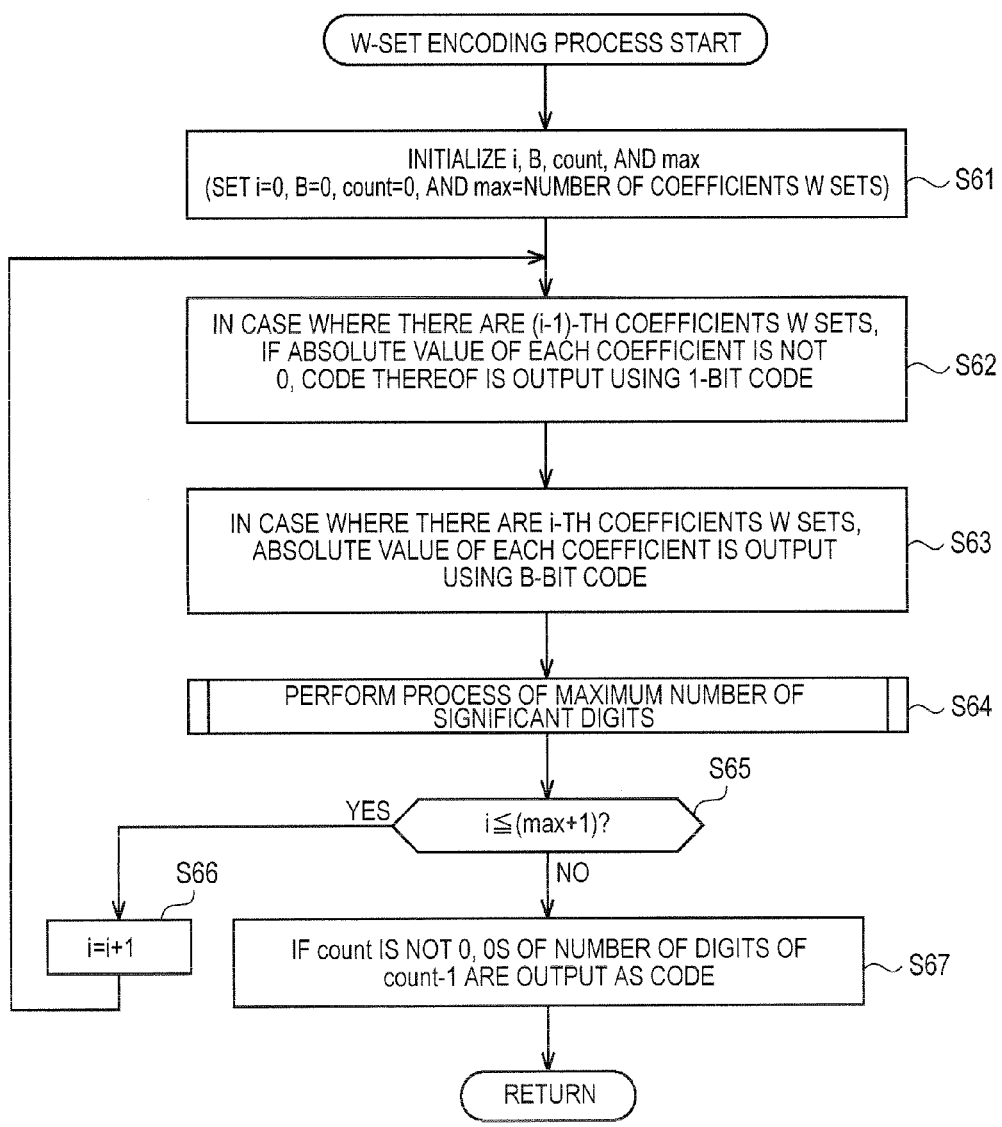
FIG. 20 is a flowchart illustrating an example of the flow of the W-set encoding process.

If the process in step S82 is completed, the maximum significant digit number calculating portion 63 finishes the process of the maximum number of significant digits and returns the process to FIG. 20.

Figure 21:
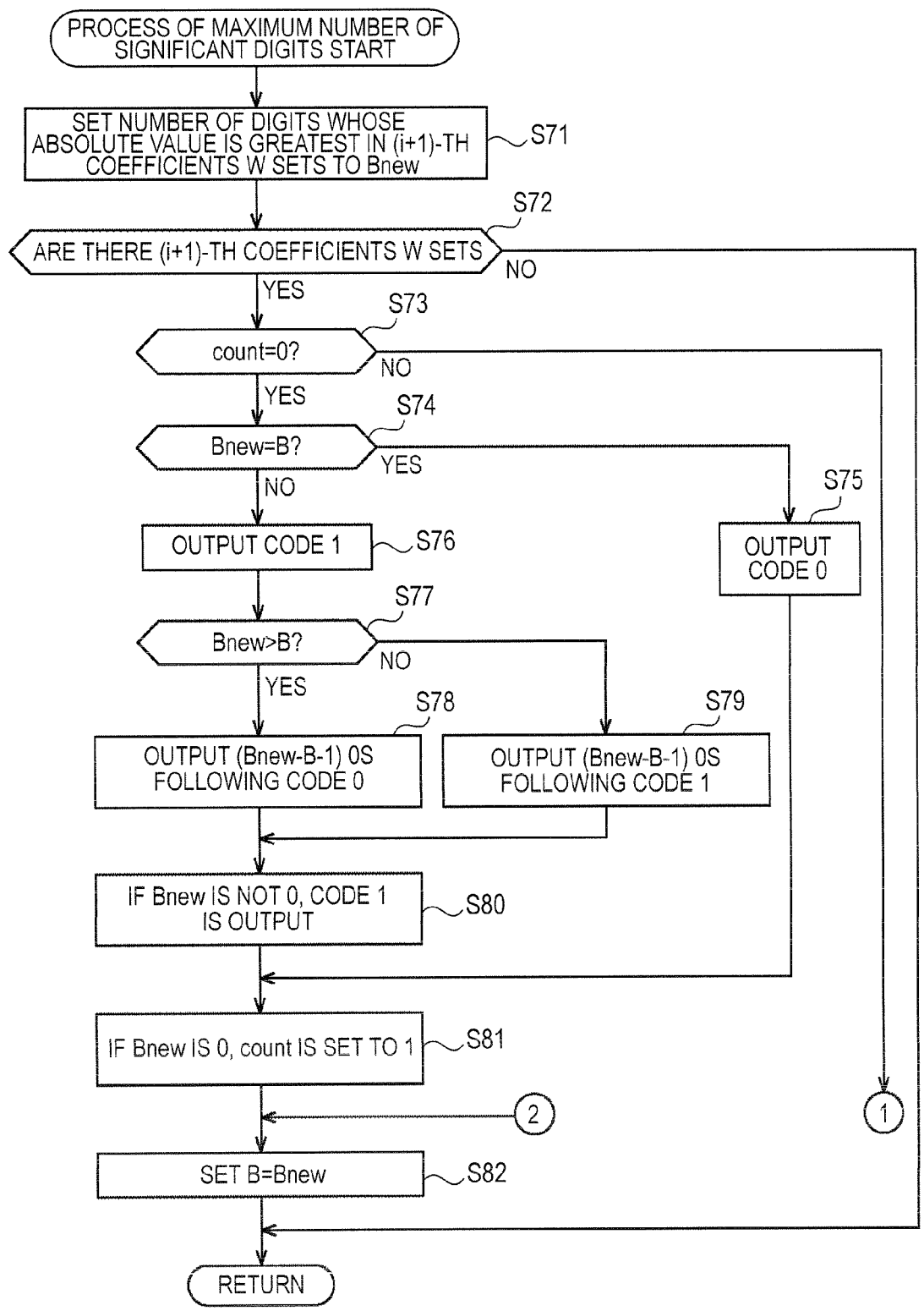
FIG. 21 is a flowchart illustrating an example of the flow of the process of the maximum number of significant digits.
Figure 22:
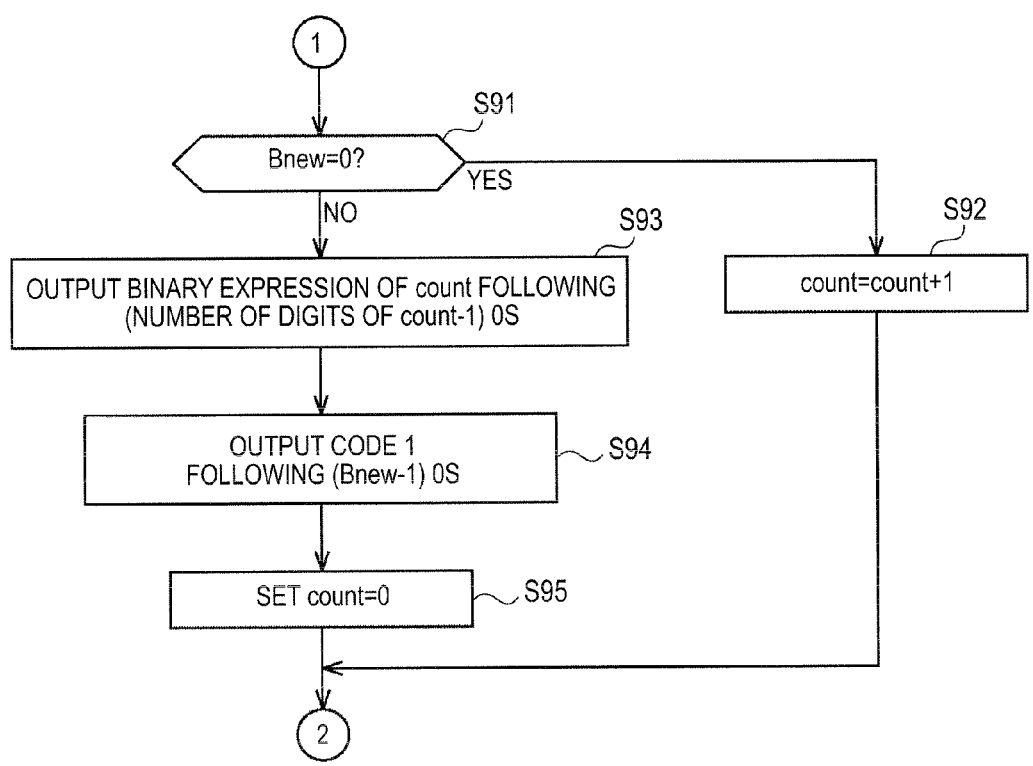
FIG. 22 is a flowchart subsequent to FIG. 21, illustrating an example of the flow of the process of the maximum number of significant digits.

If it is determined in step S73 of FIG. 21 that the sets are in the zero runs and the variable count is not 0, the zero run length encoding section 83 makes the process proceed to step S91 of FIG. 22.

In step S91 of FIG. 22, the zero run length encoding section 83 determines whether or not Bnew=0. If it is determined that Bnew=0 and zero runs do not end even in the current sets, the zero run length encoding section 83 makes the process proceed to step S92.

In step S92, the zero run length encoding section 83 increments (variable count=count+1) the variable count which is a counted value of the number of zero run sets, and returns the process to step S82 of FIG. 21 so as to execute the subsequent processes.

Further, it is determined in step S91 of FIG. 22 that Bnew is not 0 and the zero runs end even in the current sets, the zero run length encoding section 83 makes the process proceed to step S93.

In step S93, the zero run length encoding section 83 outputs continuous binary expression of the variable count subsequent to (the number of digits of the variable count-1) codes 0, for example, as indicated by the rightmost column of the table of FIG. 5, to the code linking portion 69 as a code indicating the zero runs.

In step S94, the maximum significant digit number change amount encoding section 82 outputs (Bnew-1) codes 0 indicating the increment of the maximum number B of significant digits to the code linking portion 69. In addition, here, outputting of the code 1 indicating the terminal end (enough) of the change is omitted (skipped). In a case where outputting of the code 1 indicating the terminal end (enough) of the change is not omitted, the maximum significant digit number change amount encoding section 82 may output the code 1 indicating the terminal end (enough) of the change to the code linking portion 69, following (Bnew-1) codes 0 indicating the increment of the maximum number B of significant digits.

In step S95, the zero run length encoding section 83 sets a value of the variable count to 0. If the process in step S95 is completed, the zero run length encoding section 83 returns the process to step S82 of FIG. 21 so as to execute the subsequent processes.

In this way, the entropy encoding unit 23 encodes a predetermined number of quantized coefficients of a sub-band together, and outputs a code indicating the maximum number of significant digits of the quantized coefficients, a code indicating absolute values of the quantized coefficients, and a code indicating signs of the quantized coefficients.

In this way, for example, unlike in a case of encoding of an image using the JPEG 2000 method, it is not necessary to perform a plurality of processes for each bit plane on the basis of a plurality of coding paths, and, variable length encoding is performed, and thus a process amount for encoding can be considerably reduced. Thereby, the image encoding device 11 can perform image encoding more easily, and an encoding device for encoding high resolution images in real-time can be realized at low costs.

Further, the image encoding device 11 does not have to explicitly encode the code length, thus a code amount can be reduced, and it is not necessary to manage information regarding the code length.

In addition, as described above, sets formed only by consecutive quantized coefficients whose value is 0 are encoded together as zero runs, and thus the image encoding device 11 can further improve encoding efficiency of encoding of coefficient data having many 0s.

In addition, the respective process elements of the encoding process for a single set are executed at different timings while encoding the zero runs, and thereby the image encoding device 11 can improve encoding efficiency and throughput of the encoding process. As a result, the image encoding device 11 can perform the encoding process at higher speed.

Although the description has been made above that, of the W quantized coefficients, the significant digit of the quantized coefficient having the greatest absolute value is set as a value of the variable Bnew indicating the maximum number of significant digits, a value of the variable Bnew may be a value equal to or greater than the significant digit of the quantized coefficient having the greatest absolute value of the W quantized coefficients. If the value of the variable Bnew is greater, a code amount of the code indicating the absolute values of the quantized coefficients increases, but the code amount of the code indicating the maximum number of significant digits of the quantized coefficients can be reduced by setting a value of the variable Bnew to a value equal to or greater than the significant digit of the quantized coefficient having the greatest absolute value.

Further, in a case where the encoded data of the respective process elements of the encoding process is arranged as in the example of FIG. 14, in the flowchart of FIG. 20, an order of processes to be executed in steps S62 to S64 may be replaced with an order of steps S64, S63 and S62.

2. <Second Embodiment>

Image Decoding Device

Figure 23:
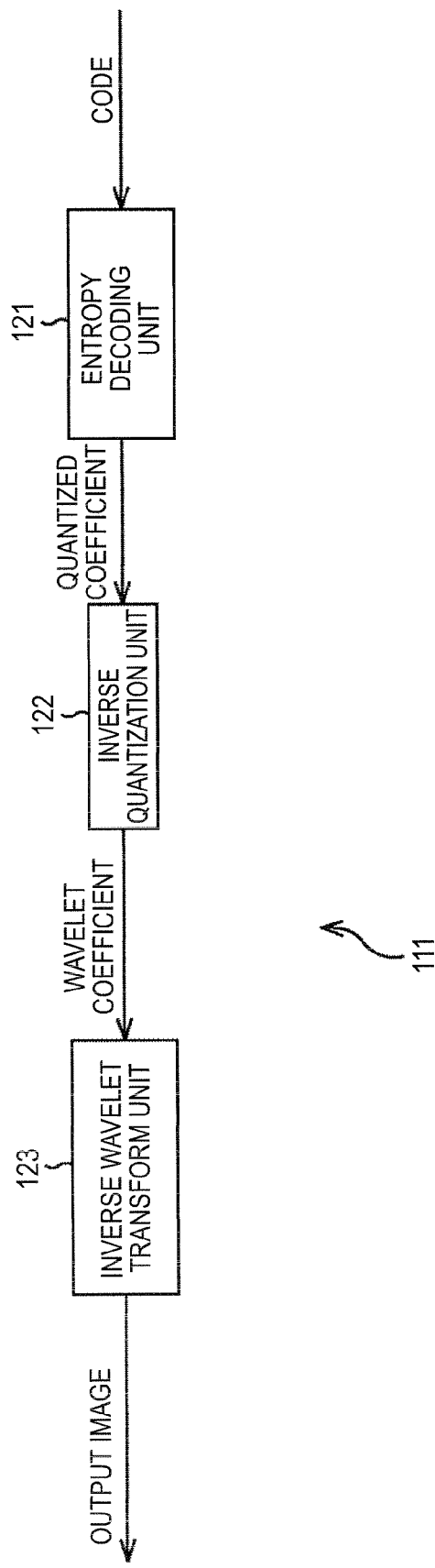
FIG. 23 is a block diagram illustrating a main configuration example of the image decoding device.

FIG. 23 is a block diagram illustrating a main configuration example of the image decoding device. The image decoding device 111 shown in FIG. 23 is an image processing device corresponding to the image encoding device 11. In other words, the image decoding device 111 decodes encoded data which is output by encoding image data input to the image encoding device 11, using a method corresponding to the encoding process of the image encoding device 11, and outputs decoded image data.

As shown in FIG. 23, the image decoding device 111 includes an entropy decoding unit 121, an inverse quantization unit 122, and an inverse wavelet transform unit 123.

An encoded image (data) is input to the entropy decoding unit 121. The entropy decoding unit 121 performs entropy decoding on a code which is the input encoded image, and supplies quantized coefficients obtained thereby to the inverse quantization unit 122.

The inverse quantization unit 122 performs inverse quantization on the quantized coefficients supplied from the entropy decoding unit 121, and supplies wavelet coefficients for each sub-band obtained by the inverse quantization to the inverse wavelet transform unit 123.

The inverse wavelet transform unit 123 performs inverse wavelet transform on the wavelet coefficients of each sub-band supplied from the inverse quantization unit 122, and outputs an image obtained as a result thereof as a decoded image.

[Entropy Decoding Unit]

Figure 24:
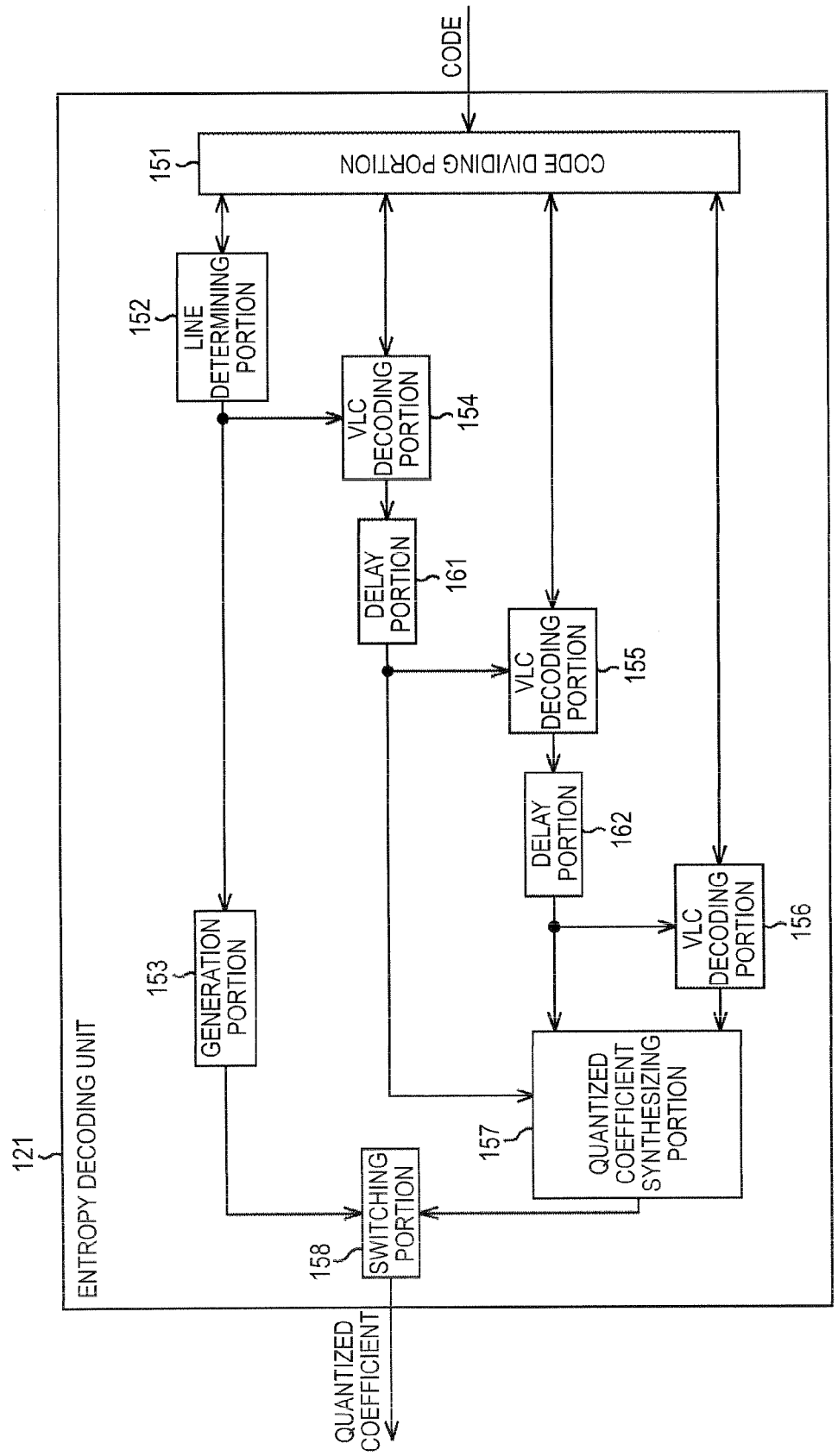
FIG. 24 is a block diagram illustrating a main configuration example of the entropy decoding unit.

FIG. 24 is a block diagram illustrating a main configuration example of the entropy decoding unit 121.

As shown in FIG. 24, the entropy decoding unit 121 includes a code dividing portion 151, a line determining portion 152, a generation portion 153, a VLC decoding portion 154, a VLC decoding portion 155, a VLC decoding portion 156, a quantized coefficient synthesizing portion 157, and a switching portion 158.

In addition, the entropy decoding unit 121 includes a delay portion 161 and a delay portion 162.

The delay portions 161 and 162 include, for example, flip-flops (FF), and the like, and delay supply of information by a set. In other words, the delay portions 161 and 162 hold supplied information and supply the held information to the subsequent processing portions at a process timing for the next set. For example, the delay portions 161 and 162 temporarily hold information which is supplied as a result of a process performed at the time point ti, and supply the information to the subsequent processing portions at the time point t(i+1). In other words, the subsequent processing portions use the information supplied from the delay portions 161 and 162 for a process performed at the time point t(i+1).

More specifically, the delay portion 161 supplies information indicating the maximum number of significant digits supplied from the VLC decoding portion 154 to the VLC decoding portion 155 and the quantized coefficient synthesizing portion 157 at a process timing for the next set.

In addition, the delay portion 162 supplies information indicating a decoding result of a code indicating absolute values of the quantized coefficients supplied from the VLC decoding portion 155 to the VLC decoding portion 156 and the quantized coefficient synthesizing portion 157 at a process timing for the next set.

The code dividing portion 151 divides the code which is an encoded image that has been input, based on information supplied from each of the line determining portion 152, the VLC decoding portion 154, the VLC decoding port 155, and the VLC decoding portion 156, and supplies the divided code with a predetermined length to the line determining portion 152, the VLC decoding portion 154, the VLC decoding portion 155, or the VLC decoding portion 156.

That is to say, the code dividing portion 151 divides the input code into a code indicating whether or not the encoded quantized coefficients of a single line are all 0, a code indicating the maximum number of significant digits of W encoded quantized coefficients, a code indicating absolute values of the W encoded quantized coefficients, and a code indicating signs of the encoded quantized coefficients, and supplies the codes to the processing portions corresponding to the data of the line determining portion 152, the VLC decoding portion 154, the VLC decoding portion 155, and the VLC decoding portion 156.

More specifically, the code dividing portion 151 supplies the code indicating whether or nest the encoded quantized coefficients of a single line are all 0 to the line determining portion 152. In addition, the code dividing portion 151 supplies the code indicating the maximum number of significant digits of the W encoded quantized coefficients to the VLC decoding portion 154. Further, the code dividing portion 151 supplies the code indicating absolute values of the W encoded quantized coefficients to the VLC decoding portion 155. Furthermore, the code dividing portion 151 supplies the code indicating signs of the encoded quantized coefficients to the VLC decoding portion 156.

The line determining portion 152 determines whether or not the quantized coefficients of a single line of an encoded sub-band are all 0, based on the code supplied from the code dividing portion 151, and supplies information indicating the determination result thereof to the code dividing portion 151, the generation portion 153, and the VLC decoding portion 154.

The generation portion 153 generates a code indicating quantized coefficients which are 0 for a single line on the basis of information indicating the determination result from the line determining portion 152, and supplies the code to the switching portion 158.

The VLC decoding portion 154 decodes the code supplied from the code dividing portion 151 indicating the maximum number of significant digits of the W encoded quantized coefficients, obtains the maximum number of significant digits of the W encoded quantized coefficients, and supplies information indicating obtained maximum number of significant digits to the code dividing portion 151. In addition, the VLC decoding portion 154 supplies the obtained information indicating the maximum number of significant digits to the VLC decoding portion 155 and the quantized coefficient synthesizing portion 157 via the delay portion 161.

In addition, the VLC decoding portion 154 decodes the code indicating zero runs supplied from the code dividing portion 151, and generates quantized coefficient groups forming the zero runs. The VLC decoding portion 154 supplies quantized coefficient groups whose decoded and obtained value is 0 to the code dividing portion 151. Further, the VLC decoding portion 154 supplies quantized coefficient group whose generated value is 0 to the VLC decoding portion 155 and the quantized coefficient synthesizing portion 157 via the delay portion 161.

The code dividing portion 151 to the VLC decoding portion 154 performs the processes at the input timing of the encoded data.

The VLC decoding portion 155 decodes the code indicating the absolute values of the quantized coefficients supplied form the code dividing portion 151 on the basis of the information indicating the maximum number of significant digits supplied from the VLC decoding portion 154 via the delay portion 161. The VLC decoding portion 155 supplies (data of) significant digits of the W quantized coefficients obtained thereby to the VLC decoding portion 156 and the quantized coefficient synthesizing portion 157 via the delay portion 162. In addition, the VLC decoding portion 155 supplies information indicating the decoding result of the code indicating the absolute values of the quantized coefficients to the code dividing portion 151.

In other words, the VLC decoding portion 155 performs the process so as to be delayed by a set from the input timing of the encoded data.

Based on the significant digits of the quantized coefficients supplied from the VLC decoding portion 155 via the delay portion 162, the VLC decoding portion 156 decodes the code indicating the signs of the quantized coefficients supplied from the code dividing portion 151, and supplies the (data of) sings of the quantized coefficients obtained thereby to the quantized coefficient synthesizing portion 157. In addition, the VLC decoding portion 156 supplies information indicating the decoding result of the code indicating the signs of the quantized coefficients to the code dividing portion 151.

The quantized coefficient synthesizing portion 157 synthesizes the absolute values of the quantized coefficients supplied from the VLC decoding portion 155 via the delay portion 162 with the sings of the quantized coefficients supplied from the VLC decoding portion 156 on the basis of the information indicating the maximum number of significant digits supplied from the VLC decoding portion 154 via the delay portion 161, and supplies the W quantized coefficients obtained thereby to the switching portion 158.

In other words, the VLC decoding portion 156 and the quantized coefficient synthesizing portion 157 perform the processes so as to be delayed by two sets from the input timing of the encoded data.

The switching portion 158 outputs the quantized coefficients from the generation portion 153 or the quantized coefficient synthesizing portion 157.

[Code Dividing Portion]

Figure 25:
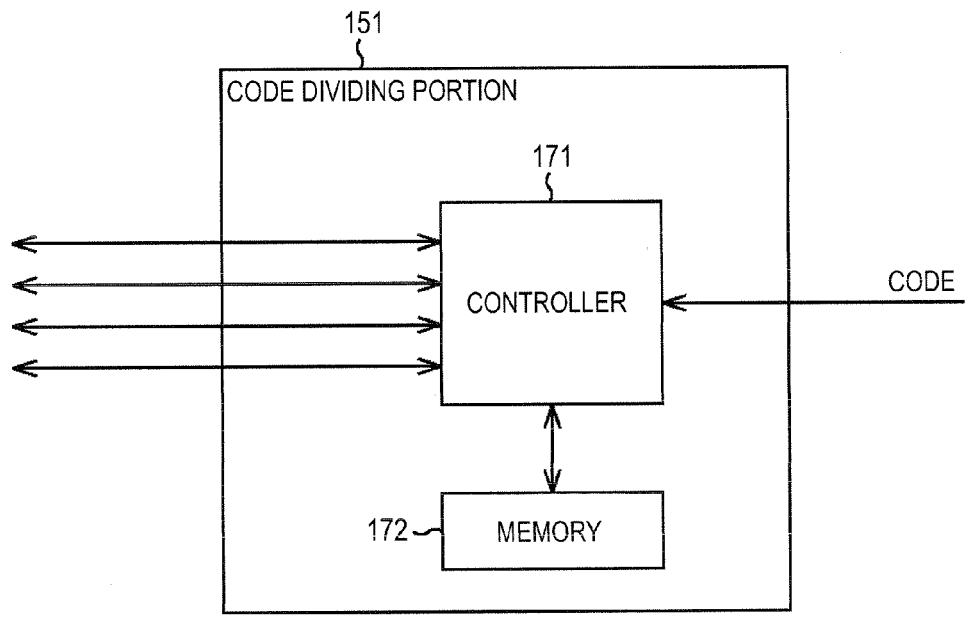
FIG. 25 is a block diagram illustrating a configuration example of the code dividing section.

FIG. 25 is a block diagram indicating a main configuration example of the code dividing portion 151. As shown in FIG. 25, the code dividing portion 151 includes a controller 171 and a memory 172.

The controller 171 reads a code with a predetermined length, of codes temporarily stored in the memory 172, based on the information supplied from each of the line determining portion 152, the VLC decoding portion 154, the VLC decoding portion 155, and the VLC decoding portion 156, shown in FIG. 24, and supplies the code to the line determining portion 152, the VLC decoding portion 154, the VLC decoding portion 155, or the VLC decoding portion 156.

Figure 26:
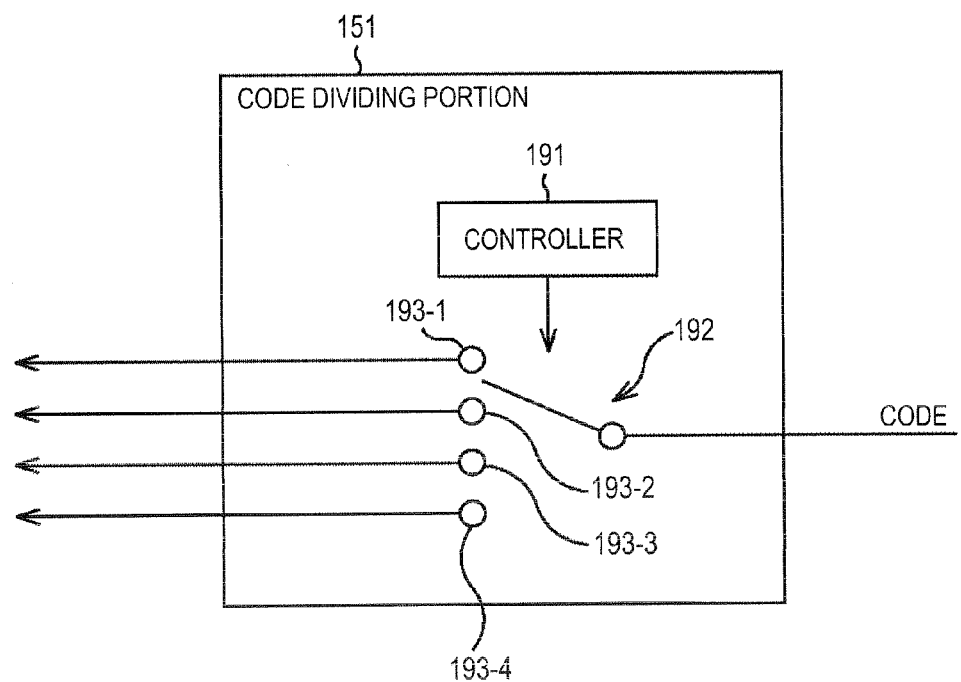
FIG. 26 is a block diagram illustrating another configuration example of the code dividing section.

In addition, the code dividing portion 151 may be configured as shown in FIG. 26, in addition to the configuration example shown in FIG. 25.

The code dividing portion 151 shown in FIG. 26 has a controller 191, a switch 192, and nodes 193-1 to 193-4.

When codes which are encoded images are input to the code dividing portion 151, the controller 191 controls the switch 192 on the basis of the information supplied from each of the line determining portion 152, the VLC decoding portion 154, the VLC decoding portion 155, and the VLC decoding portion 156, shown in FIG. 24, and supplies a code with a predetermined length of the input codes to the line determining portion 152, the VLC decoding portion 154, the VLC decoding portion 155, or the VLC decoding portion 156.

That is to say, the node 193-1 to the node 193-4 are respectively connected to the line determining portion 152, the VLC decoding portion 154, the VLC decoding portion 155, and the VLC decoding portion 156, and the controller 191 selects one of the nodes 193-1 to 193-4 as a supply destination of a code, and controls connection between the switch 192 and the selected node.

Since the switch 192 connects the node selected based on the control of the controller 191 to the input, the code input to the code dividing portion 151 is supplied to the line determining portion 152, the VLC decoding portion 154, the VLC decoding portion 155, or the VLC decoding portion 156, selected as a code supply destination, via the switch 192 and the node connected to the switch 192.

[VLC Decoding Portion]

Figure 27:
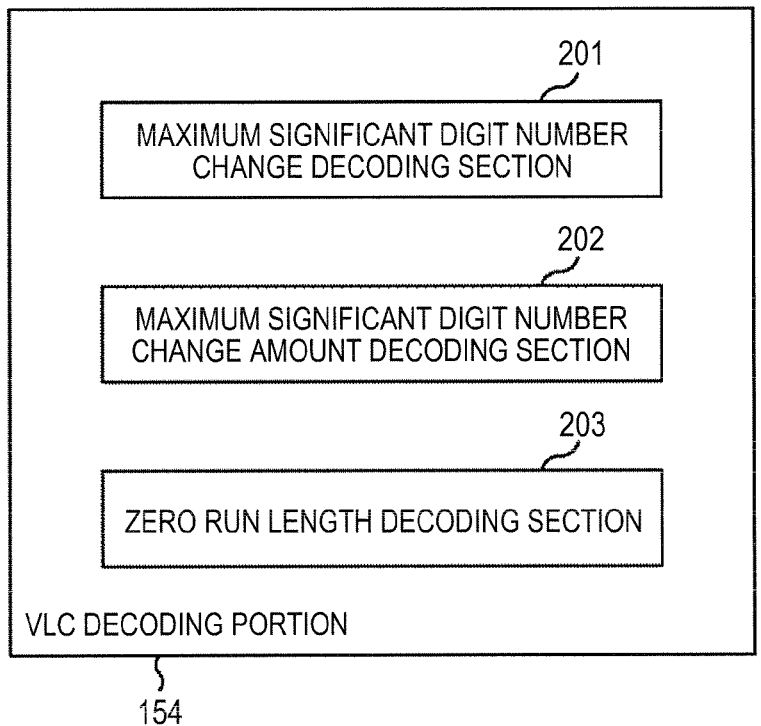
FIG. 27 is a block diagram illustrating a main configuration example of the VLC decoding section.

FIG. 27 is a block diagram illustrating a main configuration example of the VLC decoding portion 154.

As shown in FIG. 27, the VLC decoding portion 154 includes a maximum significant digit number change decoding section 201, a maximum significant digit number change amount decoding section 202, and a zero run length decoding section 203.

The maximum significant digit number change decoding section 201 decodes the code indicating a change in the maximum number of significant digits, supplied from the code dividing portion 151 and included in the code indicating the maximum number of significant digits.

The maximum significant digit number change amount decoding section 202 decodes the code indicating a change amount of the maximum number of significant digits, supplied from the code dividing portion 151 and included in the code indicating the maximum number of significant digits.

The VLC decoding portion 154 supplies the information obtained through the decoding to the VLC decoding portion 155 or the quantized coefficient synthesizing portion 157.

In addition, the zero run length decoding section 203 decodes the code supplied from the code dividing portion 151 and indicating zero runs, and generates quantized coefficient groups forming the zero runs. The VLC decoding portion 154 supplies the generated quantized coefficient groups to the VLC decoding portion 155 and the quantized coefficient synthesizing portion 157.

[Zero Run Decoding Process Corresponding to Pipeline Process]

In the embodiment of the present disclosure, two states, that is, a normal mode and a zero run mode are introduced into decoding of the maximum number B of significant digits. When each line starts to be decoded, a state is initialized to the normal mode.

In the normal mode, the image decoding device 111 decodes only single next B as in a case of the example of FIGS. 13A to 13D. In addition, if B is found as 0, a state is transferred to the zero run mode (*3).

In the zero run mode, the zero run length is decoded using the zero run codes, and, in a case where 0 does not arrive at the line end, the image decoding device 111 successively decodes a value of next B which is not 0 using codes more* and enough (*4). In addition, only the zero run length progresses, and then a state is transferred to the normal mode.

The codes which are decoded in (*3) by the image decoding device 111 are codes which have been encoded in (*1). In addition, the image decoding device 111 decodes S(3) using the codes after decoding of (*3) is completed at the same timing as that of the decoding of (*3), and decodes the codes which have been encoded in (*2), at the next timing in (*4) Therefore, the image decoding device 111 can decode the encoded data which has been encoded by the image encoding device 11.

[Flow of Decoding Process]

Next, a decoding process performed by the image decoding device 111 will be described with reference to a flowchart shown in FIG. 28. This decoding process starts when the code which is an encoded image is input to the entropy decoding unit 121.

In step S131, the entropy decoding unit 121 performs an entropy decoding process, entropy-decodes the code which is an input image, and supplies quantized coefficients obtained thereby to the inverse quantization unit 122.

Although details of the entropy decoding process is described later in detail, in this entropy decoding process, the entropy decoding unit 121 decodes W quantized coefficients at consecutive positions on a line of an encoded sub-band at a time, and supplies the decoded quantized coefficients to the inverse quantization unit 122. In addition, in the entropy decoding process, the entropy decoding unit 121 decodes the code indicating zero runs formed by quantized coefficients whose value is 0, and thereby decodes quantized coefficient groups whose value is 0, forming the zero runs, together.

At this time, the entropy decoding unit 121 executes the respective process elements of the entropy decoding process in parallel to each other at the timings as described with reference to FIGS. 15A to 15D. Thereby, the entropy decoding unit 121 can improve throughput of the entropy decoding process.

In step S132, the inverse quantization unit 122 performs inverse quantization on the quantized coefficients supplied from the entropy decoding unit 121, and supplies wavelet coefficients of each sub-band obtained by the inverse quantization to the inverse wavelet transform unit 123.

In step S133, the inverse wavelet transform unit 123 performs inverse wavelet transform on the wavelet coefficients of each sub-band supplied from the inverse quantization unit 122, and outputs the image obtained as a result thereof, and then the decoding process finishes.

In this way, the image decoding device 111 decodes and outputs an encoded image.

[Flow of Entropy Decoding Process]

Next, an entropy decoding process corresponding to the process in step S131 of FIG. 28 will be described with reference to a flowchart of FIG. 29.

In step S161, the line determining portion 152 sets the variable y indicating a line of the sub-band to be decoded hereafter to y=0, and stores this.

In step S162, the VLC decoding portion 154 sets a variable Binit indicating the maximum number of significant digits of the W quantized coefficients input first on the line (y−1) which is one before the line y indicated by the variable y stored in the line determining portion 152 to Binit=0 and stores this.

For example, in a case where the line (y−1) is the line L1 shown in FIG. 2, a value of the variable Binit indicating the maximum number of significant digits of the W quantized coefficients first input on the line (y−1) is the maximum number of significant digits of the W quantized coefficients from the left end position of line L1 in the figure. In addition, in a case where the variable y stored in the line determining portion 152 is y=0, the line (y−1) does not exist, and thus a value of the variable Binit is Binit=0.

In step S163, the code dividing portion 151 supplies the first 1-bit code of the input code to the line determining portion 152, as a code indicating whether or not all quantized coefficients of the line to be decoded hereafter are 0.

In step S163, the line determining portion 152 determines whether or not the 1-bit code read (supplied) from the code dividing portion 151 is 0, generates information indicating a result of the determination so as to be supplied to the generation portion 153, the VLC decoding portion 154, and the code dividing portion 151. If it is determined in step S163 that the code is 0, this means that the quantized coefficients of the line y are all 0, and thus the line determining portion 152 makes the process proceed to step S164.

In step S164, the generation portion 153 sets all the quantized coefficients on the line y to 0 on the basis of the information indicating the determination result from the line determining portion 152. Further, the generation portion 153 generates a code indicating the quantized coefficients of the line y so as to be supplied to the switching portion 158.

For example, in a case where a single quantized coefficient is represented by four digits, and there are five quantized coefficients on a single line, the generation portion 153 generates twenty (=4×5) 0s as a code indicating the quantized coefficients of the line y, and supplies the 0s to the switching portion 158. The switching portion 158 outputs the continuous twenty 0s, supplied from the generation portion 153, to the inverse quantization unit 122 as a code indicating the quantized coefficients of a single line.

In step S165, the VLC decoding portion 154 sets a value of the stored variable Binit to Binit=0 on the basis of information indicating the determination result from the line determining portion 152, and updates the variable Binit.

In step S166, the line determining portion 152 determines whether or not there are unprocessed lines in the lines of the sub-band whose decoding is in progress. That is to say, the line determining portion 152 determines whether or not quantized coefficients at positions on all lines of the sub-band whose decoding is in progress have been decoded.

If it is determined in step S166 that there is an unprocessed line, the line determining portion 152 makes the process proceed to step S167 so as to decode the quantized coefficients at the respective positions on the next line (y+1) of the line y indicated by the variable y stored therein.

In step S167, the line determining portion 152 increments the variable y indicating the stored line to y=y+1, returns the process to step S163, and executes the subsequent processes.

Figure 28:
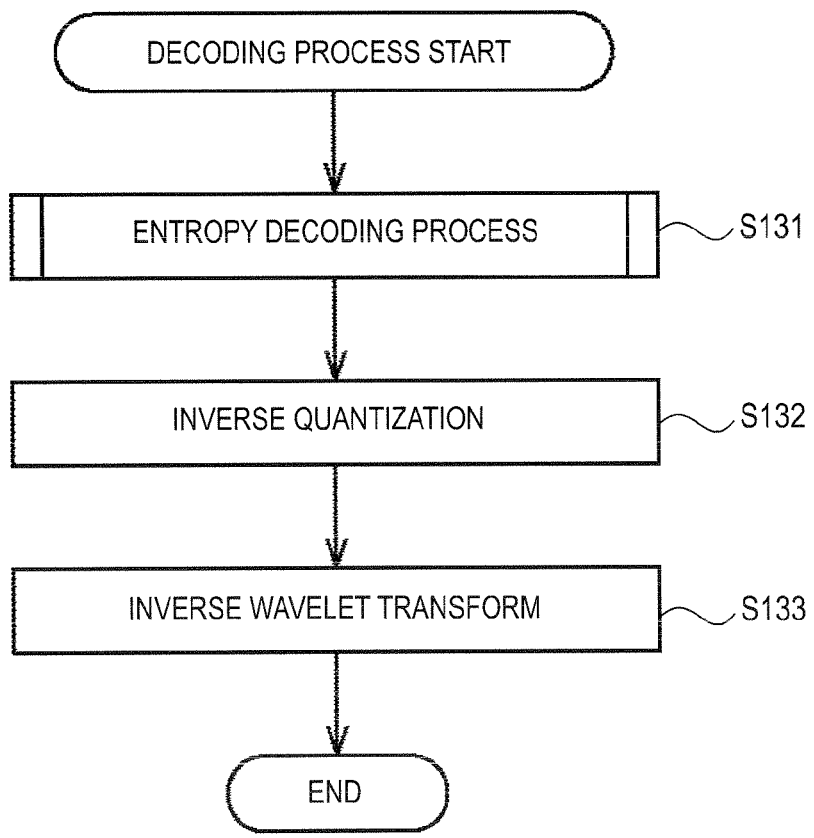
FIG. 28 is a flowchart illustrating an example of the flow of the decoding process.

In contrast, if it is determined in step S166 that there are no unprocessed lines, the quantized coefficients for all the lines forming the sub-band have been decoded, and thus the line determining portion 152 finishes the entropy decoding process, returns the process to step S131 of FIG. 28 so as to execute the processes after step S132.

Figure 29:
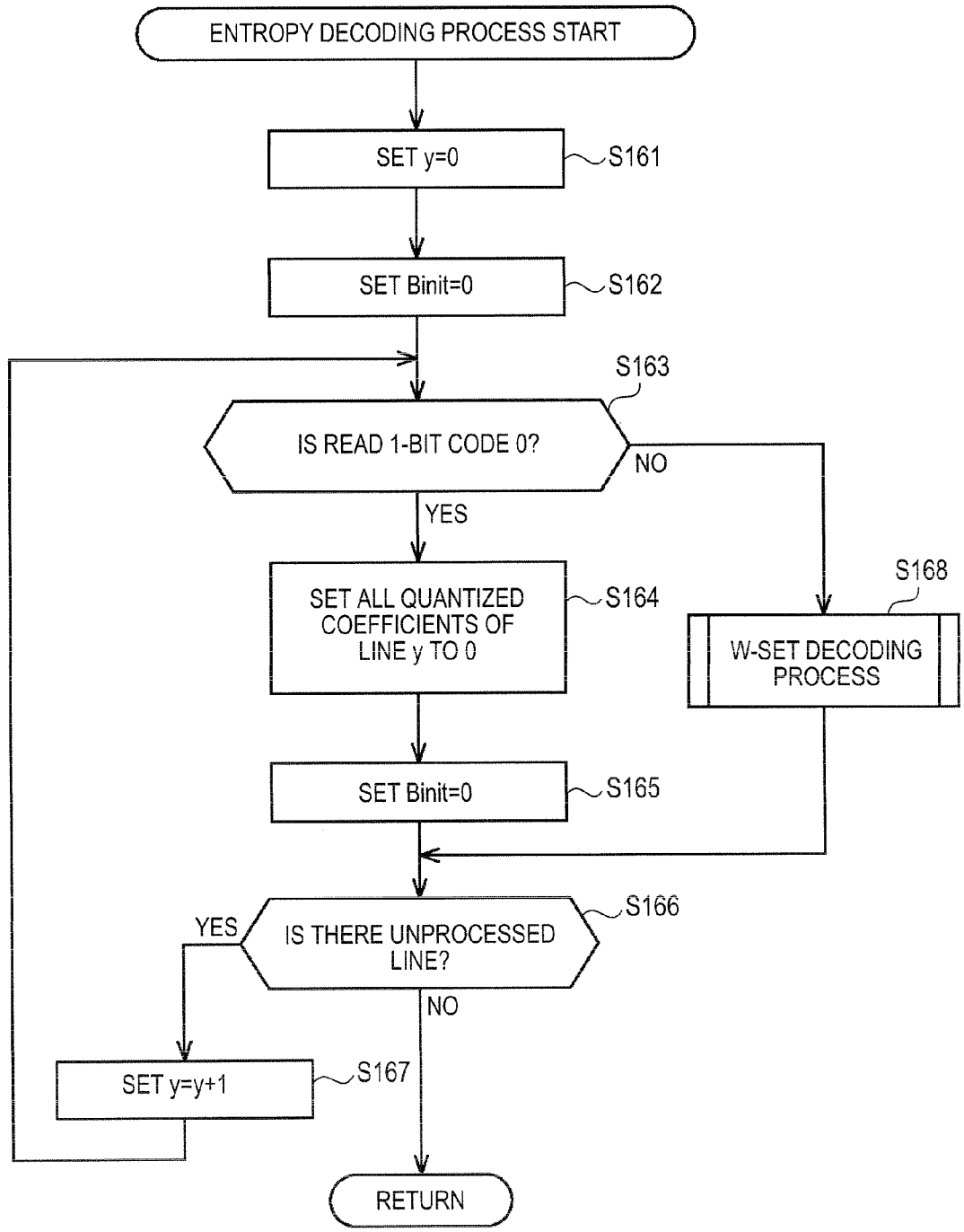
FIG. 29 is a flowchart illustrating an example of the flow of the entropy decoding process.

In addition, if it is determined in step S163 of FIG. 29 that the code is not 0, the line determining portion 152 makes the process proceed to step S168. In step S168, the entropy decoding unit 121 performs a W-set decoding process.

Although details of the W-set decoding process are described later, in the W-set decoding process, the entropy decoding unit 121 decodes quantized coefficients at continuous W positions on the line y indicated by the variable y stored in the line determining portion 152.

In addition, in the W-set decoding process, the entropy decoding unit 121 decodes the code indicating zero runs formed by quantized coefficients whose value is 0, thereby decoding quantized coefficient groups whose value is 0, forming the zero runs, together.

If the W-set decoding process finishes, the entropy decoding unit 121 returns the process to step S166 and executes the subsequent processes.

In this way, the entropy decoding unit 121 decodes a predetermined number of quantized coefficients at the respective positions of the sub-band in raster scan order.

In this way, by decoding a predetermined number of the quantized coefficients at the respective positions of the sub-band in raster scan order, the encoded quantized coefficients can be processed in the order in which they have been input, and thus delay due to quantized coefficient decoding can be further reduced.

[Flow of W-Set Decoding Process]

Next, a description will be made of an example of the flow of the W-set decoding process executed in step S168 of FIG. 29 with reference to a flowchart shown in FIG. 30.

In step S181, the entropy decoding unit 121 initializes a variety of variables such as i, B, and max. For example, the entropy decoding unit 121 sets the variable i=0 and the variable B=0, and sets the variable max to the number of coefficients W sets. Further, for example, the entropy decoding unit 121 sets initial values of all the coefficients to 0.

In step S182, in a case where there are coefficients W sets, the VLC decoding portion 156 treats the code indicating signs of the current set supplied from the code dividing portion 151 as an arrangement of codes indicating signs of the respective quantized coefficients whose absolute value is not 0. The VLC decoding portion 156 supplies the obtained signs of the respective quantized coefficients to the code dividing portion 151 and the quantized coefficient synthesizing portion 157.

The quantized coefficient synthesizing portion 157 synthesizes the absolute values of the quantized coefficients with the signs thereof in relation to the (i−1)-th coefficients W sets, and outputs W quantized coefficients obtained thereby via the switching portion 158.

Further, in a case where there are no (i−1)-th coefficients W sets, this process is omitted (skipped).

In step S183, in a case where there are i-th coefficients W sets, the VLC decoding portion 155 reads a code sequence corresponding to bits of the maximum number B of significant digits obtained through the process in step S184 the previous time in relation to the respective coefficients, and treats the code sequence as an arrangement of the absolute values for the maximum number of significant digits of the quantized coefficients. The VLC decoding portion 155 supplies the obtained absolute values the respective quantized coefficients to the code dividing portion 151 and supplies the absolute values to the VLC decoding portion 156 and the quantized coefficient synthesizing portion 157 via the delay portion 162.

Further, in a case where there are no i-th coefficients W sets, this process is omitted (skipped).

In step S184, the VLC decoding portion 154 performs a process of the maximum number of significant digits, and decodes a code indicating the maximum number of significant digits so as to obtain the maximum number B of significant digits. The VLC decoding portion 154 supplies the obtained maximum number B of significant digits to the code dividing portion 151, and supplies the obtained maximum number B of significant digits to the VLC decoding portion 155 and the quantized coefficient synthesizing portion 157 via the delay portion 161.

If the process in step S184 is completed, the VLC decoding portion 154 makes the process proceed to step S185.

In step S185, the entropy decoding unit 121 determines whether or not the variable i≤(max+1). In other words, the entropy decoding unit 121 determines whether or not all the sets of the quantized coefficients of the line which is a process target have been processed.

If it is determined that the variable i≤(max+1) and there are unprocessed sets on the line which is a process target, the entropy decoding unit 121 makes the process proceed to step S186.

In step S186, the entropy decoding unit 121 increments the variable i (the variable i=i+1), and returns the process to step S182.

That is to say, the process in step S182 is delayed by two cycles as compared with the process in step S184 by the delay portion 161 and the delay portion 162 of FIG. 24. Therefore, in step S182, a set of a process target before two sets of step S184 becomes a process target.

In addition, the process in step S183 is delayed by one cycle as compared with the process in step S184 by the delay portion 161 of FIG. 24. Therefore, in step S183, a set of a process target before one set of step S184 becomes a process target.

The variable i is an integer equal to or more than 0. Therefore, for example, in a case of i=0, only the process in step S184 is performed. Further, for example, in a case of i=1, the processes in steps S183 and S184 are performed. In a case of 2≤i<max, the processes in steps S182 to S184 are performed. In a case of i=max, the processes in steps S182 and S183 are performed. In a case of i=max+1, only the process in step S182 is performed.

In addition, it is determined in step S185 that i>(max+1), the entropy decoding unit 121 finishes the W-set decoding process and returns the process to FIG. 29.

[Flow of Process of Maximum Number of Significant Digits]

Next, with reference to flowcharts of FIGS. 31 and 32, a description will be made of an example of the flow of the process of the maximum number of significant digits performed in step S184 of FIG. 30.

If the process of the maximum number of significant digits starts, the VLC decoding portion 154 determines whether or not there are (i+1)-th coefficients W sets in step S201. If it is determined that there are no sets, the VLC decoding portion 154 finishes the process of the maximum number of significant digits, and returns the process to FIG. 30. For example, in a case of i≥max, there are no (i+1)-th coefficients W sets. In this case, the process of the maximum number of significant digits finishes.

Figure 31:
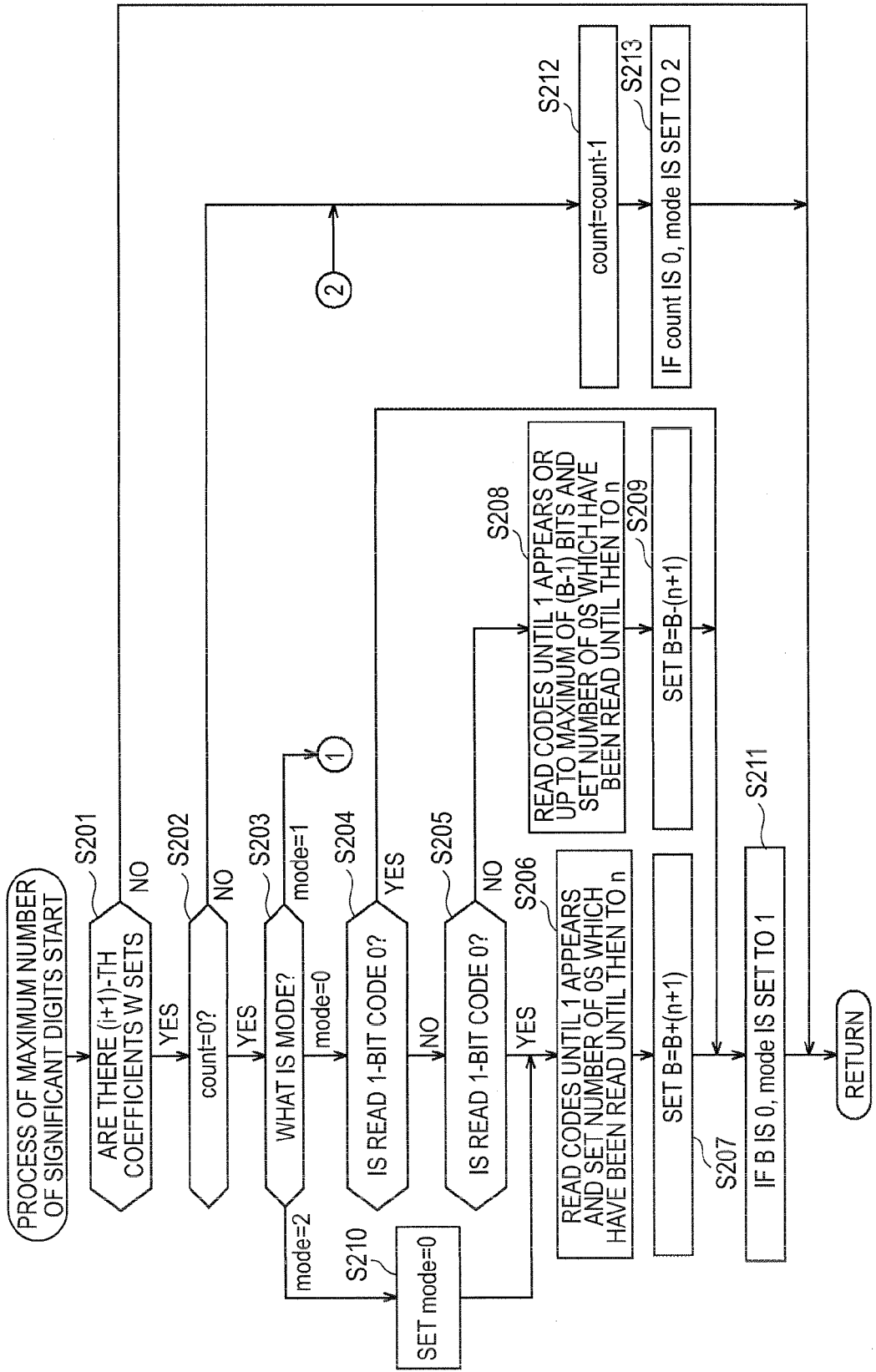
FIG. 31 is a flowchart illustrating an example of the flow of the process of the maximum number of significant digits.

If it is determined in step S201 of FIG. 31 that there are (i+1)-th coefficients W sets, the VLC decoding portion 154 makes the process proceed to step S202.

In step S202, the zero run length decoding section 203 determines whether or not the variable count is 0. If it is determined that the sets are not in zero runs and the variable count is 0, the zero run length decoding section 203 makes the process proceed to step S203.

In step S203, the VLC decoding portion 154 determines which one of 0 to 2 a mode is. If it is determined that a mode is 0 (mode=0), the VLC decoding portion 154 makes the process proceed to step S204.

In step S204, the maximum significant digit number change decoding section 201 reads a 1-bit code of the codes supplied from the code dividing portion 151, and determines whether or not the code is 0. In a case where the read code is 0, the maximum number B of significant digits is the same as that of the previous set. Therefore, the maximum significant digit number change decoding section 201 omits the processes insteps S205 to S209, and makes the process proceed to step S211.

In addition, if it is determined in step S204 that the read code is 1, since a value of the maximum number B of significant digits has changed from a value of the previous set, the maximum significant digit number change decoding section 201 makes process proceed to step S205.

In step S205, the maximum significant digit number change decoding section 201 reads a 1-bit code of the codes supplied from the code dividing portion 151 and determines whether or not the code is 0. If it is determined that the read code is 0, a value of the maximum number B of significant digits has increased from a value of the previous set. In this case, the maximum significant digit number change decoding section 201 makes the process proceed to step S206.

In step S206, the maximum significant digit number change amount decoding section 202 reads the codes supplied from the code dividing portion 151 by one bit until the code 1 is read. The maximum significant digit number change amount decoding section 202 finishes the reading at the point when the code 1 is read, and sets the number of the codes 0 which have been read until then to n.

In step S207, the maximum significant digit number change amount decoding section 202 updates a value of the maximum number B of significant digits by using the variable n. In other words, the maximum significant digit number change amount decoding section 202 determines the maximum number B of significant digits of the current sets which are a process target as in the following Expression (1).

$$B=B+(n+1) \qquad (1)$$

When the maximum number B of significant digits of the current sets is determined, the maximum significant digit number change amount decoding section 202 makes process proceed to step S211.

In addition, if it is determined in step S205 that the read code is not 0, a value of the maximum number B of significant digits has decreased from a value of the previous set. In this case, the maximum significant digit number change decoding section 201 makes process proceed to step S208.

In step S208, the maximum significant digit number change amount decoding section 202 reads the codes supplied from the code dividing portion 151 by one bit until the code 1 is read or a maximum of (B−1)-bit code is read. The maximum significant digit number change amount decoding section 202 finishes the reading at the point when the code 1 is read or the (B−1)-bit code is read, and sets the number of the codes 0 which have been read until then to n.

In step S209, the maximum significant digit number change amount decoding section 202 updates a value of the maximum number B of significant digits by using the variable n. In other words, the maximum significant digit number change amount decoding section 202 determines the maximum number B of significant digits of the current sets which are a process target as in the following Expression (2).

$$B=B-(n+1) \qquad (2)$$

When the maximum number B of significant digits of the current sets is determined, the maximum significant digit number change amount decoding section 202 makes process proceed to step S211.

In addition, if it is determined in step S203 that a mode is 2 (mode=2), the VLC decoding portion 154 makes the process proceed to step S210.

In step S210, the VLC decoding portion 154 returns the mode to 0 (mode=0), and returns the process to step S206 so as to execute the subsequent processes.

In step S211, in a case where the maximum number B of significant digits is 0, that is, zero runs arrive, the VLC decoding portion 154 sets the mode to 1 (mode=1).

Figure 30:
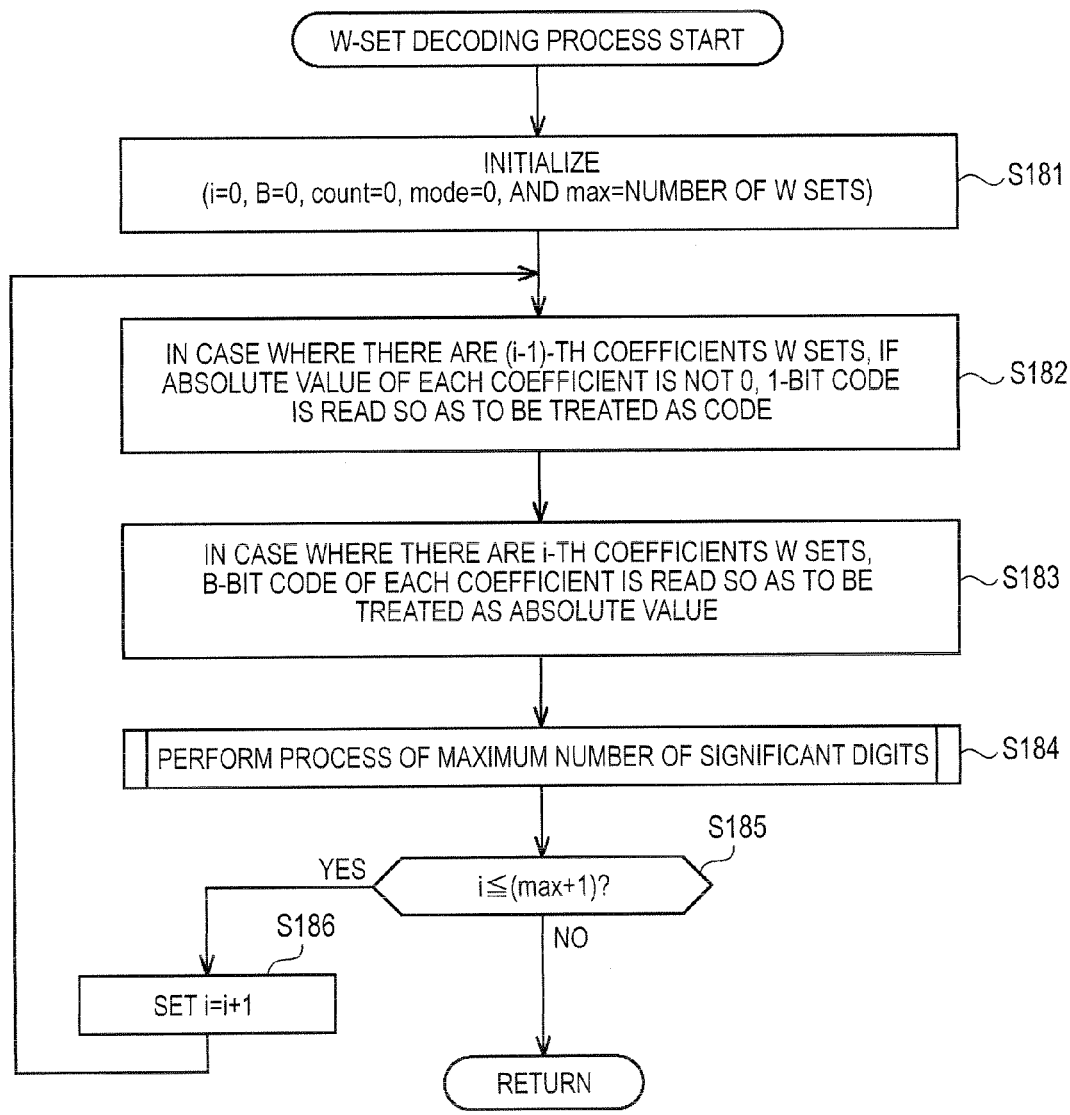
FIG. 30 is a flowchart illustrating an example of the flow of the W-set decoding process.

If the process in step S211 is completed, the VLC decoding portion 154 finishes the process of the maximum number of significant digits and returns the process to FIG. 30.

In addition, if it is determined in step S202 of FIG. 31 that the variable count is not 0, since the sets are in zero runs, the zero run length decoding section 203 makes process proceed to step S212.

In step S212, the zero run length decoding section 203 decrements the variable count (reduces by 1) as in the following Expression (3).

$$count=count-1 \qquad (3)$$

In step S213, the VLC decoding portion 154 sets the mode to 2 (mode=2) if the variable count is 0.

When the process in step S213 is completed, the VLC decoding portion 154 finishes the process of the maximum number of significant digits and returns the process to FIG. 30.

Figure 32:
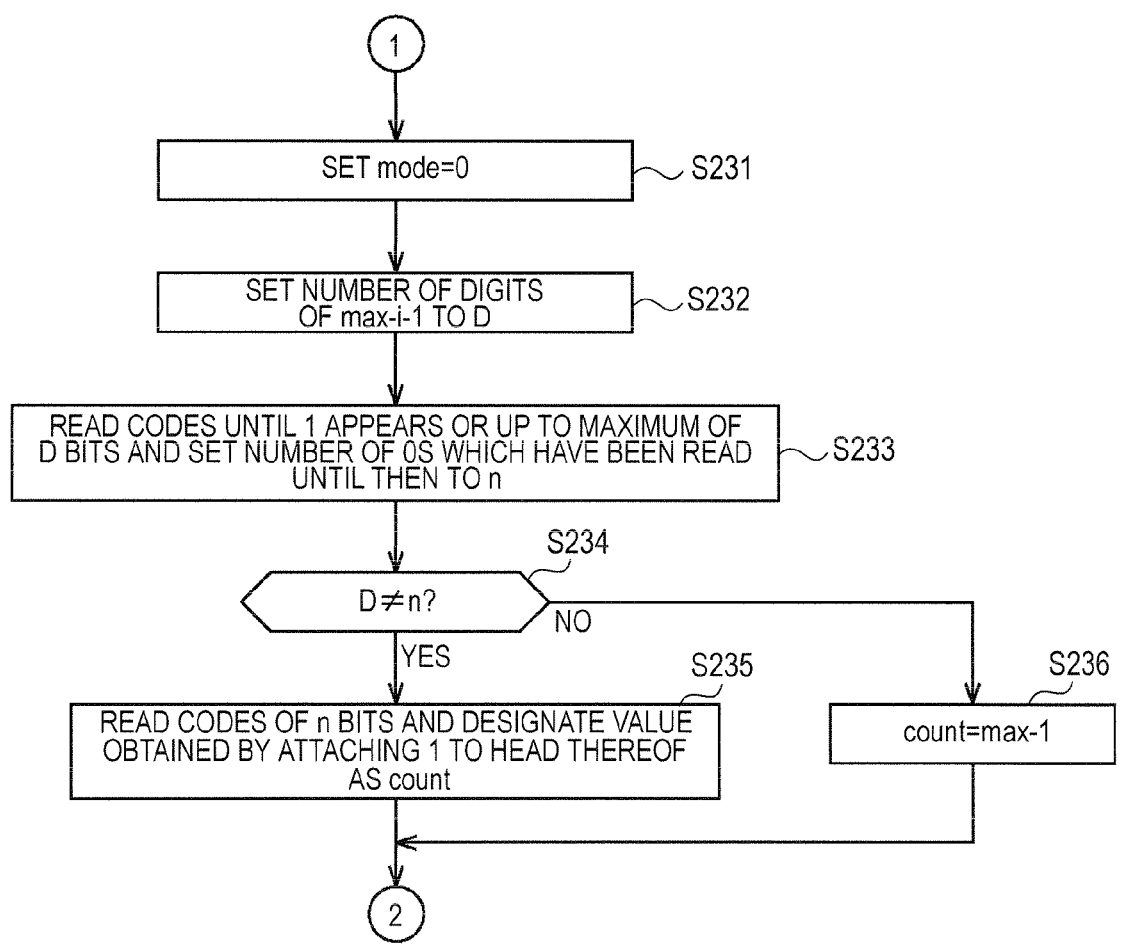
FIG. 32 is a flowchart subsequent to FIG. 31, illustrating an example of the flow of the process of the maximum number of significant digits.

In addition, if it is determined in step S203 of FIG. 31 that the mode is 1 (mode=1), the VLC decoding portion 154 makes the process proceed to FIG. 32.

In step S231 of FIG. 32, the VLC decoding portion 154 sets the mode to 0 (mode=0). In addition, in step S232, the zero run length decoding section 203 sets the number of digits of the variable max−i−1 to D.

In step S233, the zero run length decoding section 203 starts reading of codes (obtaining of codes from the code dividing portion 151), and performs reading (first reading) of the codes until the code i is acquired, or a maximum of D bits are read.

Through the first reading, the left portion of the comma (,) of the code sequence shown in the rightmost column of the table of FIG. 5 is read, or the code sequence of the third column from the left of the table of FIG. 7 or FIG. 9 is read.

Further, the zero run length decoding section 203 sets the number of read codes 0 to n.

In step S234, the zero run length decoding section 203 determines whether or not D≠n. If it is determined that D≠n, that is, the zero runs do not arrive at the line end, the zero run length decoding section 203 makes the process proceed to step S235.

That is to say, in this case, through the first reading, the left portion of the comma (,) of the code sequence shown in the rightmost column of the table of FIG. 5 is read. It is clear that up to the n-th code from there correspond to the right portion of the comma (,) through the first reading (the code indicating the zero runs is n bits).

Therefore, in step S235, the zero run length decoding section 203 reads codes of n bits (second reading). A code sequence in which the code 1 is added to the head of the read n bits is assigned to the variable count. In other words, the binary expression in the second column from the left of the table of FIG. 5 is assigned to the variable count.

When the process in step S235 is completed, the zero run length decoding section 203 returns the process to step S212 of FIG. 31, and executes the subsequent processes.

In addition, if it is determined in step S234 of FIG. 32 that D=n, that is, the zero runs arrive at the line end, the zero run length decoding section 203 makes the process proceed to step S236.

In other words, in this case, through the first reading, the code sequence of the third column from the left of the table of FIG. 7 or FIG. 9 is read.

Therefore, the zero run length decoding section 203 sets a value of the variable count to (max−1) in step S236, and returns the process to step S212 of FIG. 31 so as to execute the subsequent processes.

As above, by decoding a predetermined number of the encode quantized coefficients of the sub-band together, for example, unlike in a case of decoding an image using the JPEG 2000 method, it is not necessary to perform a plurality of processes for each bit plane on the basis of a plurality of coding paths, and it is possible to perform decoding of an image at higher speed. Thereby, it is possible to realize a decoding device for decoding a high definition image in real time at low costs.

In addition, by executing the respective processes as described above, the image decoding device 111 can correctly decode codes obtained by encoding zero runs together, thereby restoring quantized coefficients whose value is 0. Therefore, the image decoding device 111 can realize reduction in a code amount of zero runs and thereby realize improvement in encoding efficiency of encoding of coefficient data having many 0s.

In addition, as described above, execution of the respective process elements of the decoding process is controlled such that the respective process elements of the decoding process for a single set are executed at different timings, and thereby the image decoding device 111 can improve throughput of the encoding process. As a result, the image decoding device 111 can perform the encoding process at higher speed.

<3. Third Embodiment>
[Another Example of Zero Run Encoding Process Adaptive to Pipeline Process]

In addition, encoding of zero runs is not limited to the above-described example and may be performed as follows.

For example, in the above-described (*2), in a case where B is not 0 in coefficients immediately after the maximum number B of significant digits changes to 0, a value of B which is not 0 is sent using the codes more* and enough so as to be connected to the code 1.

In contrast, in a case where B is 0 in the coefficients immediately after B changes to 0, the code 0 is sent. At the point when a zero run length is fixed, 1-bit 0 of a code head is deleted from the zero run length which has been encoded using zero run codes, so as to be sent, and, in a case where 0 does not arrive at the line end, a value of next B which is not 0 is successively encoded using codes more* and enough.

In this way as well, encoding can be performed in the same manner as the first embodiment.

Therefore, in this case as well, a configuration of the image encoding device 11 and a flow of each process are basically the same as in the case described in the first embodiment.

Figure 33:
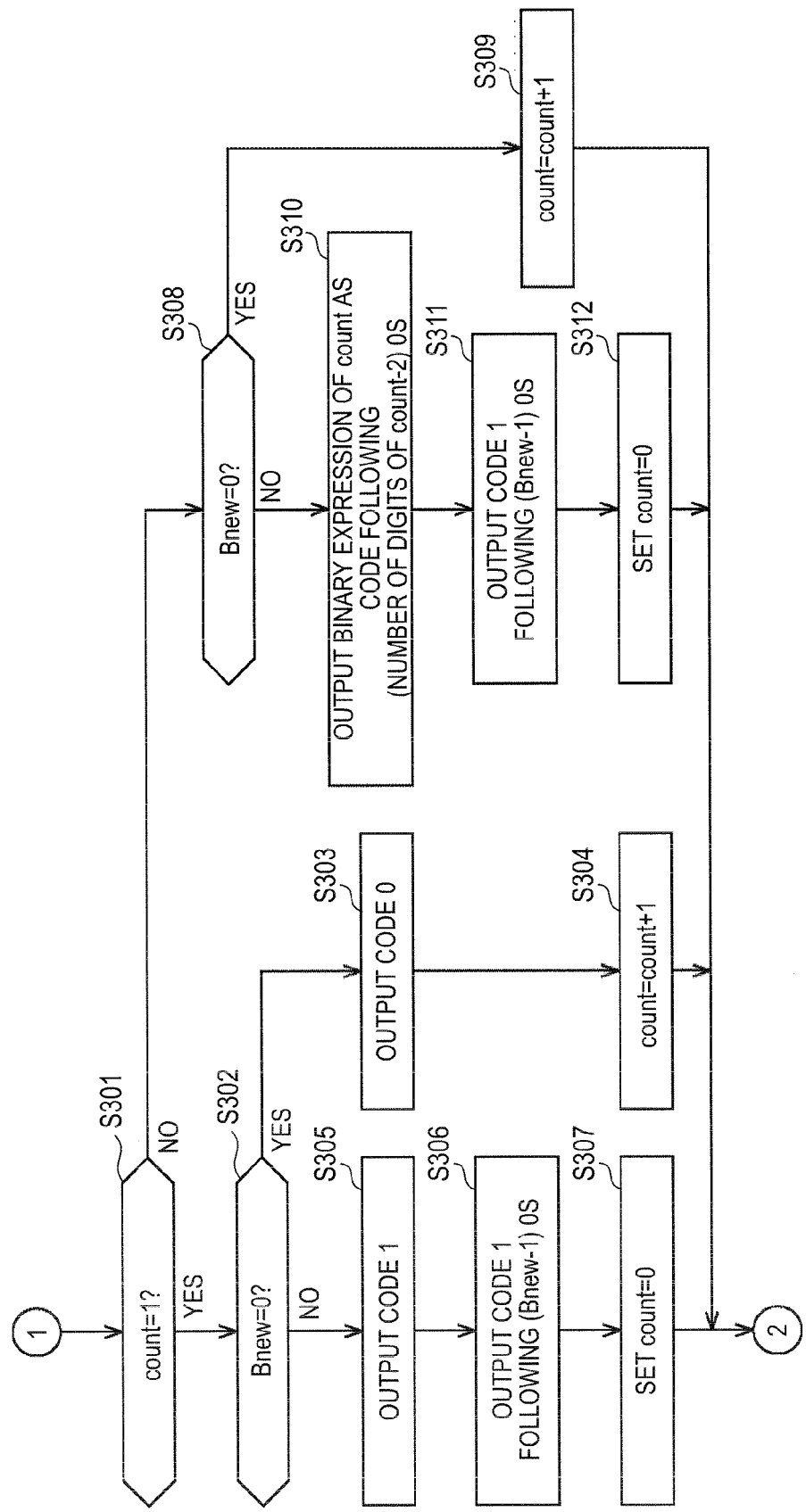
FIG. 33 is a flowchart subsequent to FIG. 21, illustrating another example of the flow of the process of the maximum number of significant digits.

However, in the process of the maximum number of significant digits, each process of the flowchart of FIG. 21 is executed in the same manner as the case of the first embodiment, but each process of the flowchart portion of FIG. 22 is executed as shown in a flowchart of FIG. 33.

In other words, if it is determined in step S73 of FIG. 21 that the variable count is not 0, the process proceeds to step S301 of FIG. 33. In step S301, the zero run length encoding section 83 determines whether or not the variable count is 1. In a case of the variable count=1, that is, in a case of sets immediately after B changes to 0, the zero run length encoding section 83 makes the process proceed to step S302.

In step S302, the zero run length encoding section 83 determines whether or not Bnew is 0. If it is determined that Bnew is 0, the zero run length encoding section 83 makes the process proceed to step S303 and outputs the code 0. In addition, in step S304, the zero run length encoding section 83 increments the variable count (adds 1) so as to be updated as in the following Expression (4).

$$\text{count}=\text{count}+1 \quad (4)$$

When the process in step S304 is completed, the zero run length encoding section 83 returns the process to the step S82 of FIG. 21.

In addition, if it is determined in step S302 of FIG. 33 that Bnew is not 0, the zero run length encoding section 83 makes the process proceed to step S305 and outputs the code 1.

In step S306, the zero run length encoding section 83 outputs the code 1 following (Bnew−1) 0s.

In step S307, the zero run length encoding section 83 sets a value of the variable count to 0 (count=0). When the process in step S307 is completed, the zero run length encoding section 83 returns the process to step S82 of FIG. 21.

In addition, if it is determined in step S301 that the variable count is not 1, that is, in a case of not being sets immediately after B changes to 0, the zero run length encoding section 83 makes the process proceed to step S308.

In step S308 of FIG. 33, the zero run length encoding section 83 determines whether or not Bnew is 0. If it is determined that Bnew is 0 and the zero runs do not end even in the current sets, the zero run length encoding section 83 makes the process proceed to step S309.

In step S309, the zero run length encoding section 83 increments the variable count which is a counted value of the number of zero run sets (the variable count=count+1), and returns the process to step S82 of FIG. 21 so as to execute the subsequent processes.

In addition, if it is determined in step S308 of FIG. 33 that Bnew is not 0 and the zero runs end in the current sets, the zero run length encoding section 83 makes the process proceed to step S310.

In step S310, the zero run length encoding section 83 outputs continuous binary expression of the variable count after (the number of digits of the variable count−2) codes 0, for example, as shown in the rightmost column of the table of FIG. 5, to the code linking portion 69 as a code indicating the zero runs.

In step S311, the maximum significant digit number change amount encoding section 82 outputs (Bnew−1) codes 0 indicating the increment of the maximum number B of significant digits to the code linking portion 69. In addition, here, outputting of the code 1 indicating the terminal end (enough) of the change is omitted (skipped). In a case where outputting of the code 1 indicating the terminal end (enough) of the change is not omitted, the maximum significant digit number change amount encoding section 82 may output the code 1 indicating the terminal end (enough) of the change to the code linking portion 69, following (Bnew−1) codes 0 indicating the increment of the maximum number B of significant digits.

In step S312, the zero run length encoding section 83 sets a value of the variable count to 0. If the process in step S312 is completed, the zero run length encoding section 83 returns the process to step S82 of FIG. 21 so as to execute the subsequent processes.

In this way, the entropy encoding unit 23 can perform the encoding in the same manner as the case of the first embodiment.

[Another Example of Zero Run Decoding Process Adaptive to Pipeline Process]

A decoding process corresponding to the encoding will be described. At the initial timing of the zero run mode, the image decoding device 111 decodes either 0, or 1, more*, and enough.

In a case where 1, more*, and enough are decoded, the zero run length is 1, and a value indicated by more* and enough is new B. Since the zero run length is 1, a value of B is necessary at this timing, but correct decoding has been performed.

In contrast, in a case of decoding 0, the image decoding device 111 decodes the zero run length using zero run codes at the next timing of the zero run mode, taking into consideration that 1-bit 0 has already been used. In other words, in a case where 0 does not arrive at the line end, the image decoding device 111 successively decodes a value of next B which is not 0 using codes more* and enough. In addition, after only the zero run length progresses, the image decoding device 111 transfers a state to the normal mode. Since the zero run length is equal to or greater than 2, there is no problem even if the zero run length is decoded at this timing.

In this case as well, a configuration of the image decoding device 111 and a flow of each process are basically the same as in the case described in the second embodiment.

Figure 34:
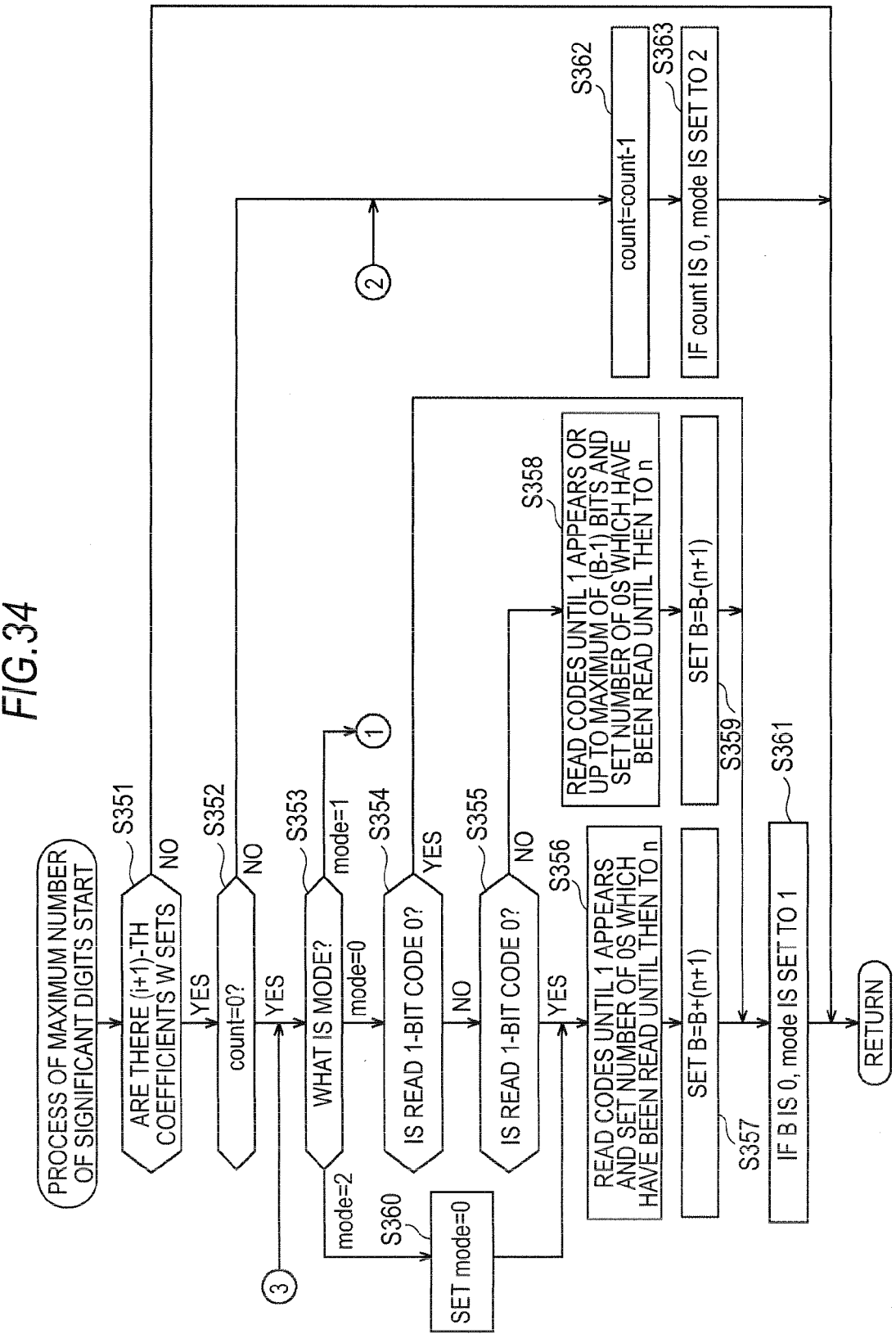
FIG. 34 is a flowchart illustrating another example of the flow of the process of the maximum number of significant digits.
Figure 35:
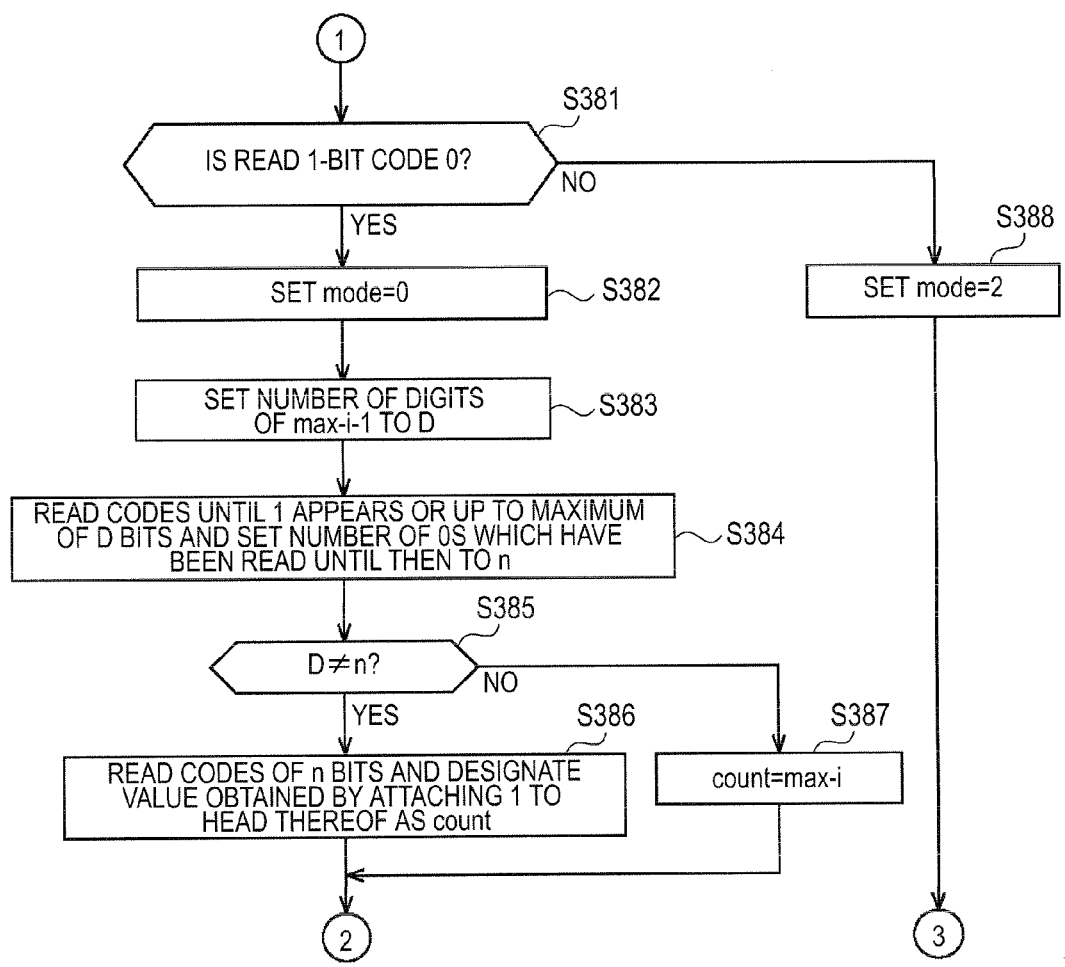
FIG. 35 is a flowchart subsequent to FIG. 34, illustrating another example of the flow of the process of the maximum number of significant digits.

However, the process of the maximum number of significant digits is executed as in flowcharts of FIGS. 34 and 35.

The respective processes of steps S351 to S363 shown in FIG. 34 are basically executed in the same manner as the respective processes in steps S201 to S213 of FIG. 31.

If it is determined in step S353 of FIG. 34 that the mode is 1 (mode=1), the VLC decoding portion 154 makes the process proceed to FIG. 35.

In step S381 of FIG. 35, the maximum significant digit number change decoding section 201 reads a 1-bit code from the codes supplied from the code dividing portion 151, and determines whether or not the code is 0.

If it is determined in step S381 that the read code is 0, the maximum significant digit number change decoding section 201 makes the process proceed to step S382. The respective processes in steps S382 to S387 are executed in the same manner as the respective processes in steps S231 to S236 of FIG. 32.

In addition, if it is determined that the read code is 1, the maximum significant digit number change decoding section 201 makes the process proceed to step S388.

In step S388, the VLC decoding portion 154 sets the mode to 2 (mode=2).

When the process in step S388 is completed, the VLC decoding portion 154 returns the process to step S353 of FIG. 34.

In this way, the entropy decoding unit 121 can perform decoding in the same manner as the case of the second embodiment.

In addition, in a case where the encoded data of the respective process elements of the decoding process is arranged as in the example of FIGS. 13A to 13D, in the flowchart of FIG. 30, an order of processes to be executed in steps S182 to S184 may be replaced with an order of steps S184, S183 and S182.

In addition, in the above description, the description has been made that, as in the example of FIG. 12 or FIG. 14, the execution timing of the encoding process or the decoding process A of absolute values are delayed further by a set than that of the encoding process or the decoding process B of the maximum number of significant digits, and the execution timing of the encoding process or the decoding process S of signs is delayed further by two sets than that of the encoding process or the decoding process B of the maximum number of significant digits. However, the execution timings of the respective process elements are not limited to these patterns as long as they are different from each other.

For example, the execution timing of the encoding process or the decoding process A of absolute values may be delayed further by two or more sets than that of the encoding process or the decoding process of the maximum number of significant digits. In this case, the execution timing of the encoding process or the decoding process S of signs may be delayed further by 0 or more sets than that of the encoding process or the decoding process A of absolute values.

Further, for example, the execution timing of the encoding process or the decoding process S of signs may be delayed further by two or more sets than that of the encoding process or the decoding process A of absolute values.

In addition, although, in the above description, the description has been made that the time point ti is an execution timing of a process element, the execution timing of each process element of the encoding process or the decoding process is not limited to the time point ti. Each process element of the encoding process or the decoding process may be executed at any execution timing as long as delay due to the dependencies shown in the flowchart of FIG. 12 or FIG. 14 does not occur.

For example, time from the time point ti to the time point t(i+1) may be used as one cycle, and a process element may be executed at any timing as long as the timing is a timing when a process is completed within the cycle.

<4. Fourth Embodiment>

[Another Example of Pipeline Process]

Figure 36:
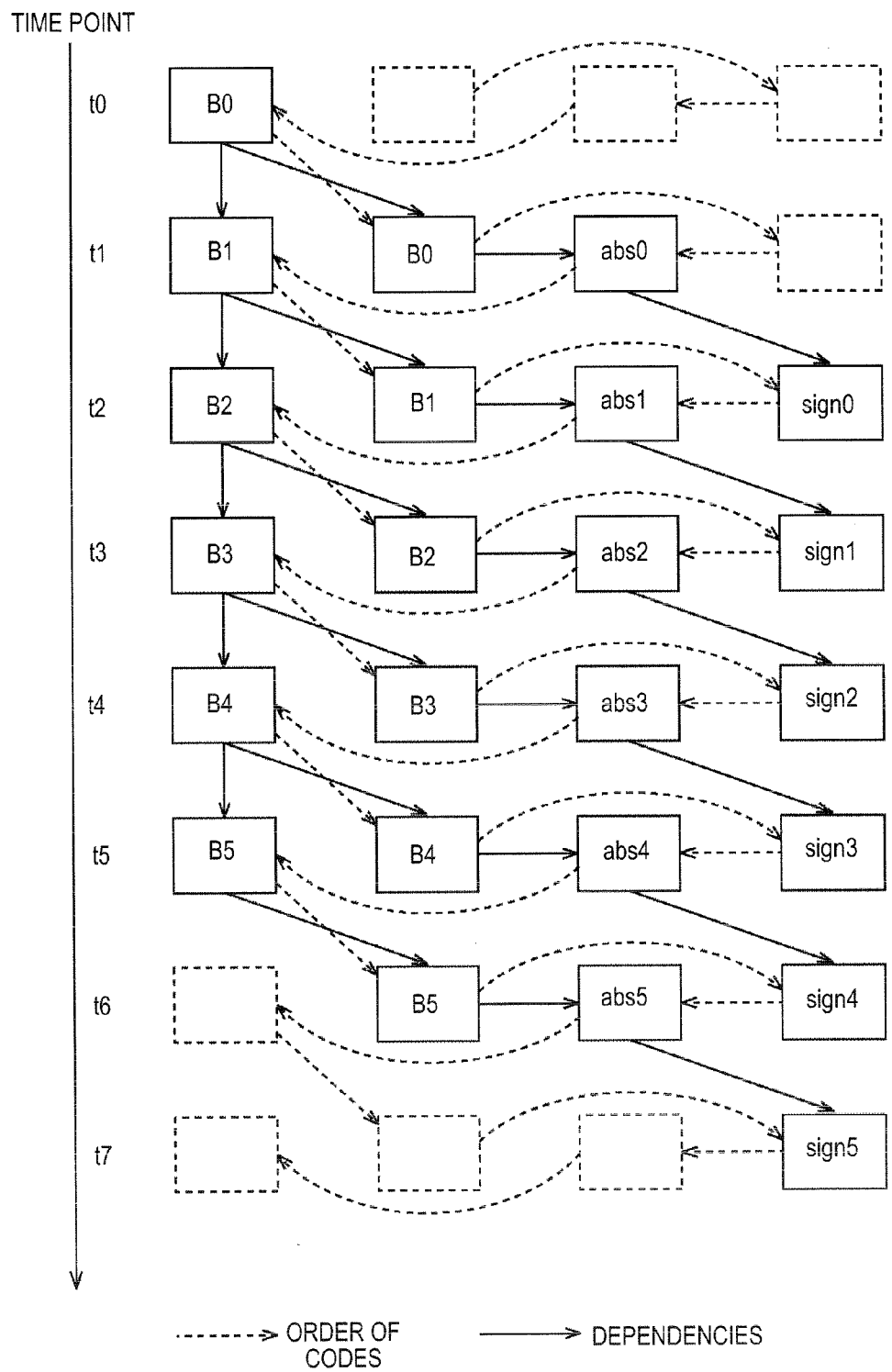
FIG. 36 is a diagram illustrating still another example of the flowchart in a case where the pipeline process is performed.

In addition, a process for a single process element may be performed over the next cycle. In other words, the process for the single process element may be performed using a plurality of cycles. For example, the encoding process or the decoding process B of the maximum number of significant digits may be performed using a time period corresponding to two sets, for example, as shown in FIG. 36. In this case, an arrangement of codes of the respective process elements in the encoded data is indicated by the dotted arrows of FIG. 36. That is to say, in this case as well, the arrangement of codes is the same as the case of FIG. 12.

In this case as well, as shown in FIG. 36, it is necessary to finish all the processes of the encoding process or the decoding process B(i) of the maximum number of significant digits before performing the encoding process or the decoding process A(i) of absolute values due to the dependencies. For example, in a case where a process time for the encoding process or the decoding process B of the maximum number of significant digits is considerably longer than a process time for the encoding process or the decoding process A of absolute values or the encoding process or the decoding process of signs (deviation in a process time is great), it is possible to reduce a waiting time occurring at each cycle and to thereby improve throughput, through the above-described processes.

Figure 37:
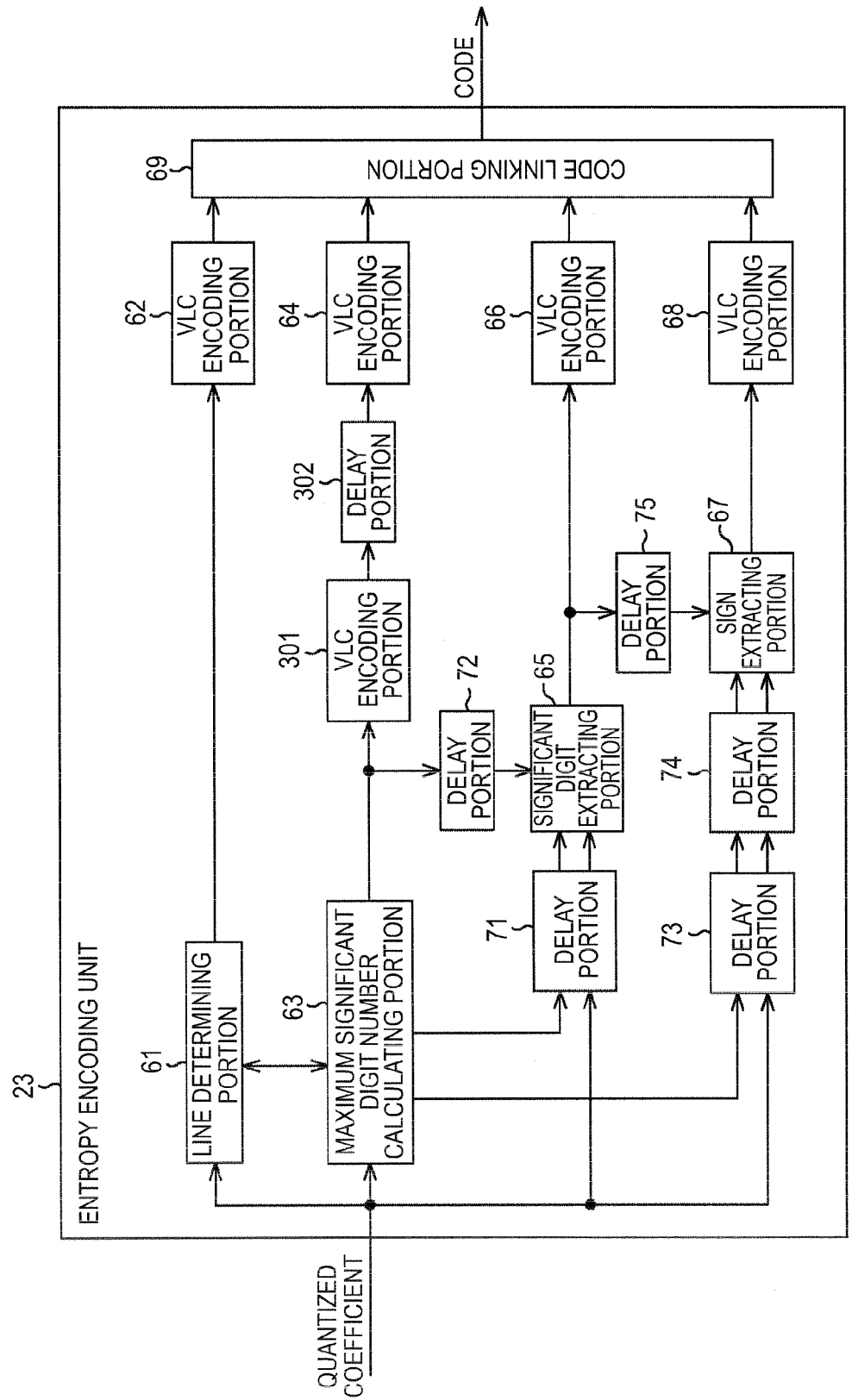
FIG. 37 is a block diagram illustrating another configuration example of the entropy encoding unit.

In this case, the entropy encoding unit 23 may be configured as in an example shown in FIG. 37. That is to say, in this case, the entropy encoding unit 23 further includes a VLC encoding portion 301 and a delay portion 302 in addition to the configuration of FIG. 16.

The VLC encoding portion 301 performs the same process as in the VLC encoding portion 64 of the case of FIG. 16 along with the VLC encoding portion 64. In other words, in the case of FIG. 16, the VLC encoding portion 64 executes the respective processes of the process of the maximum number of significant digits shown in the flowcharts of FIGS. 21 and 22, and, in a case of the example of FIG. 37, some processes of the processes are performed by the VLC encoding portion 301, and the other processes are performed by the VLC encoding portion 64.

The delay portion 302 delays information output from the VLC encoding portion 301 by a set in the same manner as the delay portions 71 to 75 so as to be supplied to the VLC encoding portion 64.

In this way, the process of the maximum number of significant digits is executed at cycles corresponding to two sets. In addition, arbitrarily, the VLC encoding portion 301 may perform processes up to a certain process of the process of the maximum number of significant digits and the VLC encoding portion 64 may perform processes from the certain process.

Figure 38:
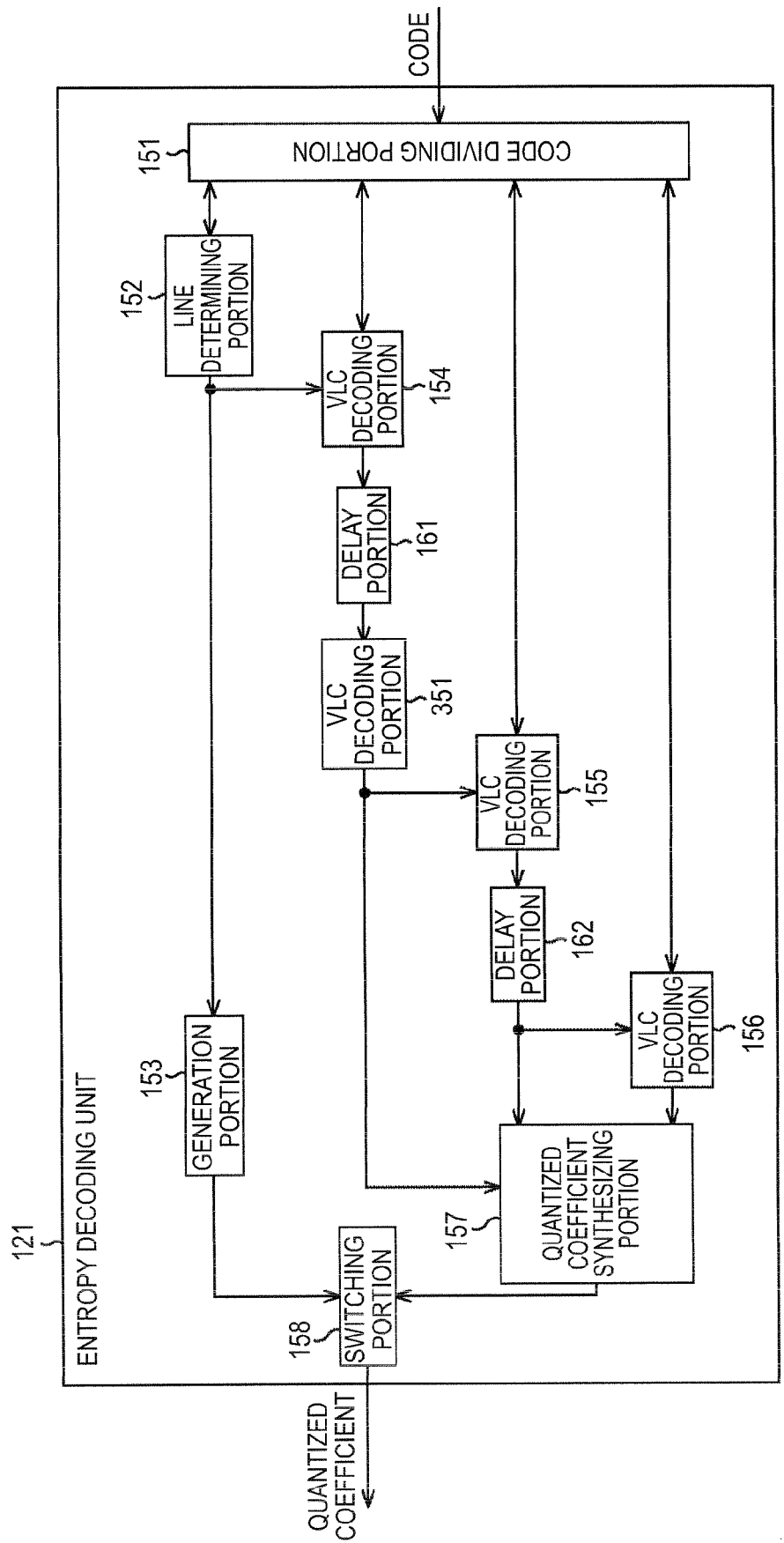
FIG. 38 is a block diagram illustrating another configuration example of the entropy decoding unit.

In addition, in this case, the entropy decoding unit 121 may be configured as in an example shown in FIG. 38. In other words, in this case, the entropy decoding unit 121 further includes a VLC decoding portion 351 in addition to the configuration of FIG. 24.

The VLC decoding portion 351 performs the same process as in the VLC decoding portion 154 of the case of FIG. 24 along with the VLC decoding portion 154. In other words, in the case of FIG. 24, the VLC decoding portion 154 executes the respective processes of the process of the maximum number of significant digits shown in the flowcharts of FIGS. 31 and 32, and, in a case of the example of FIG. 38, some processes of the processes are performed by the VLC decoding portion 154, and the other processes are performed by the VLC decoding portion 351.

The VLC decoding portion 351 acquires a process result (a midway result of the process of the maximum number of significant digits of FIGS. 31 and 32) from the VLC decoding portion 154 via the delay portion 161 and executes the other processes.

In this way, the process of the maximum number of significant digits is executed at cycles corresponding to two sets. In addition, arbitrarily, the VLC decoding portion 154 may perform processes up to a certain process of the process of the maximum number of significant digits and the VLC decoding portion 351 may perform processes from the certain process.

However, in the image encoding device 11 described above, in a case of encoding (or decoding) absolute values of quantized coefficients, the description has been made that the absolute values of predefined W quantized coefficients are sequentially encoded; however, the W quantized coefficients are encoded (or decoded) at the same time (in parallel) using an SIMD (Single Instruction Multiple Data) operation command used in a general purpose DSP (Digital Signal Processor) or a general purpose CPU, and thereby it is possible to encode (or decode) an image at higher speed.

Further, data encoded by the entropy encoding unit 23 may be data other than quantized coefficients. For example, in the image encoding device 11, the quantization unit 22 may be omitted, and the entropy encoding unit 23 may encode wavelet coefficients output from the wavelet transform unit 21. In this case, the entropy decoding unit 121 decodes input encoded data so as to output wavelet coefficients. Therefore, in this case, the image decoding device 111, the inverse quantization unit 122 may be omitted. The entropy decoding unit 121 decodes the input encoded data so as to output image data. Accordingly, in this case, in the image decoding device 111, the inverse wavelet transform unit 123 may also be omitted.

In addition, the wavelet transform unit 21 may be further omitted, and the entropy encoding unit 23 may encode image data (input image). In this case as well, the entropy decoding unit 121 decodes the input encoded data, and the entropy encoding unit 23 outputs data corresponding to the encoded data.

<5. Fifth Embodiment>
[Image Encoding Device]

Figure 39:
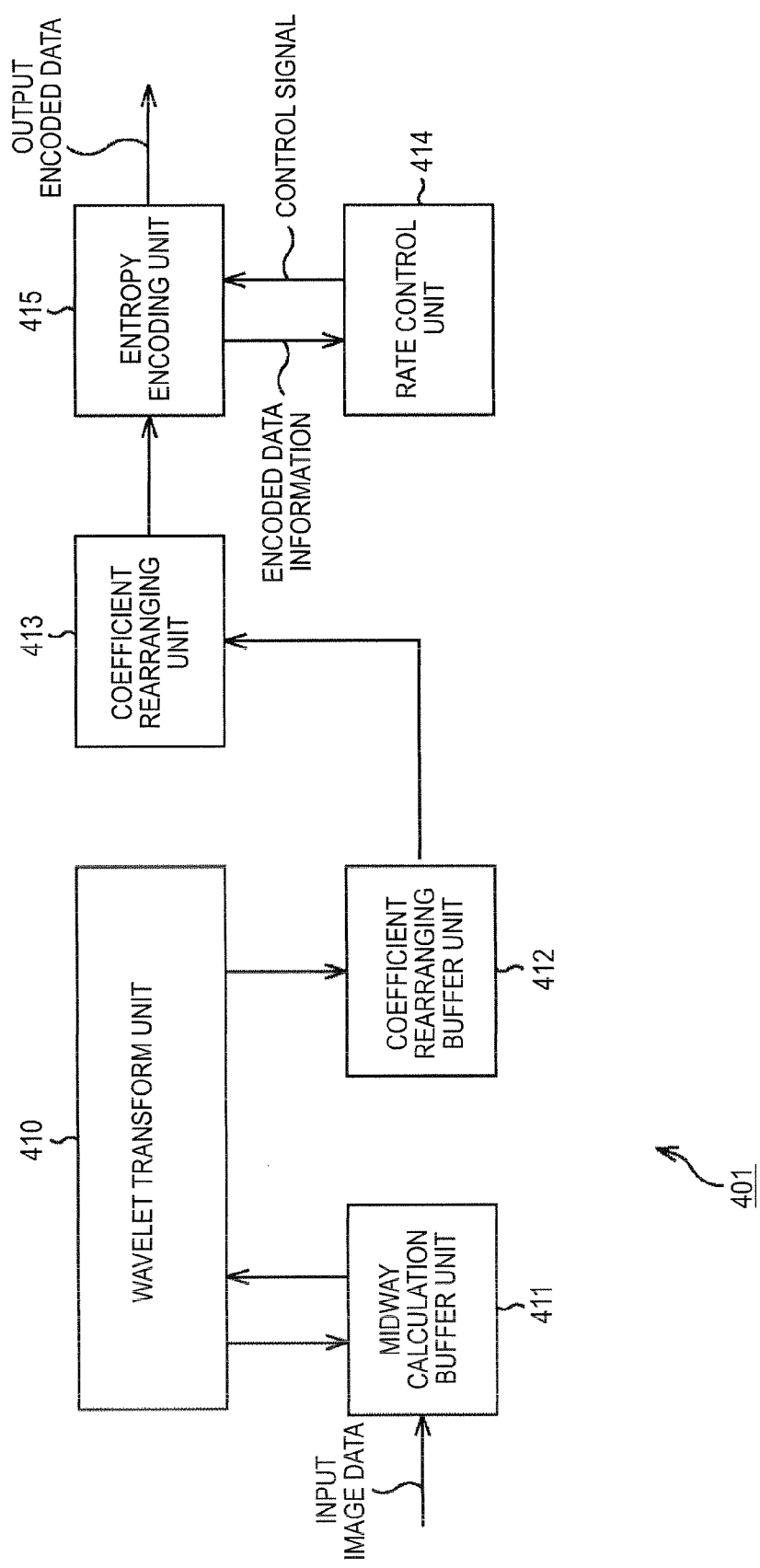
FIG. 39 is a block diagram illustrating another configuration example of the image encoding device.
Figure 40:
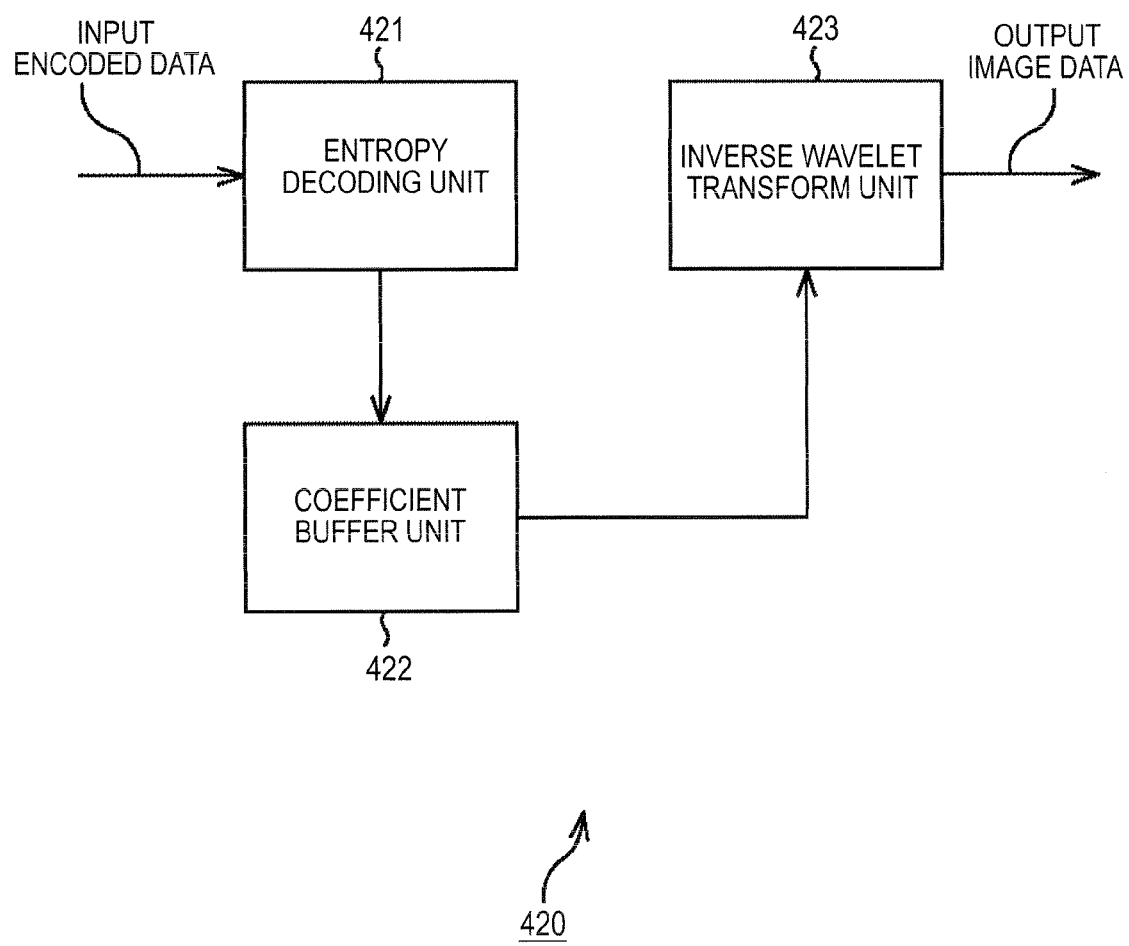
FIG. 40 is a block diagram illustrating another configuration example of the image decoding device.

FIG. 39 is a block diagram illustrating another configuration example of the image encoding device. The image encoding device 401 shown in FIG. 40 is an image processing device which performs low delay encoding on input image data and outputs encoded data generated.

As shown in FIG. 39, the image encoding device 401 includes a wavelet transform unit 410, a midway calculation buffer unit 411, a coefficient rearranging buffer unit 412, a coefficient rearranging unit 413, a rate control unit 414, and an entropy encoding unit 415.

Image data input to the image encoding device 401 is stored in the midway calculation buffer unit 411. The wavelet transform unit 410 performs wavelet transform on the image data stored in the midway calculation buffer unit 411. That is to say, the wavelet transform unit 410 reads the image data from the midway calculation buffer unit 411, generates coefficient data of a low frequency component and a high frequency component by performing a filter process on the image data using an analysis filter, and stores the coefficient data in the midway calculation buffer unit 411.

The wavelet transform unit 410 has a horizontal analysis filter and a vertical analysis filter, and performs an analysis filter process on the image data group in both the screen horizontal direction and the screen vertical direction. The wavelet transform unit 410 performs the analysis filter process using, for example, a lifting operation.

The wavelet transform unit 410 reads the coefficient data of a low frequency component stored in the midway calculation buffer unit 411 again, performs a filter process on the read coefficient data using the analysis filters, and further generates coefficient data of a high frequency component and a low frequency component. The generated coefficient data is stored in the midway calculation buffer unit 411. That is to say, the wavelet transform unit 410 recursively repeats the analysis filter process on the low frequency component, and generates hierarchies of the coefficient data for each component.

The wavelet transform unit 410 reads the coefficient data from the midway calculation buffer unit 411 when this process is repeated and the division level arrives at a predetermined level, and stores the read coefficient data into the coefficient rearranging buffer unit 412.

The coefficient rearranging unit 413 reads the coefficient data stored in the coefficient rearranging buffer unit 412 in an order to be decoded (an order of inverse wavelet transform), so as to be supplied to the entropy encoding unit 415. The entropy encoding unit 415 encodes the supplied coefficient data using a predetermined entropy encoding method such as, for example, Huffman coding or arithmetic encoding.

The entropy encoding unit 415 is operated in conjunction with the rate control unit 414 and is controlled such that a bit rate of the output encoded data which is compressed is a substantially constant value. That is to say, the rate control unit 414 supplies, to the entropy encoding unit 415, a control signal for performing control such that an encoding process by the entropy encoding unit 415 is finished at the point when a bit rate of the data compressed and encoded by the entropy encoding unit 415 reaches a target value or immediately before reaching the target value on the basis of the encoded data information from the entropy encoding unit 415. The entropy encoding unit 415 outputs the encoded data at the point when the encoding process ends in response to the control signal supplied from the rate control unit 414.

The image encoding device 401 performs the image encoding multiple times in a stepwise fashion, by being divided into processes every several lines in the vertical direction of the screen. More specifically, the image encoding device 401 encodes the input image data for each number of lines which is necessary to generate coefficient data for a single line of a sub-band of the lowest frequency component after wavelet transform.

Hereinafter, the collection of lines necessary to generate coefficient data for a single line of a sub-band of the lowest frequency component, including other sub-bands, is referred to as a line block (or a precinct). Here, the line refers to pixel data or coefficient data for one row formed in a picture or a field corresponding to image data before wavelet transform, or in each sub-band.

In addition, data forming a line block (precinct) may be image data, may be coefficient data having undergone wavelet transform, or may be encoded data having undergone entropy encoding. In other words, the line block (precinct) may be data of any state as long as the data is data in original image data before wavelet transform, corresponding to a pixel data group for several lines necessary to generate coefficient data for a single line of a sub-band of the lowest frequency component after the wavelet transform. For example, there are cases where the data refers to a coefficient data group of each sub-band obtained by performing wavelet transform on the pixel data group.

In other words, the wavelet transform unit 410 performs a wavelet transform process for each line block (precinct). That is to say, the wavelet transform unit 410 starts the wavelet transform process when a minimal amount of input image data which is possible with an analysis filter process up to the lowest frequency component is accumulated in the midway calculation buffer unit 411.

In a case of a wavelet transform method in the related art first, a horizontal analysis filter process is performed for the entire picture, and a vertical analysis filter process is performed for the entire picture. In addition, the same horizontal analysis filter process and vertical analysis filter process are sequentially performed for the obtained entire low frequency component. As above, the analysis filter processes are recursively repeated until a division level arrives at a final level. Therefore, it is necessary to hold a result of each analysis filter process in a buffer, but, at that time, it is necessary for the buffer to hold the entire picture, or filtering results of the entire low frequency component in a division level at that point, and thus a large amount of memory capacity is necessary (a data amount to be held is large).

In addition, in this case, unless the overall wavelet transform finishes in a picture, subsequent coefficient rearrangement or entropy encoding is not performed, and a delay time increases.

In contrast, since the wavelet transform unit 410 continuously performs the horizontal analysis filter process and vertical analysis filter process with the line block units up to a final level as described above, an amount of data which it is necessary to hold (buffer) at a time (at the same time) is small, and a memory capacity of a buffer to be prepared can be considerably reduced as compared with the method in the related art. In addition, the analysis filter processes are performed up to a final level, and thereby a process such as subsequent coefficient rearrangement or entropy encoding can be executed.

The coefficient rearranging unit 413 reads coefficient data when the coefficient data read next is stored in the coefficient rearranging buffer unit 412. The entropy encoding unit 415 sequentially performs entropy encoding on supplied coefficient data. Therefore, the wavelet transform unit 410 starts outputting the coefficient data at lower delay, and thereby the coefficient rearranging unit 413 or the entropy encoding unit 415 can start a process of each at lower delay.

In other words, the encoded data is output at lower delay. The respective processes of the wavelet transform, the coefficient rearrangement, and the entropy encoding can be performed in parallel to each other. Therefore, it is possible to considerably reduce a delay time as compared with the method in the related art. In other words, the image encoding device 401 can encode input image data at lower delay and output encoded data.

The embodiments of the present disclosure may be applied to the image encoding device 401. For example, the entropy encoding unit 23 of FIG. 16 is employed as the entropy encoding unit 415. In this way, the image encoding device 401 can perform an encoding process at lower delay and perform the encoding process more easily.

That is to say, the image encoding device 401 can reduce loads on the encoding process. Thereby, it is possible to perform the encoding process at higher speed. In addition, on, it is possible to implement the image encoding device 401 at lower costs (it is possible to reduce manufacturing costs). Further, the image encoding device 401 can execute the encoding process using a plurality of pipeline processes which are performed in parallel to each other. Thereby, it is possible to improve throughput of the encoding process. In addition, the image encoding device 401 can encode a zero run portion with higher efficiency and thus improve encoding efficiency of encoding of coefficient data having many 0s.

[Image Decoding Device]

FIG. 40 is a block diagram illustrating another configuration example of the image decoding device. The image decoding device 420 shown in FIG. 40 is an image processing device corresponding to the image encoding device 401 of FIG. 39. That is to say, the image decoding device 420 decodes encoded data which is generated by the image encoding device 401 encoding image data, and generates decoded image data.

As shown in FIG. 40, the image decoding device 420 includes an entropy decoding unit 421, a coefficient buffer unit 422, and an inverse wavelet transform unit 423.

Encoded data input to the image decoding device 420 is supplied to the entropy decoding unit 421. The entropy decoding unit 421 performs entropy decoding on the encoded data using a method corresponding to the entropy encoding by the entropy encoding unit 415, acid restores coefficient data before the entropy encoding. The entropy decoding unit 421 supplies the coefficient data to the coefficient buffer unit 422 so as to be stored.

The inverse wavelet transform unit 423 reads the coefficient data stored in the coefficient buffer unit 422, performs respective synthesis filter processes thereon in the vertical direction and the horizontal direction, and stores results of the synthesis filter processes in the coefficient buffer unit 422 again. The inverse wavelet transform unit 423 repeatedly performs the process according to a division level, and obtains decoded image data (output image data). The inverse wavelet transform unit 423 outputs the decoded image data generated to an external device of the image decoding device 420.

At this time, the coefficient data is rearranged in an order of inverse wavelet transform by the coefficient rearranging unit 413 of the image encoding device 401, and thus the inverse wavelet transform unit 423 can sequentially read the coefficients stored in the coefficient buffer unit 422 so as to be used for the synthesis filter process. In other words, the inverse wavelet transform unit 423 can perform lower delay inverse wavelet transform.

Therefore, the image decoding device 420 can decode the encoded data at lower delay and output decoded image data.

The embodiments of the present disclosure may be applied to the image decoding device 420. For example, the entropy decoding unit 121 of FIG. 24 is employed as the entropy decoding unit 421. In this way, the image decoding device 420 can perform a decoding process at lower delay and perform the decoding process at higher speed. In addition, the image decoding device 420 can perform the decoding process more easily.

That is to say, the image decoding device 420 can reduce loads on the decoding process. Thereby, it is possible to perform the decoding process at higher speed. In addition, it is possible to implement the image decoding device 420 at lower costs (it is possible to reduce manufacturing costs). Further, the image decoding device 420 can execute the decoding process using a plurality of pipeline processes which are performed in parallel to each other Thereby, it is possible to improve throughput of the decoding process. In addition, the image decoding device 420 can realize encoding of a zero run portion with higher efficiency and thus realize improvement in encoding efficiency of encoding of coefficient data having many 0s.

[Flow of Encoding and Decoding]

It is possible to implement a data transmission system which can perform lower delay data transmission by using the above-described image encoding device 401 and image decoding device 420.

In transmission of data, the data is encoded, is transmitted, and is decoded in a transmission destination, which is effective for improvement in transmission efficiency.

In the data transmission system which encodes and transmits image data in this way, the image encoding device 401 is employed as an image encoding device of a transmission source, and the image decoding device 420 is employed as an image decoding device of a transmission destination. In this way, as described above, it is possible to perform lower delay encoding and decoding, and to thereby realize lower delay data transmission.

More detailed description will be made. FIGS. 41A to 41C are diagrams illustrating an example of the flow in which image data is encoded by the image encoding device 401 and the encoded data is decoded by the image decoding device 420. FIGS. 41A to 41C show an example of performing a filter process by wavelet transform up to the division level=2, employing a 5×3 filter. In the wavelet transform unit 410, as an example is shown in FIG. 41A, the first analysis filter process is performed on the first line to the seventh line of the input image data in each of the horizontal and vertical directions (In-1 in FIG. 41A).

In the division level=1 process of the first analysis filter process, the coefficient data items for three lines are generated, and are respectively disposed in the region HH, the region HL, and the region LH formed at the division level=1, as an example is shown in FIG. 41B (WT-1 in FIG. 41B).

In addition, the region LL formed at the division level=1 is further divided into four regions through the analysis filter process in the horizontal and vertical directions at the division level=2. The coefficient data items generated at the division level=2 are respectively disposed in the region LL, the region HH, region HL, and region LH by one line within the region LL by the division level=1.

In the second filter process and thereafter by the wavelet transform unit 410, the filter process is performed every four lines (In-2 . . . in FIG. 41A), coefficient data for two lines is generated at the division level=1 (WT-2 in FIG. 41B), and coefficient data for a single line is generated at the division level=2.

In a case of decoding the data having undergone the wavelet transform as in FIG. 41B, as an example is shown in FIG. 41C, the first line by the first synthesis process on the decoding side is output (Out-1 in FIG. 41C) with respect to the first filter process using the first line to the seventh line on the encoding side. Thereafter, four lines are output at a time from the decoding side (Out-2 . . . in FIG. 41C) with respect to the second filter process to the next-to-last filter process on the encoding side. Seven lines are output from the decoding side with respect to the last filter process on the encoding side.

As described above, the encoding process by the image encoding device 401 and the decoding process by the image decoding device 420 can be performed for each line block and can be performed in parallel to each other. Therefore, a delay time after image data is input to the image encoding device 401 until decoded image data is output from the image decoding device 420 is considerably reduced. That is to say, it is possible to realize lower delay data transmission.

By applying the embodiment of the present disclosure to the image encoding device 401 and the image decoding device 420 of the data transmission system as described above, it is possible to realize an encoding process or a decoding process more easily. In addition, it is possible to improve throughput of the encoding process or the decoding process, and to thereby further reduce delay of data transmission. Furthermore, it is possible to improve encoding efficiency of encoding of coefficient data having many 0s, and to thereby further improve transmission efficiency.

In addition, configurations of the image encoding device 401 and the image decoding device 420 are limited to the above-described examples as long as they can employ the embodiments of the present disclosure. For example, rearrangement of coefficients may be performed by the image decoding device 420. In addition, other transform processes (inverse transform processes) may be employed instead of the wavelet transform process (inverse wavelet transform process). Further, quantization or inverse quantization may be performed on coefficient data.

As a detailed example of the above-described data transmission system, there is a digital triax system in which, for example, in a television broadcasting station or production studio, when studio recording, relaying, or the like is performed, a plurality of signals such as a video signal, an audio signal, a return video signal, and a synchronization signal are superimposed and are transmitted, and power is supplied, using a single coaxial cable which connects a video camera to a camera control unit or a switcher.

In addition, the data transmission system may be applied to any systems such as, for example, a television conference system, and a communication system between a home gaming console and a peripheral device such as a video camera or a monitor. In addition, the data transmission system may also be applied to data transmission between processing units inside a device.

In other words, the embodiments of the present disclosure may be applied to all systems which transmit encoded data obtained by encoding image data.

<6. Sixth Embodiment>

[Personal Computer]

Next, the above-described series of processes may be performed by hardware or software. In this case, for example, there may be a configuration of a personal computer as shown in FIG. 42.

In FIG. 42, A CPU (Central Processing Unit) 601 of the personal computer 600 performs various processes according to a program stored in a ROM (Read Only Memory) 602 or a program which is loaded to a RAM (Random Access Memory) 603 from a storage unit 613. The RAM (Random Access Memory) 603 appropriately stores data which is necessary for the CPU 601 to execute various processes.

The CPU 601, the ROM 602, and the RAM 603 are connected to each other via a bus 604. In addition, an input and output interface 610 is also connected to the bus 604.

The input and output interface 610 is connected to an input unit 611 including a keyboard, a mouse, and the like, an output unit 612 including a display such as a CRT (Cathode Ray Tube) display or an LCD (Liquid Crystal Display), a speaker, and the like, a storage unit 613 including an SSD (Solid State Drive) such as a flash memory, a hard disk, or the like, and a communication unit 614 including an interface of a wired LAN (Local Area Network) or a wireless LAN, a modem, or the like. The communication unit 614 performs a communication process via a network including the Internet.

A drive 615 is connected to the input and output interface 610 as necessary, a removable medium 621 such as a magnetic disk, an optical disc, a magneto-optical disc, or a semiconductor memory, is appropriately installed therein, and a computer program read therefrom is installed in the storage unit 613 as necessary.

In a case where the above-described series of processes is executed using software, a program constituting the software is installed from a network or a recording medium.

The recording medium includes, for example, as shown in FIG. 42, not only the removable medium 621 such as a magnetic disk (including a flexible disc), an optical disc (including a CD-ROM (Compact Disc-Read Only Memory) and a DVD (Digital Versatile Disc)), a magneto-optical disc (including an MD (Mini Disc)), or a semiconductor memory, which is distributed so as to deliver a program recorded thereon to a user separately from a device body, but also the ROM 602 which is sent to a user in a state of being incorporated in a device body in advance and records a program therein, or a hard disk included in the storage unit 613.

The program executed by the computer may be a program where processes are performed in a time series according to the order described in the present specification, or may be a program executed in parallel or a program where processes are performed at a necessary timing such as when accessed.

Further, in the present specification, the steps for describing programs recorded on a recording medium include not only processes performed in a time series according to the described order, but also processes performed in parallel or separately even if not necessarily performed in the time series.

In addition, in the present specification, the system refers to the entire apparatus including a plurality of devices.

Further, in the above description, a configuration described as a single device (or a processing unit) described above may be formed by a plurality of devices (or processing units). Conversely, in the above description, configurations described as a plurality of devices (or processing units) may be formed by a single device (or a processing unit). In addition, configurations other than those described above may be added to the configuration of each device (or each processing unit). Further, a part of the configuration of one device (or a processing unit) may be included in the configuration of another device (or another processing unit) as long as the configuration and operations of the overall system are substantially the same. In addition, embodiments of the present disclosure are not limited to the above-described embodiments but may have various modifications without departing from the scope of the present disclosure.

In addition, the present disclosure may be implemented as the following configurations.

(1) An image processing device including a significant digit number encoding unit that designates a predetermined number of coefficient data items of a plurality of coefficient data items generated from image data as a set, obtains the maximum number of significant digits which is the number of significant digits of coefficient data having the greatest absolute value in relation to each set every cycle, and encodes information regarding the maximum number of significant digits; a zero run encoding unit that encodes zero runs formed by sets including only coefficient data whose value is 0 at a cycle different from a cycle of encoding of the significant digit number encoding unit; an absolute value encoding unit that extracts an absolute value for the maximum number of significant digits of each coefficient data item in a set which has been encoded by the significant digit number encoding unit in relation to coefficient data other than the zero runs, and encodes the absolute value at a cycle different from a cycle of encoding of the significant digit number encoding unit; and a sign encoding unit that encodes a positive or negative sign of each coefficient data item whose absolute value is not 0 in a set which has been encoded by the absolute value encoding unit at a cycle different from a cycle of encoding of the absolute value encoding unit in relation to coefficient data other than the zero runs.

(2) The image processing device set forth in (1), wherein the zero run encoding unit generates codes including codes 0 of the number one smaller than the number of digits in binary expression of the number of sets forming the zero runs and the binary expression of the number of sets.

(3) The image processing device set forth in (2), wherein the zero run encoding unit generates codes including codes 0 of the number one smaller than the number of digits in binary expression of the number of sets forming the zero runs and a code 1 in a case where the zero runs continue to a line end which is a process target.

(4) The image processing device set forth in (2), wherein the zero run encoding unit generates codes including codes 0 of the number one smaller than the number of digits in binary expression of the number of sets forming the zero runs in a case where the zero runs continue to a line end which is a process target.

(5) The image processing device set forth in any one of (1) to (4), wherein the zero run encoding unit encodes the zero runs at a cycle when the significant digit number encoding unit encodes the information regarding the maximum number of significant digits in relation to sets after the zero runs.

(6) The image processing device set forth in any one of (1) to (5), wherein the zero run encoding unit encodes the zero runs at a cycle earlier than a cycle when the significant digit number encoding unit encodes the information regarding the maximum number of significant digits in relation to sets after the zero runs.

(7) The image processing device set forth in any one of (1) to (6), further including a wavelet transform unit that performs wavelet transform on image data; and a quantization unit that quantizes wavelet coefficients obtained by the wavelet transform unit performing the wavelet transform on the image data, wherein each of the significant digit number encoding unit, the zero run encoding unit, the absolute value encoding unit, and the sign encoding unit performs encoding on quantized coefficients obtained by the quantization unit quantizing the wavelet coefficients.

(8) An image processing method of an image processing device, including causing a significant digit number encoding unit to designate a predetermined number of coefficient data items of a plurality of coefficient data items generated from image data as a set, to obtain the maximum number of significant digits which is the number of significant digits of coefficient data having the greatest absolute value in relation to each set every cycle, and to encode information regarding the maximum number of significant digits; causing a zero run encoding unit to encode zero runs formed by sets including only coefficient data whose value is 0 at a cycle different from that of encoding of the number of significant digits; causing an absolute value encoding unit to extract an absolute value for the maximum number of significant digits of each coefficient data item in a set whose number of significant digits has been encoded in relation to coefficient data other than the zero runs, and to encode the absolute value at a cycle different from that of encoding of the number of significant digits; and causing a sign encoding unit to encode a positive or negative sign of each coefficient data item whose absolute value is not 0 in a set whose absolute value has been encoded at a cycle different from that of encoding of the absolute value in relation to coefficient data other than the zero runs.

(9) An image processing device including a significant digit number decoding unit that designates a predetermined number of coefficient data items of a plurality of coefficient data items as a set, and decodes a code indicating the maximum number of significant digits which is the number of significant digits of coefficient data having the greatest absolute value in the set in relation to each set every cycle; a zero run decoding unit that decodes a code indicating zero runs formed by sets including only coefficient data whose value is 0 at a cycle different from that of decoding of the significant digit number decoding unit; an absolute value decoding unit that decodes a code indicating an absolute value for the maximum number of significant digits of each coefficient data item in a set which has been decoded by the significant digit number decoding unit at a cycle different from that of decoding of the significant digit number decoding unit in relation to coefficient data other than the zero runs; and a sign decoding unit that decodes a positive or negative sign of each coefficient data item whose absolute value is not 0 in the set which has been decoded by the absolute value decoding unit at a cycle different from that of decoding of the absolute value decoding unit in relation to coefficient data other than the zero runs.

(10) The image processing device set forth in (9), wherein the zero run decoding unit decodes the code indicating the zero runs in a case where the maximum number of significant digits of a current set which is a process target is 0 as a result of decoding by the significant digit number decoding unit.

(11) The image processing device set forth in (10), wherein the zero run decoding unit performs first reading for sequentially reading codes until a code 1 is read or codes are read up to a line end, and, in a case where zero runs indicated by a code read through the first reading do not arrive at the line end, performs second reading for further reading codes corresponding to the number of codes 0 which have been read through the first reading, and generates coefficient data, whose value is 0, corresponding to the number of a code sequence in binary expression obtained by attaching a code 1 to the head of the codes read through the second reading.

(12) The image processing device set forth in any one of (9) to (11), wherein, in a case where zero runs indicated by a code read through the first reading arrive at the line end, the zero run decoding unit generates coefficient data, whose value is 0, corresponding to the number arriving at the line end.

(13) The image processing device set forth in (12) further including a maximum significant digit number holding unit that holds the maximum number of significant digits obtained by the significant digit number decoding unit decoding the code indicating the maximum number of significant digits during a predetermined time period, wherein the absolute value decoding unit decodes the code indicating the absolute value for the maximum number of significant digits held by the maximum significant digit number holding unit, at a cycle which is delayed from a cycle when decoding is performed by the significant digit number decoding unit by a time period when the maximum significant digit number holding unit holds the maximum number of significant digits.

(14) The image processing device set forth in (13) wherein the maximum significant digit number holding unit holds the maximum number of significant digits until the next cycle.

(15) The image processing device set forth in (13) wherein the maximum significant digit number holding unit holds the maximum number of significant digits until a cycle after a plurality of cycles.

(16) The image processing device set forth in any one of (9) to (15), further including an inverse quantization unit that inversely quantizes quantized coefficients including absolute values obtained as a result of decoding by the absolute value decoding unit and signs obtained as a result of decoding by the sign decoding unit; and an inverse wavelet transform unit that performs inverse wavelet transform on wavelet coefficients obtained by the inverse quantization unit inversely quantizing the quantized coefficients.

(17) An image processing method of an image processing device, including causing a significant digit number decoding unit to designate a predetermined number of coefficient data items of a plurality of coefficient data items as a set, and to decode a code indicating the maximum number of significant digits which is the number of significant digits of coefficient data having the greatest absolute value in the set in relation to each set every cycle; causing a zero run decoding unit to decode a code indicating zero runs formed by sets including only coefficient data whose value is 0 at a cycle different from that of decoding of the number of significant digits; causing an absolute value decoding unit to decode a code indicating an absolute value for the maximum number of significant digits of each coefficient data item in a set whose number of significant digits has been decoded at a cycle different from that of decoding of the number of significant digits in relation to coefficient data other than the zero runs; and causing a sign decoding unit to decode a positive or negative sign of each coefficient data item whose absolute value is not 0 in a set whose absolute value has been decoded at a cycle different from that of decoding of the absolute value in relation to coefficient data other than the zero runs.

The present disclosure contains subject matter related to that disclosed in Japanese Priority Patent Application JP 2011-280579 filed in the Japan Patent Office on Dec. 21, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device comprising:
   a significant digit number encoding unit that designates a predetermined number of coefficient data items of a plurality of coefficient data items generated from image data as a set, obtains the maximum number of significant digits which is the number of significant digits of coefficient data having the greatest absolute value in relation to each set every cycle, and encodes information regarding the maximum number of significant digits;
   a zero run encoding unit that encodes zero runs formed by sets including only coefficient data whose value is 0 at a cycle different from a cycle of encoding of the significant digit number encoding unit;
   an absolute value encoding unit that extracts an absolute value for the maximum number of significant digits of each coefficient data item in a set which has been encoded by the significant digit number encoding unit in relation to coefficient data other than the zero runs, and encodes the absolute value at a cycle different from a cycle of encoding of the significant digit number encoding unit; and a sign encoding unit that encodes a positive or negative sign of each coefficient data item whose absolute value is not 0 in a set which has been encoded by the absolute value encoding unit at a cycle different from a cycle of encoding of the absolute value encoding unit in relation to coefficient data other than the zero runs.

2. The image processing device according to claim 1, wherein the zero run encoding unit generates codes including codes 0 of the number one smaller than the number of digits in binary expression of the number of sets forming the zero runs and the binary expression of the number of sets.

3. The image processing device according to claim 2, wherein the zero run encoding unit generates codes including codes 0 of the number one smaller than the number of digits in binary expression of the of sets forming the zero runs and a code 1 in a case where the zero runs continue to a line end which is a process target.

4. The image processing device according to claim 2, wherein the zero run encoding unit generates codes including codes 0 of the number one smaller than the number of digits in binary expression of the number of sets forming the zero runs in a case where the zero runs continue to a line end which is a process target.

5. The image processing device according to claim 1, wherein the zero run encoding unit encodes the zero runs at a cycle when the significant digit number encoding unit encodes the information regarding the maximum number of significant digits in relation to sets after the zero runs.

6. The image processing device according to claim 1, wherein the zero run encoding unit encodes the zero runs at a cycle earlier than a cycle when the significant digit number encoding unit encodes the information regarding the maximum number of significant digits in relation to sets after the zero runs.

7. The image processing device according to claim 1, further comprising:
a wavelet transform unit that performs wavelet transform on image data; and
a quantization unit that quantizes wavelet coefficients obtained by the wavelet transform unit performing the wavelet transform on the image data,
wherein each of the significant digit number encoding unit, the zero run encoding unit, the absolute value encoding unit, and the sign encoding unit performs encoding on quantized coefficients obtained by the quantization unit quantizing the wavelet coefficients.

8. An image processing method of an image processing device, comprising:
causing a significant digit number encoding unit to designate a predetermined number of coefficient data items of a plurality of coefficient data items generated from image data as a set, to obtain the maximum number of significant digits which is the number of significant digits of coefficient data having the greatest absolute value in relation to each set every cycle, and to encode information regarding the maximum number of significant digits;
causing a zero run encoding unit to encode zero runs formed by sets including only coefficient data whose value is 0 at a cycle different from that of encoding of the number of significant digits;
causing an absolute value encoding unit to extract an absolute value for the maximum number of significant digits of each coefficient data item in a set whose number of significant digits has been encoded in relation to coefficient data other than the zero runs, and to encode the absolute value at a cycle different from that of encoding of the number of significant digits; and
causing a sign encoding unit to encode a positive or negative sign of each coefficient data item whose absolute value is not 0 in a set whose absolute value has been encoded at a cycle different from that of encoding of the absolute value in relation to coefficient data other than the zero runs.

9. An image processing device comprising:
a significant digit number decoding unit that designates a predetermined number of coefficient data items of a plurality of coefficient data items as a set, and decodes a code indicating the maximum number of significant digits which is the number of significant digits of coefficient data having the greatest absolute value in the set in relation to each set every cycle;
a zero run decoding unit that decodes a code indicating zero runs formed by sets including only coefficient data whose value is 0 at a cycle different from that of decoding of the significant digit number decoding unit;
an absolute value decoding unit that decodes a code indicating an absolute value for the maximum number of significant digits of each coefficient data item in a set which has been decoded by the significant digit number decoding unit at a cycle different from that of decoding of the significant digit number decoding unit in relation to coefficient data other than the zero runs; and
a sign decoding unit that decodes a positive or negative sign of each coefficient data item whose absolute value is not 0 in the set which has been decoded by the absolute value decoding unit at a cycle different from that of decoding of the absolute value decoding unit in relation to coefficient data other than the zero runs.

10. The image processing device according to claim 9, wherein the zero run decoding unit decodes the code indicating the zero runs in a case where the maximum number of significant digits of a current set which is a process target is 0 as a result of decoding by the significant digit number decoding unit.

11. The image processing device according to claim 10, wherein the zero run decoding unit performs first reading for sequentially reading codes until a code 1 is read or codes are read up to a line end, and, in a case where zero runs indicated by a code read through the first reading do not arrive at the line end, performs second reading for further reading codes corresponding to the number of codes 0 which have been read through the first reading, and generates coefficient data, whose value is 0, corresponding to the number of a code sequence in binary expression obtained by attaching a code 1 to the head of the codes read through the second reading.

12. The image processing device according to claim 11, wherein, in a case where zero runs indicated by a code read through the first reading arrive at the line end, the zero run decoding unit generates coefficient data, whose value is 0, corresponding to the number arriving at the line end.

13. The image processing device according to claim 12, further comprising:
a maximum significant digit number holding unit that holds the maximum number of significant digits obtained by the significant digit number decoding unit decoding the code indicating the maximum number of significant digits during a predetermined time period,
wherein the absolute value decoding unit decodes the code indicating the absolute value for the maximum number of significant digits held by the maximum significant digit number holding unit, at a cycle which is delayed from a cycle when decoding is performed by the significant digit number decoding unit by a time period when the maximum significant digit number holding unit holds the maximum number of significant digits.

14. The image processing device according to claim 13, wherein the maximum significant digit number holding unit holds the maximum number of significant digits until the next cycle.

15. The image processing device according to claim 13, wherein the maximum significant digit number holding unit holds the maximum number of significant digits until a cycle after a plurality of cycles.

16. The image processing device according to claim 9, further comprising:
- an inverse quantization unit that inversely quantizes quantized coefficients including absolute values obtained as a result of decoding by the absolute value decoding unit and signs obtained as a result of decoding by the sign decoding unit; and
- an inverse wavelet transform unit that performs inverse wavelet transform on wavelet coefficients obtained by the inverse quantization unit inversely quantizing the quantized coefficients.

17. An image processing method of an image processing device, comprising:
- causing a significant digit number decoding unit to designate a predetermined number of coefficient data items of a plurality of coefficient data items as a set, and to decode a code indicating the maximum number of significant digits which is the number of significant digits of coefficient data having the greatest absolute value in the set in relation to each set every cycle;
- causing a zero run decoding unit to decode a code indicating zero runs formed by sets including only coefficient data whose value is 0 at a cycle different from that of decoding of the number of significant digits;
- causing an absolute value decoding unit to decode a code indicating an absolute value for the maximum number of significant digits of each coefficient data item in a set whose number of significant digits has been decoded at a cycle different from that of decoding of the number of significant digits in relation to coefficient data other than the zero runs; and
- causing a sign decoding unit to decode a positive or negative sign of each coefficient data item whose absolute value is not 0 in a set whose absolute value has been decoded at a cycle different from that of decoding of the absolute value in relation to coefficient data other than the zero runs.

* * * * *